US008866698B2

(12) United States Patent
Ortega et al.

(10) Patent No.: US 8,866,698 B2
(45) Date of Patent: Oct. 21, 2014

(54) MULTI-DISPLAY HANDHELD DEVICE AND SUPPORTING SYSTEM

(75) Inventors: Douglas F. Ortega, Potomac, MD (US); Douglas A. Atkinson, Ashburn, VA (US); John T. Burch, McLean, VA (US); Michael J. Giovannoni, Great Falls, VA (US); Joseph D. Kralowetz, Clarksville, MD (US); Brendan M. Mannix, Reston, VA (US); Asghar D. Mostafa, McLean, VA (US); David C. Johnson, Waterford, VA (US); Joseph C. Roesch, Herndon, VA (US); Nabeel Zafar, Woodbridge, VA (US)

(73) Assignee: Pleiades Publishing Ltd., New York, NY (US)

( * ) Notice: Subject to any disclaimer, the term of this patent is extended or adjusted under 35 U.S.C. 154(b) by 937 days.

(21) Appl. No.: 12/660,466

(22) Filed: Feb. 26, 2010

(65) Prior Publication Data

US 2010/0156913 A1 Jun. 24, 2010

Related U.S. Application Data

(63) Continuation of application No. 12/657,730, filed on Jan. 26, 2010, now abandoned, which is a continuation (Continued)

(51) Int. Cl.
*G09G 5/00* (2006.01)
*G06F 3/14* (2006.01)

(52) U.S. Cl.
CPC ...... *G06F 3/1438* (2013.01); *G09G 2320/0606* (2013.01); *G09G 2354/00* (2013.01); *G09G 2310/02* (2013.01)

USPC .......................................................... 345/1.1

(58) Field of Classification Search
CPC ............ G06F 3/1438; G09G 2310/02; G09G 2320/0606; G09G 2354/00
USPC .......................................... 345/5, 1.1–9, 901
See application file for complete search history.

(56) References Cited

U.S. PATENT DOCUMENTS 4,555,775 A * 11/1985 Pike ............................. 715/790
5,146,552 A   9/1992 Cassorla et al.

(Continued)

FOREIGN PATENT DOCUMENTS

EP          1 962 202 A2   8/2008
KR      20090060436 A     6/2009

(Continued)

OTHER PUBLICATIONS

International Search Report from International Application No. PCT/US2009/005300, Date of Mailing: Jul. 7, 2010.

(Continued)

*Primary Examiner* — Alexander Eisen
*Assistant Examiner* — Chun-Nan Lin
(74) *Attorney, Agent, or Firm* — Amin, Turocy & Watson, LLP

(57) ABSTRACT

Bi-stable display technology and refresh display technology are integrated into a single device, which manages the use of these technologies to achieve power savings while providing a rich set of display functionalities that support interaction with content in a synergistic manner. Power saving functionality facilitates conservation of battery operating life, and flexible display functionalities enable access, display, and interaction with content in various ways.

34 Claims, 62 Drawing Sheets

Related U.S. Application Data of application No. 12/586,632, filed on Sep. 24, 2009, now abandoned, application No. 12/660,466, which is a continuation of application No. 12/657,732, filed on Jan. 26, 2010, now abandoned, which is a continuation of application No. 12/586,632, filed on Sep. 24, 2009, now abandoned, application No. 12/660,466, which is a continuation of application No. 12/657,733, filed on Jan. 26, 2010, now abandoned, which is a continuation of application No. 12/586,632, filed on Sep. 24, 2009, now abandoned, application No. 12/660,466, which is a continuation of application No. 12/657,793, filed on Jan. 26, 2010, now abandoned, which is a continuation of application No. 12/586,632, filed on Sep. 24, 2009, now abandoned, application No. 12/660,466, which is a continuation of application No. 12/657,794, filed on Jan. 26, 2010, now abandoned, which is a continuation of application No. 12/586,632, filed on Sep. 24, 2009, now abandoned, application No. 12/660,466, which is a continuation of application No. 12/657,797, filed on Jan. 26, 2010, now abandoned, which is a continuation of application No. 12/586,632, filed on Sep. 24, 2009, now abandoned, application No. 12/660,466, which is a continuation of application No. 12/657,798, filed on Jan. 26, 2010, now abandoned, which is a continuation of application No. 12/586,632, filed on Sep. 24, 2009, now abandoned.

(60) Provisional application No. 61/233,473, filed on Aug. 12, 2009, provisional application No. 61/214,550, filed on Apr. 24, 2009, provisional application No. 61/194,887, filed on Oct. 1, 2008.

(56) References Cited

U.S. PATENT DOCUMENTS

| | | | |
|---|---|---|---|
| 5,488,572 A | 1/1996 | Belmont | |
| 5,493,335 A | 2/1996 | Parulski et al. | |
| 5,724,530 A | 3/1998 | Stein et al. | |
| 6,043,798 A | 3/2000 | Yamamoto et al. | |
| 6,046,709 A * | 4/2000 | Shelton et al. | 345/1.1 |
| 6,336,161 B1 | 1/2002 | Watts | |
| 6,353,700 B1 | 3/2002 | Zhou | |
| 6,531,997 B1 * | 3/2003 | Gates et al. | 345/107 |
| 6,818,138 B2 * | 11/2004 | Obert et al. | 216/27 |
| 7,111,009 B1 | 9/2006 | Gupta et al. | |
| 7,289,084 B2 * | 10/2007 | Lesniak | 345/1.1 |
| 7,350,704 B2 | 4/2008 | Barsness et al. | |
| 7,418,656 B1 | 8/2008 | Petersen | |
| 8,018,431 B1 * | 9/2011 | Zehr et al. | 345/156 |
| 8,310,421 B2 * | 11/2012 | Todorovich | 345/85 |
| 8,310,439 B2 * | 11/2012 | Lee et al. | 345/107 |
| 2002/0149541 A1 | 10/2002 | Shin | |
| 2002/0158812 A1 | 10/2002 | Pallakoff | |
| 2003/0011534 A1 | 1/2003 | Rengan | |
| 2003/0160771 A1 | 8/2003 | Fraser et al. | |
| 2004/0068619 A1 * | 4/2004 | Van Doren | 711/144 |
| 2004/0139168 A1 * | 7/2004 | Tanaka et al. | 709/213 |
| 2004/0190080 A1 | 9/2004 | Kodama et al. | |
| 2004/0196210 A1 | 10/2004 | Nagatsuka et al. | |
| 2004/0201633 A1 | 10/2004 | Barsness et al. | |
| 2004/0207568 A1 | 10/2004 | Ooshima et al. | |
| 2004/0224638 A1 | 11/2004 | Fadell et al. | |
| 2004/0225613 A1 | 11/2004 | Narayanaswami et al. | |
| 2004/0226041 A1 | 11/2004 | Smith et al. | |
| 2004/0257367 A1 | 12/2004 | Smith et al. | |
| 2005/0058186 A1 * | 3/2005 | Kryzak et al. | 375/219 |
| 2005/0210038 A1 | 9/2005 | Dettinger et al. | |
| 2005/0225556 A1 | 10/2005 | Booth | |
| 2005/0249080 A1 | 11/2005 | Foote et al. | |
| 2005/0257145 A1 | 11/2005 | Gage | |
| 2006/0017659 A1 | 1/2006 | Ogawa et al. | |
| 2006/0050090 A1 | 3/2006 | Ahmed et al. | |
| 2006/0066601 A1 * | 3/2006 | Kothari et al. | 345/204 |
| 2006/0077127 A1 | 4/2006 | Sampsell et al. | |
| 2006/0083194 A1 | 4/2006 | Dhrimaj et al. | |
| 2006/0146056 A1 | 7/2006 | Wyatt | |
| 2006/0161977 A1 | 7/2006 | Jung et al. | |
| 2006/0187142 A1 | 8/2006 | Lesniak | |
| 2006/0197724 A1 | 9/2006 | Sakai | |
| 2006/0282778 A1 | 12/2006 | Barsness et al. | |
| 2006/0282797 A1 | 12/2006 | Barsness et al. | |
| 2007/0103385 A1 | 5/2007 | Lian et al. | |
| 2007/0174918 A1 | 7/2007 | Hirose et al. | |
| 2007/0176847 A1 | 8/2007 | Shah | |
| 2008/0068291 A1 * | 3/2008 | Yuan et al. | 345/2.1 |
| 2008/0068292 A1 * | 3/2008 | Yuan et al. | 345/2.1 |
| 2008/0068294 A1 | 3/2008 | Teng et al. | |
| 2008/0072163 A1 * | 3/2008 | Teng et al. | 715/761 |
| 2008/0080010 A1 | 4/2008 | Korst | |
| 2008/0134083 A1 | 6/2008 | Farouki | |
| 2008/0141182 A1 | 6/2008 | Barsness et al. | |
| 2008/0163039 A1 | 7/2008 | Ryan et al. | |
| 2008/0168073 A1 | 7/2008 | Siegel et al. | |
| 2008/0177536 A1 | 7/2008 | Sherwani et al. | |
| 2008/0222156 A1 | 9/2008 | Ryan et al. | |
| 2008/0243788 A1 | 10/2008 | Reztlaff et al. | |
| 2008/0243828 A1 | 10/2008 | Reztlaff et al. | |
| 2008/0293450 A1 | 11/2008 | Ryan et al. | |
| 2008/0294674 A1 | 11/2008 | Reztlaff, II et al. | |
| 2009/0085920 A1 | 4/2009 | Teng et al. | |
| 2009/0106671 A1 * | 4/2009 | Olson et al. | 715/757 |
| 2009/0256798 A1 * | 10/2009 | Low et al. | 345/107 |
| 2010/0053164 A1 * | 3/2010 | Imai et al. | 345/427 |
| 2010/0164888 A1 | 7/2010 | Okumura et al. | |
| 2010/0232485 A1 * | 9/2010 | Sheiman et al. | 375/220 |

FOREIGN PATENT DOCUMENTS

| | | |
|---|---|---|
| WO | WO 2005/107365 A2 | 11/2005 |
| WO | WO 2007/091927 A1 | 8/2007 |
| WO | WO 2008/033875 A2 | 3/2008 |
| WO | WO 2008/033876 A1 | 3/2008 |

OTHER PUBLICATIONS

Written Opinion of the International Searching Authority from International Application No. PCT/US2009/005300, Date of Mailing: Jul. 7, 2010.

Invitation to Pay Additional Fees with attached Partial International Search Report, PCT/US2009/005300, date of mailing Jun. 4, 2010.

* cited by examiner

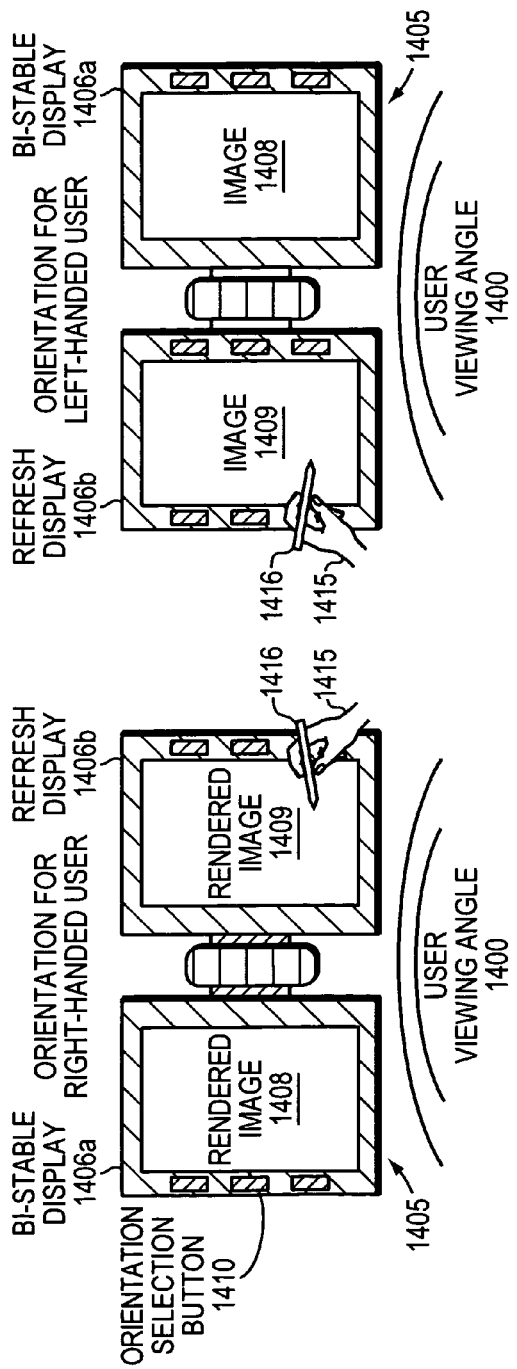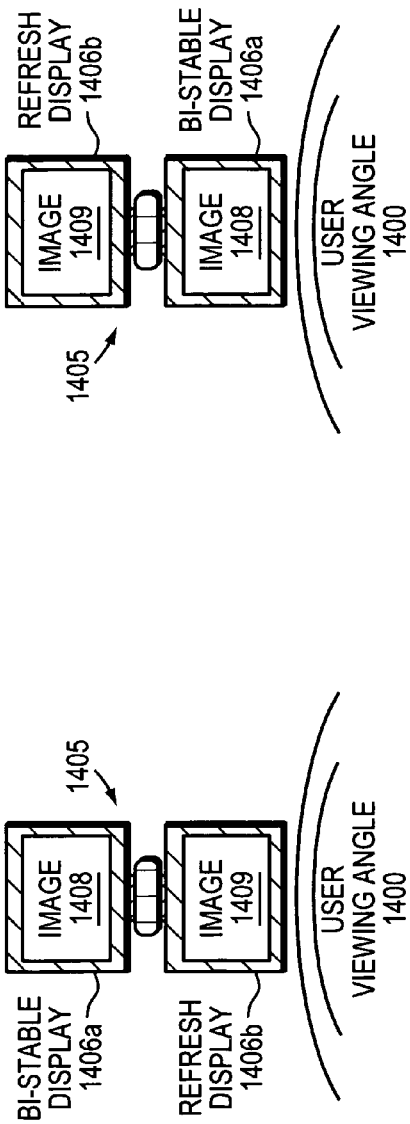

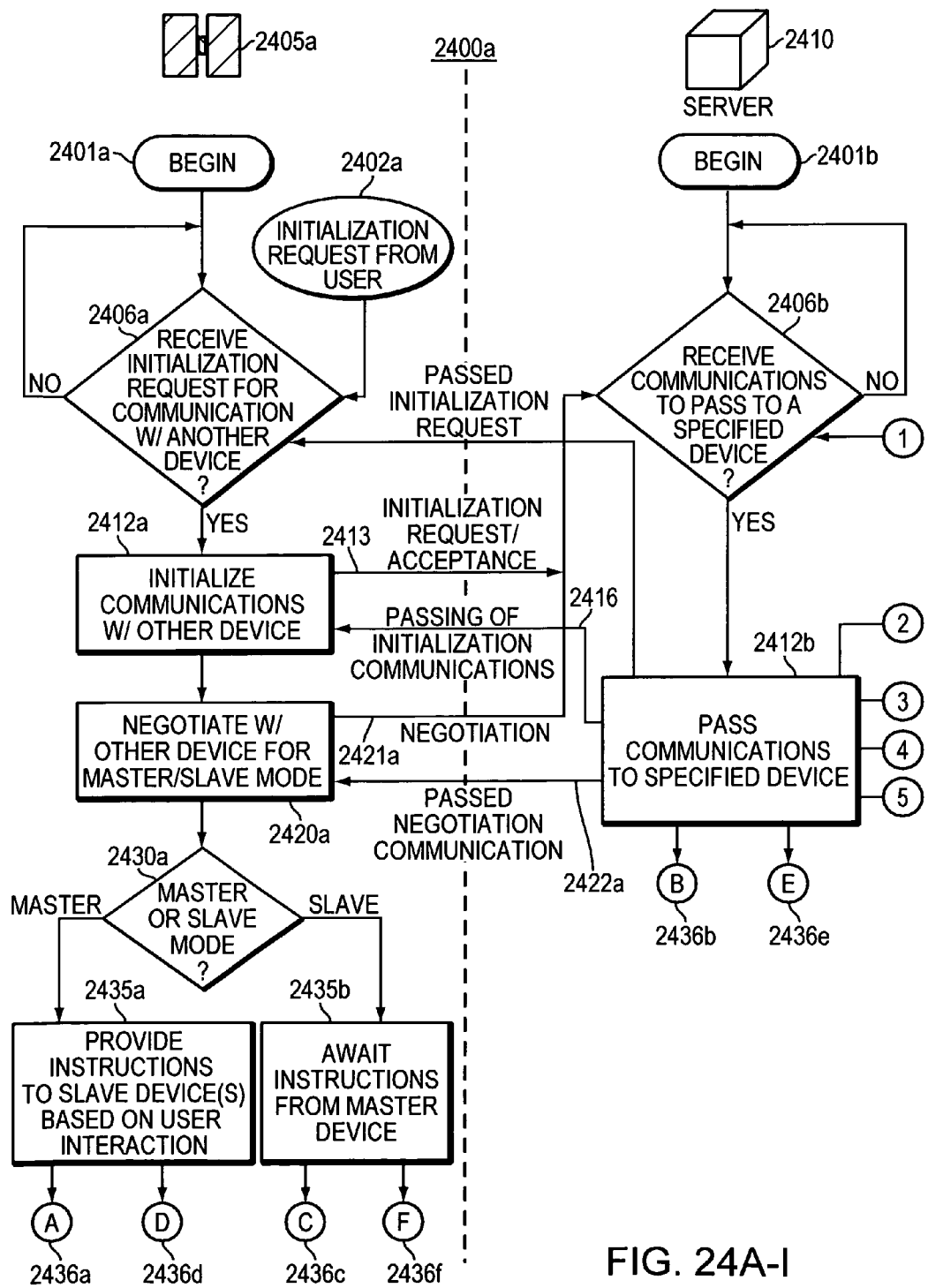
FIG. 24A-I

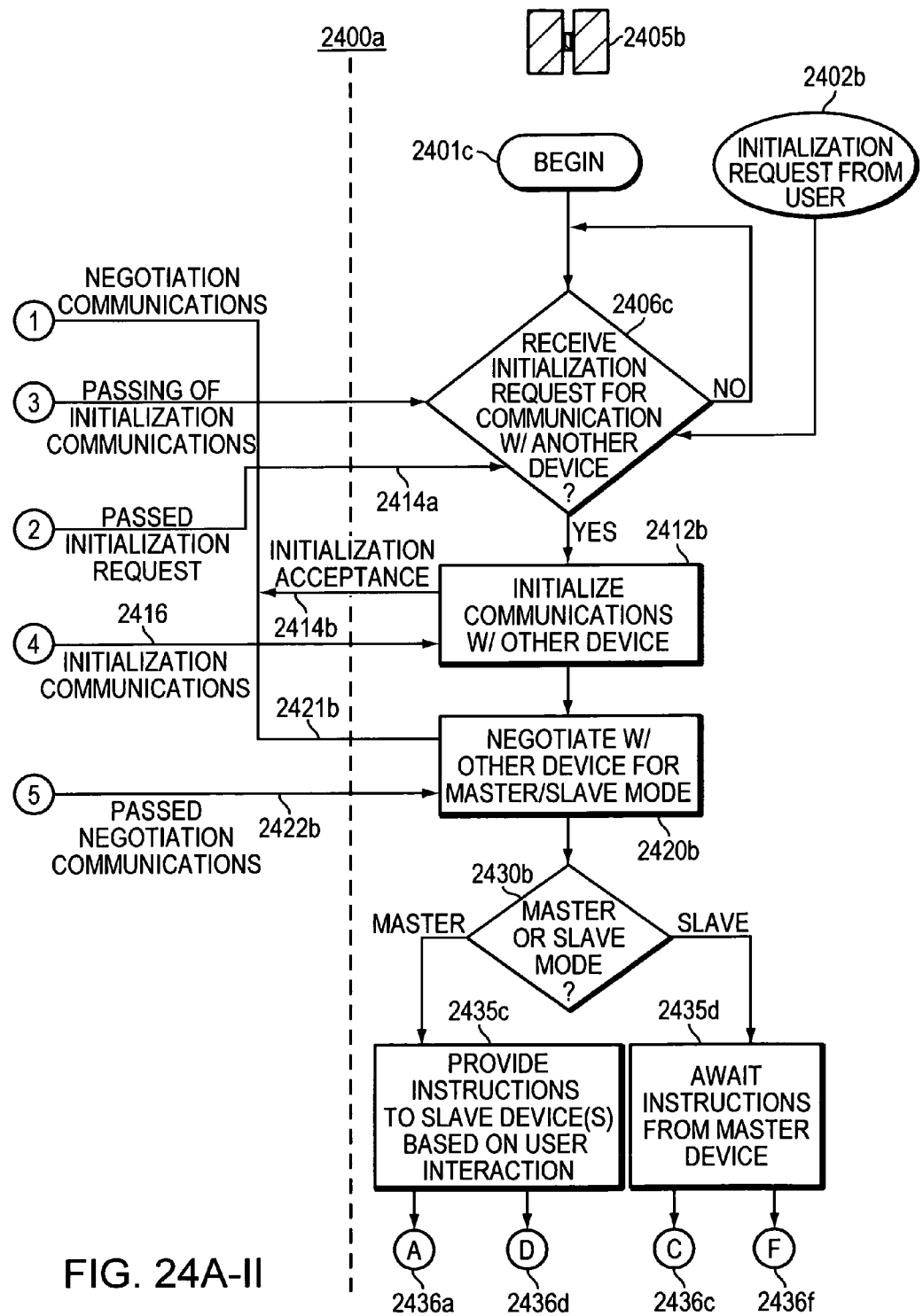
FIG. 24A-II

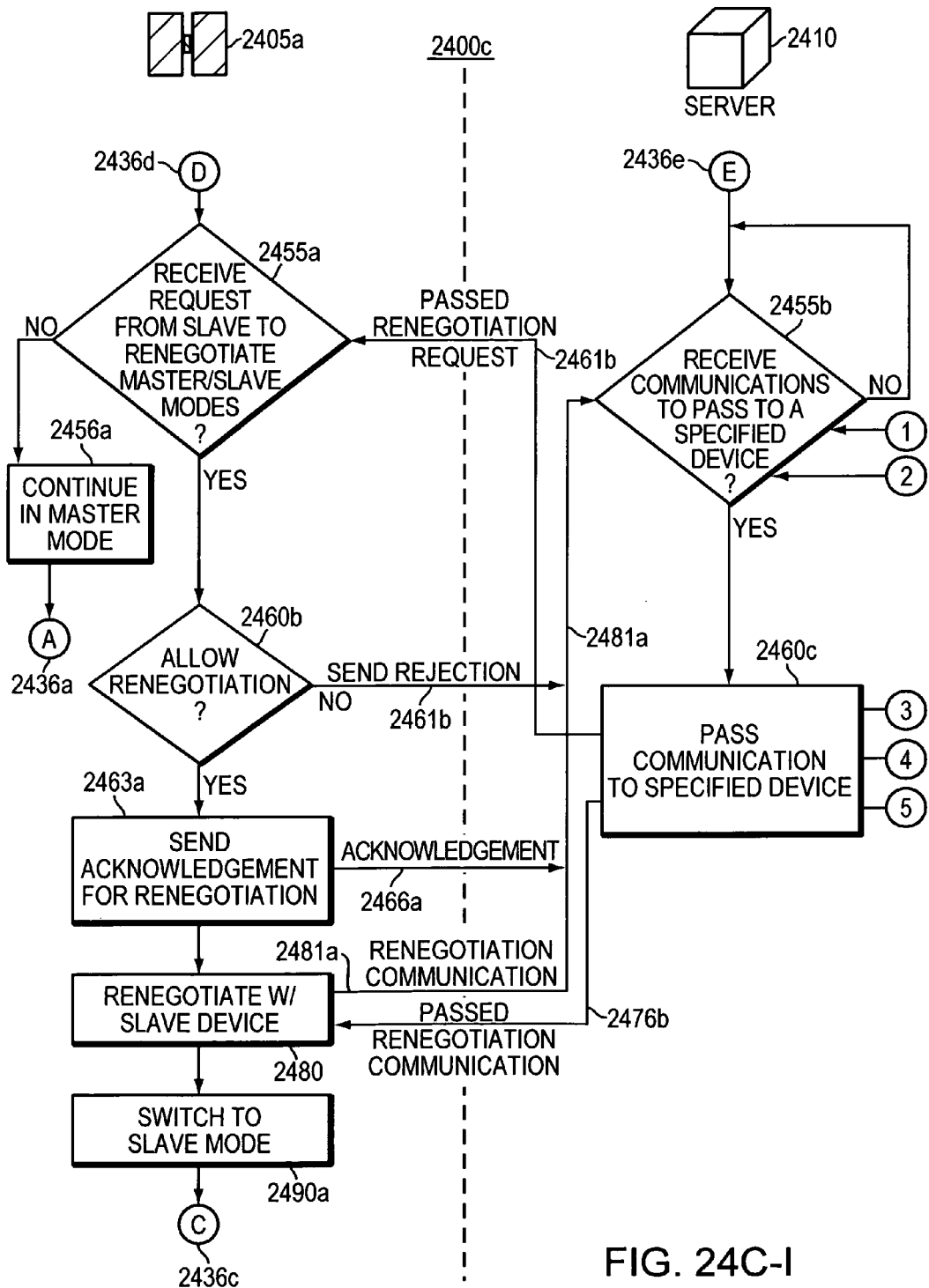

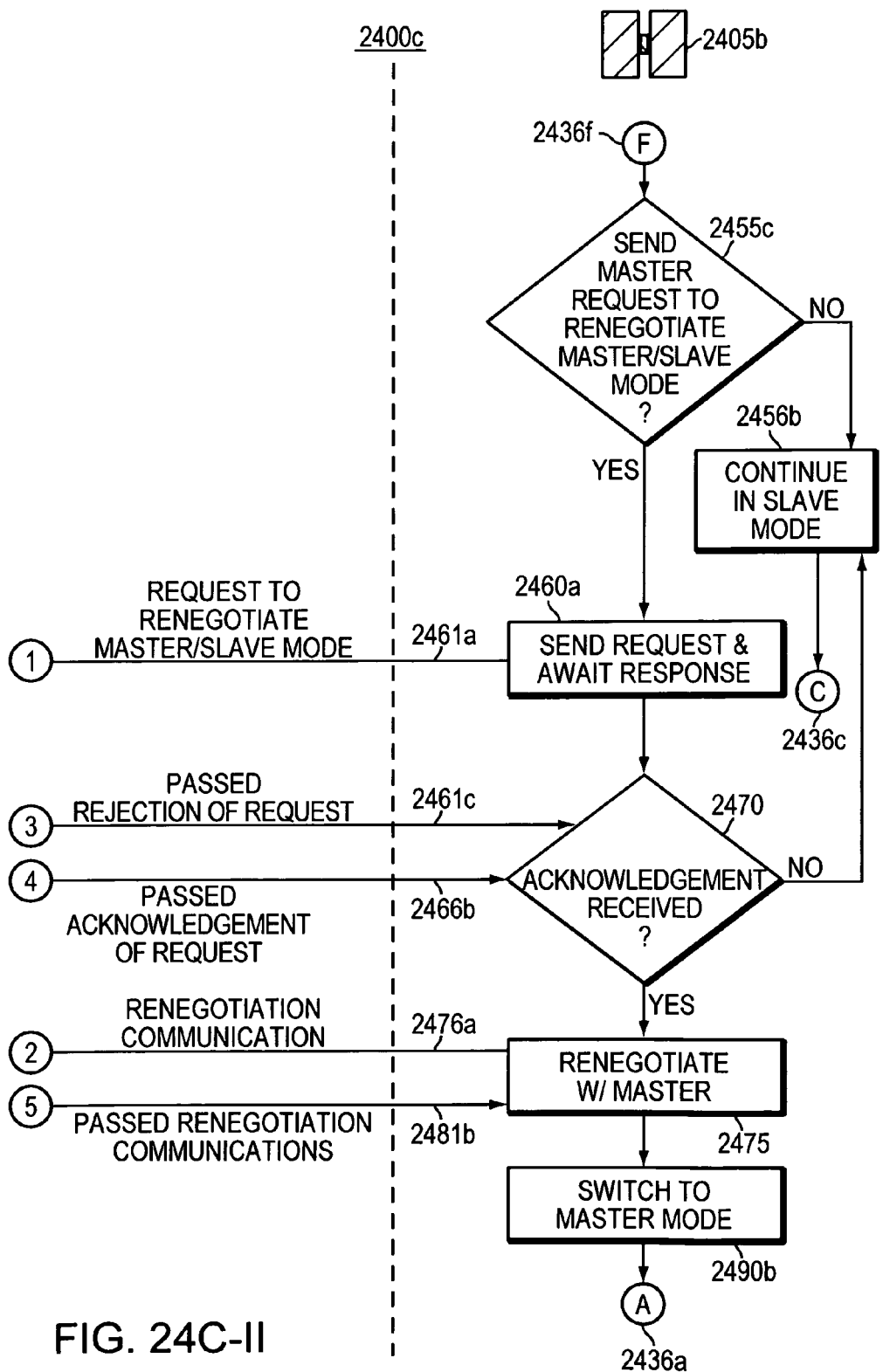
FIG. 24C-II

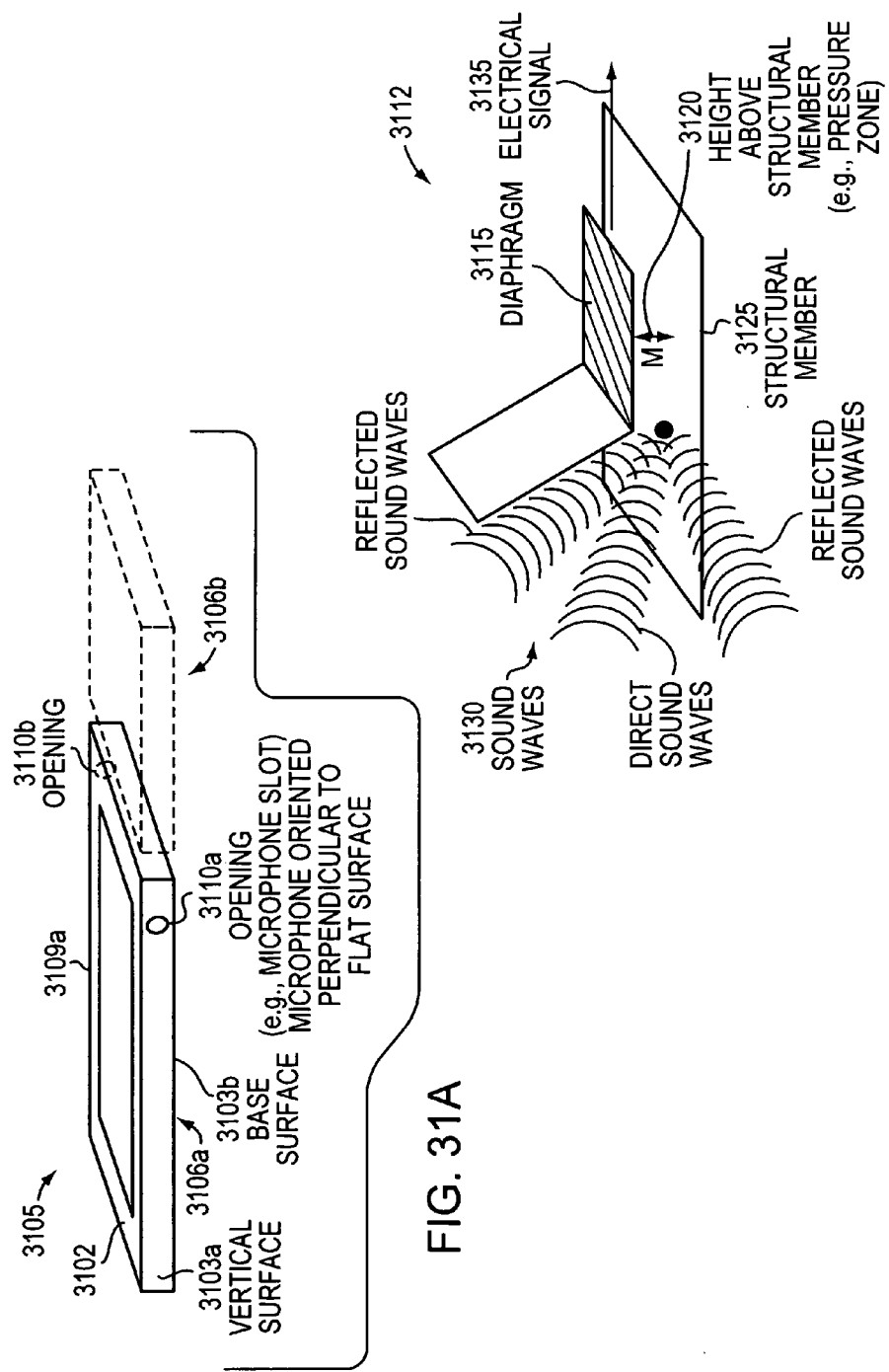

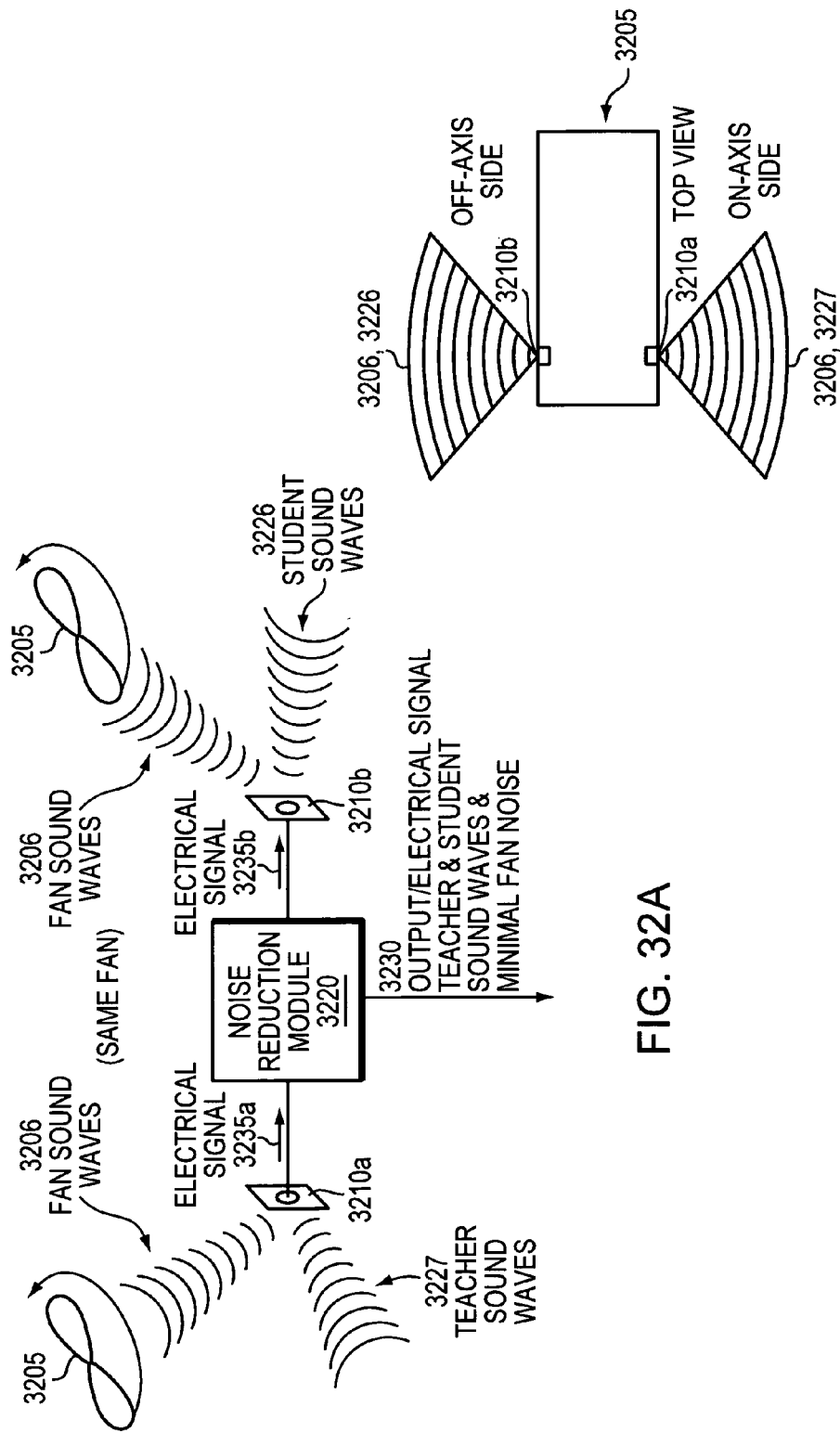

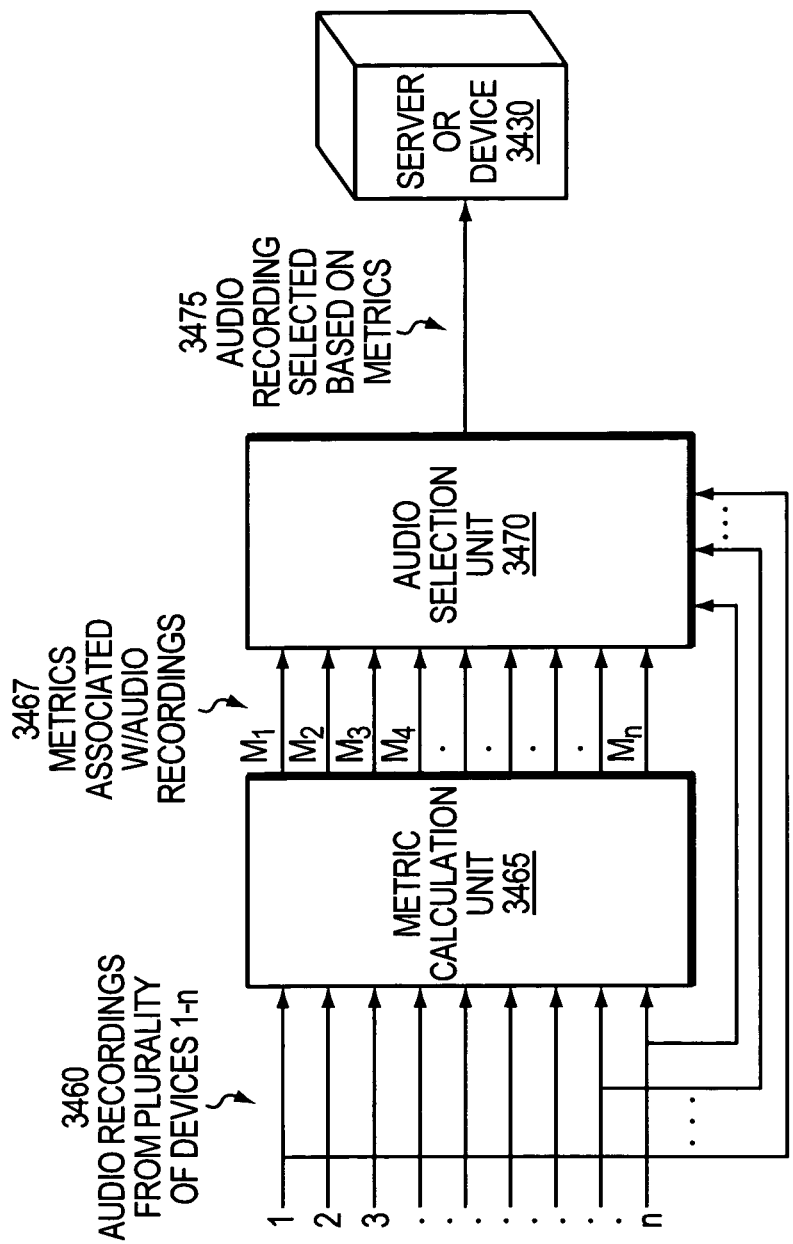

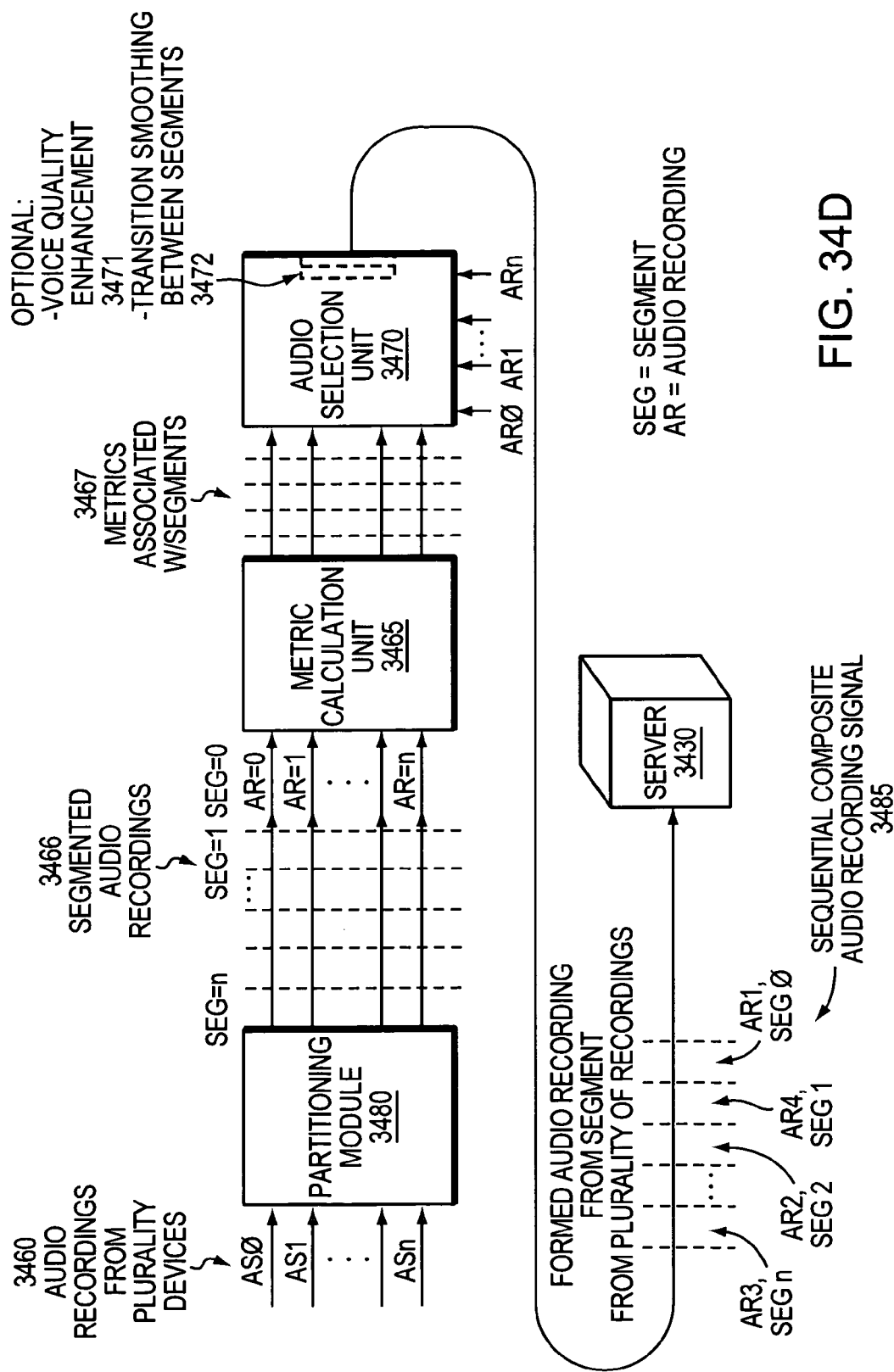

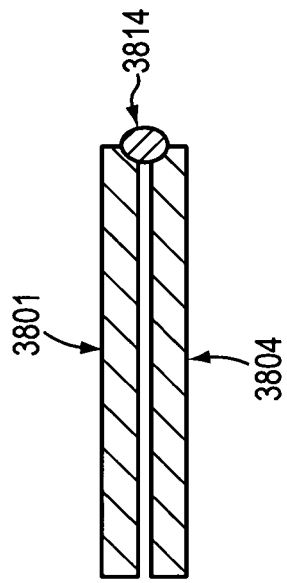
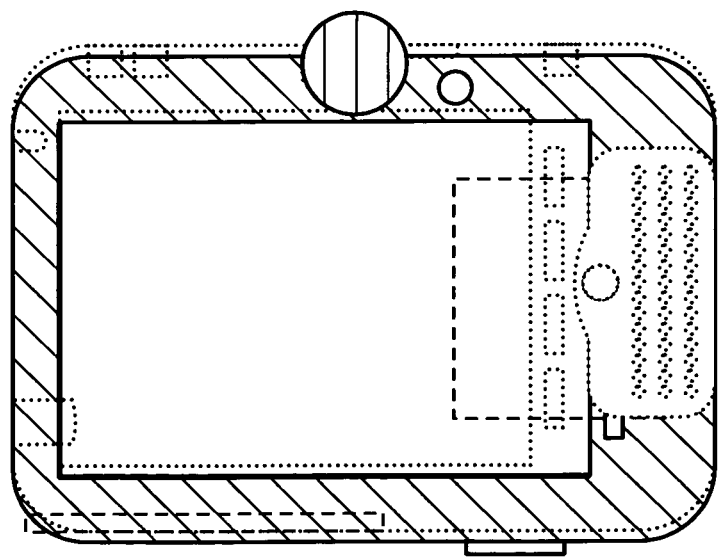
FIG. 38

MULTI-DISPLAY HANDHELD DEVICE AND SUPPORTING SYSTEM

RELATED APPLICATIONS

This application is a continuation of U.S. application Ser. Nos. 12/657,730, 12/657,732, 12/657,733, 12/657,793, 12/657,794, 12/657,797, 12/657,798, all of which were filed on Jan. 26, 2010 now abandoned and are continuations of U.S. application Ser. No. 12/586,632, filed Sep. 24, 2009 now abandoned, which claims the benefit of U.S. Provisional Application Nos. 61/233,473 filed on Aug. 12, 2009, entitled "Multi-Display Handheld Device and Supporting System;" 61/214,550 filed on Apr. 24, 2009, entitled "Method and Apparatus For Transferring Content Between Displays Of Different Types;" and 61/194,887 filed on Oct. 1, 2008, entitled "Dual Screen, Multi-Orientation Computing Device."

The entire teachings of the above applications are incorporated herein by reference.

BACKGROUND OF THE INVENTION

Electronic computing devices such as desktop computers provide users access to vast amounts of information. Such electronic computing devices allow users to create and modify content. Users of electronic devices access multimedia, such as video, audio, and rich content (e.g., color pictures), used for business, personal, or educational purposes.

Demand for access to and creation of content has grown in an ever increasing mobile society. In response, mobile computing devices, such as laptop personal computers (PCs), personal digital assistants (PDAs), cell phones, notebook computers, tablet PCs, and other devices have created and configured to handle a wide variety of access to and creation of content. Many of these devices allow users to gain access to information, content, and multimedia from any location having wired or wireless access to a wide area network, such as the Internet.

As mobile device capabilities increase, power required to operate the devices has also increased. However, such devices have an amount of power depending on a battery capacity within the device in combination with functions provided by the device, such as display brightness, wireless access including voice calls and content uploads and downloads, and content viewing or creation. When power is drained, from the battery the battery needs to be re-charged or the device needs to run off a different power source, such as a wall power converter, also used to recharge the battery.

SUMMARY OF THE INVENTION

Methods, systems, apparatuses, and computer readable mediums with program codes embodied thereon relate to displaying content to a user or enabling a user to manipulate or annotate the content. For ease of reading, the term "system" is used in various portions of the description and may represent some or all forms of embodiments and implementations of the present invention, such as systems, methods, apparatuses, devices, computer readable media, network nodes, and networks.

A system according to an embodiment of the present invention includes a bi-stable display and a refresh display. The bi-stable display may be a grey-scale or color display that has pixels that change states in a bi-stable mode, meaning the pixels change states from one color to a different color, such as from black to white or white to black or red to green or green to red, at low power levels, such as consuming energy as a function of logic gate capacitance. It should be understood that the term "bi-stable" is a general term that may include future developed state-based displays, such as tri-stable displays (e.g., red, yellow, green) or quad stable displays (e.g., cyan, magenta, yellow, black). The bi-stable display generally has a low refresh rate (e.g., 1 second) but consumes extremely low power in a given state (e.g., microwatts, nanowatts, or femtowatts). The refresh display may be a liquid crystal display (LCD), plasma display panel (PDP), or light emitting diode (LED) display that requires continuous refreshing, which consumes power at milliwatt or multi-watt levels, but provides high rates, such as hundreds of hertz or kilohertz, making refresh displays suitable for video display (e.g., 30 frames/second) and network browsing (e.g., display of content-rich websites). It should be understood that the term "refresh display" is included in a category of non-bi-stable displays that have higher refresh rates than bi-stable displays. As used herein and unless otherwise specified, the term "display" refers to multiple components, including electronics and image generating components, used to render an image to be viewed by a user or may refer only to an external surface (i.e., screen) via which an electronically generated picture or image is formed.

A controller may be operationally coupled to the displays and configured to select the bi-stable display or the refresh display via which to render an image representing content as a function of the user interaction with at least one of the displays and criteria defined by operational characteristics of the displays.

The controller may include a bi-stable display controller and a refresh display controller, each controller being configured to determine whether user interaction with its respective display is within the operational characteristics of its respective display, and, if within, to render an image responsive to the user interaction thereby, and, if not within, to cause, notify, or request the other controller to render an image on its respective display responsive to the user interaction. Alternatively, the controller(s) may be further configured to render an image responsive to the user interaction via one of the displays that is more suited to render the image than the other display based on the comparison of the criteria of the display specific to the user interaction. The criteria may include at least one of the following criteria: power, refresh rate, color, image motion (e.g., video), speed, page refresh, resolution, content format, and media type.

In the case in which the controller includes a bi-stable display controller and a refresh display controller, the bi-stable controller may be configured to cause the refresh display controller to render an image via the refresh display based on the user interaction via the bi-stable display. Further, the refresh display controller may be configured to cause the bi-stable controller to render an image via the bi-stable display based on user interaction via the refresh display.

The bi-stable display controller may also be configured to pass messages to the refresh display controller via an operating system to cause the refresh display controller to render images via the refresh display. In addition, the refresh display controller may also be configured to pass messages to the bi-stable display controller via the operating system to cause the bi-stable display controller to render images via the bi-stable display.

The controllers may be configured to pass the messages to each other responsive to user interaction, and the messages may include pointer(s) to object(s) stored in a memory accessible to each controller. In this example embodiment, the controllers are configured to access the object(s) in the memory using the pointer(s) and to render at least a portion of the object(s) via the respective displays. Alternatively, the messages that the controllers are configured to pass to each other responsive to user interaction may include content to be rendered via the other controller's display. The controllers may be further configured to render at least a portion of the content via their respective displays.

The controller(s) may be further configured to receive an indication of a user's interaction with a representation of a respective image rendered via the bi-stable display or the refresh display. The controller(s) may further be configured to receive the user interaction via a human-to-machine interface other than through interaction with the representation of the respective image, such as via physical or virtual buttons that enable the user to respond to a query or enter information to cause a state change of an image or device.

The controller(s) may also be configured to render images in an orientation selectable manner via either or both displays, wherein orientation of the rendered images may be selected by the user or determined by an orientation of the display with respect to the viewing angle of the user.

The controller(s) may be configured to configure at least one of the displays with multiple virtual displays with different angular viewing orientations. The controller(s) may also be configured to render an image simultaneously on each of the virtual displays. The controller(s) may also be configured to accept user interaction simultaneously from each virtual display. Further the controller(s) may be configured to render the image on the multiple virtual displays in a synchronous manner or in an asynchronous manner.

An interface module may be operationally coupled to the controller(s) and configured to communicate with another system, such as a server or other system with bi-stable and refresh displays, optionally via wired, radio-frequency (RF) wireless, or optical signaling. In such an embodiment, the controller(s) may be further configurable to have access, via the interface module, limited to (i) data from a specified source, or (ii) functions specified by the other system.

The system may further comprise a master/slave module operationally coupled to the controller(s), in which case the master/slave module may be configured to act in a master mode or a slave mode. While acting in the master mode, the master/slave module may control a controller of another system that employs a master/slave module acting in a slave mode. While acting in a slave mode, the master/slave module may accept commands from a controller of another system that employs a master/slave module acting in a master mode. The master/slave module may further be configured to operate in a peer-to-peer network arrangement with a master/slave module of the other system.

In an embodiment including an interface module and master/slave module, the interface module may be configured to communicate with a central server and be operationally coupled to the controller(s) and master/slave module. In some embodiments, the master/slave module, acting in a master mode, is configured to control other system(s) via communications with the central server, and the master/slave module, acting in a slave mode is configured to accept commands from (a) the other system acting in a master mode responsive to communications via a central server or (b) the central server itself acting in a master mode.

Another example embodiment of the present invention includes a system to display content to a user.

This embodiment of the system includes a display having an upper edge and a lower edge. A controller may be operationally coupled to the display and configured to split the display into multiple virtual displays with different orientations relative to the lower edge. The controller may further be configured to render an image representing content simultaneously in multiple respective orientations via the multiple virtual displays. Further, the controller may enable interaction with the image by user(s) via the multiple virtual displays.

The multiple virtual displays may include a rightside-up virtual display and an upside-down virtual display relative to the lower edge. The display may further include a left edge and a right edge, and the controller may further be configured to reorient at least one of the virtual displays relative to the display in a manner in which at least one of the virtual displays is rightside-up or upside-down relative to the left edge or the right edge.

The controller may be further configured to render the image on multiple virtual displays in a synchronous manner or an asynchronous manner.

Another example embodiment of the present invention includes system to store annotations applied by a user, who may be an individual or other entity, to a primary source (e.g., contents of a book). Information may be associated with a representation of an annotation. The information may include many forms of data, such as a unique user device indicator associated with a device via which the annotation was applied relative to the primary source by a user, an identifier of the primary source to which annotation was applied, and a positional indicator to where the annotation was applied relative to the primary source. Further, the representation may be stored with the associated information on a storage device to store the annotation applied to the primary source in a manner enabling retrieval and later display of the annotation and its associated information with respect to the primary source substantially the same as authored by the user.

Annotations may be bundled by the user according to an identifier (ID) associated with the user or an ID associated with the device. The annotations may be advertised by the user to other users, and a representation of the annotations with its associated information may be transferred to a device of a user requesting the annotations.

A fee may be collected from the other users for the transferring of the representation with its associated information to their devices. At least a portion of the fee may be transferred as value, monetary or otherwise (e.g., credit toward service provider service plan fees), to the user who generated the annotations.

The annotations may include at least one of the following: handwriting, typed text, links, attachments, highlights, tags, sound, video, binary data, multimedia, reference, or content external from the primary source.

The representation of the annotation with its associated information may be transferred to another storage device. The representation may be managed with its associated information. A user may be able to manage which information is stored. Further, the user may be able to manage what happens with the representation once stored.

The annotations may include first and second annotations made by first and second users, respectively. The first and second users may create the first and second annotations in a collaborative working environment, such as in a classroom or tutorial session. Representations of the first and second annotations may include a collaborations-indication code. The collaborations-indication code may include indications of multiple users annotating the primary source at the same time via the device. The representation may also include an indication representing a viewing angle as to a direction with respect to the edge of the device from which the user made the annotation.

The annotations may also include a unique annotations ID. Users may be enabled to edit the annotations and create child annotations. The child annotations may also be assigned unique annotation IDs that may be encoded to incorporate an associated parent annotation ID. In addition, each edited annotation may be assigned a unique annotation version ID.

Yet another example embodiment of the present invention includes a system to transfer content between displays of different types. The system may comprise a bi-stable display controller and a refresh display controller. The bi-stable display controller may be (i) configured to accept user interaction with content rendered in a bi-stable display format on a bi-stable display and (ii) configured to cause the bi-stable display to render, in a bi-stable format on the bi-stable display selection of the content rendered on refresh display responsive to communications from the refresh display controller, where the selection represents user interaction with content via the refresh display. The refresh display controller may be (i) configured to accept user interaction with content rendered in a refresh display format on the refresh display and (ii) configured to cause the refresh display to render, in a refresh display format on the refresh display, a selection of the content rendered on the bi-stable display responsive to communications from the bi-stable display controller where the selection represents user interaction with content via the bi-stable display.

The bi-stable display controller and the refresh display controller may further be configured to accept user interaction with content rendered on the bi-stable display or the refresh display, respectively, by enabling the controllers to allow a user to define the selection of the content to be, for example, within an area of a geometric shape having a property specified by the user. The bi-stable display controller and the refresh display controller may also enable the user to define the property as a size or shape of the geometric shape by indication of at least two points used to define the geometric shape via interaction with a given display. The interaction with the given display may be via continuous motion of contact within the given display between the at least two points or via discrete contact with the given display at the at least two points.

The bi-stable display controller may enable the user to view the selection on the refresh display by signaling the refresh display controller to render the selection on the refresh display. Similarly, the refresh display may enable the user to view the selection on the bi-stable display by signaling the bi-stable display controller to render the selection on the bi-stable display.

The controllers may communicate selections to each other in a manner involving memory.

The displays may be touch-screen enabled displays, in which case the controllers are operationally coupled to the touch-screen enabled displays to accept the user interaction.

Another example embodiment according to the present invention includes an electronic computing device and corresponding method to capture sound. A chassis defining an opening may be configured to pass sound waves from an exterior of the chassis to an interior of the chassis. A diaphragm of a microphone, in an interior of the chassis in acoustical arrangement with the opening and in parallel arrangement with a structural member at a distance to form a pressure zone sensitive to sound waves, vibrates or is displaced in a controlled manner as a function of sound waves in the pressure zone. The distance is known to mitigate interference caused by a phase difference between a direct sound wave and a reflected sound wave each emanating from a common source and each entering the pressure zone via the opening; the reflected wave is substantially the same as the directed sound wave but reflected off a surface external from the chassis. The microphone may be configured to produce electrical signals representative of at least the direct and reflective sound waves based on their combined effect on the diaphragm.

The chassis may include a base and a vertical surface extending therefrom, in which case the chassis may define the opening through a vertical surface of chassis.

Alternatively, the chassis may define two openings through different surfaces to enable sound waves to be sensed by respective microphones, each including a diaphragm and structural member defining a pressure zone. The chassis may include a base and opposing vertical surface extending therefrom, with the different surfaces being opposing vertical surfaces of the chassis. In this dual microphone example embodiment, a noise reduction module may process first and second electrical signals produced by the microphones as a function of sound waves entering the respective pressure zones. The noise reduction module may further be configured to output a noise reduced signal by subtracting the first electrical signal from the second electrical signal.

It should be understood that more than two microphones may also be employed, and the noise reduction module may be configured to produce a noise reduced signal as a function of any combination of the signals.

The opening(s) may enable the sound waves to pass without attenuating the sound waves.

The chassis may include two displays coupled by a rotational hinge. The displays may include a bi-stable display and a refresh display.

Software may be configured to record sound waves via the microphone(s) and to enable a user to annotate content, presented on at least one of the displays, with recorded sound in a selectable manner. In addition, a state of the device may be associated with the recorded sound waves.

Another example embodiment of the present invention includes a computing device and corresponding method to display content to a user. Images may be rendered on a bi-stable display and on a refresh display of the computing device. A controller may control activity of the bi-stable display and the refresh display in a power conserving manner.

The computing device may include a battery, and the controller may include a power savings module configured to extend battery operating life between recharges compared to battery operation absent the power savings module. The power savings module may enable the battery operating life to be available for at least eight hours. Further, the power savings module may include a display monitoring module configured to detect use of the displays. The power savings module may further be configured to power down, dim backlighting, or hibernate the displays based on position or use of the displays. The power savings module may further comprise an internal/external peripheral monitoring module configured to detect use of internal/external peripheral devices, and the power savings module may power down or hibernate the internal/external peripheral devices based on use of the internal/external peripheral devices.

In addition, the power savings module may further include a wireless on/off module configured to turn on or turn off wireless capabilities for increased power savings on a continuous-until-changed basis or a temporary basis. Further, the wireless on/off module may be configured to monitor periodically for pending incoming/outgoing messages by automatically activating and deactivating wireless capabilities. The messages may include email, Short Message Service (SMS) text messages, or multi-media messaging service (MMS) text messages, for example.

A hinge mechanism may couple the bi-stable display and refresh display. The hinge mechanism may be configured for multidirectional movement of the displays relative to each other.

The hinge mechanism may allow at least a subset of the following: the displays to be in an orientation in which the displays are adjacent to each other to allow the images rendered on the displays to be simultaneously viewable; the displays to be in an orientation in which the displays substantially overlay each other and images rendered on the displays are not simultaneously viewable based on the orientation; the displays to be in an orientation in which the displays substantially overlay each other and images rendered on the displays are simultaneously viewable based on the orientation; and the displays to be in an orientation in which the displays substantially overlay each other and images rendered on only one of the displays are viewable based on the orientation.

A display device sensor may sense orientation of the displays relative to each other or relative to the hinge mechanism. The display device sensor may send multi-power mode sensor signals to a processor configured to control an operating state of at least one of the displays.

The computing device may include an attachable keyboard. The attachable keyboard may be configured to operate with the computing device via an electrical or wireless connection.

Another example embodiment of the present invention includes an apparatus and corresponding method to couple displays of a computing device mechanically. A first interface element may be configured to attach to a first display, and a second interface element may be configured to attach to a second display. A hinge may be coupled to the first and second interface elements and configured to enable the first and second interface elements to move multi-directionally relative to each other.

The hinge may further enable the first display to overlay a substantial portion of the second display. The hinge may be configured to move in at least one of the following ways: fold at an angle greater than ninety degrees in at least one dimension to enable a user to arrange the displays in a folded-open or a folded-closed orientation; and rotate greater than ninety degrees to enable a user to arrange the displays to be in a rotated-open or rotated-closed orientation.

The first and second interface elements may pivot multi-directionally. The hinge may conduct power and informational signals between the displays. In addition, the hinge may form a cavity configured to support a wiring harness. A sensor may sense an orientation of the hinge. Further, the sensor may sense orientations of the first and second interface elements.

Another example embodiment of the present invention includes a method of processing audio recordings. Information may be associated with a representation of an audio recording. The information may include a unique user device indicator associated with a device via which at least a portion of the audio recording was captured. The information may also include a collaboration-indication code identifying other devices active during a session in which the device captured the audio recording. The information may also include an identifier of a session during which the device captured at least a portion of the audio recording. The representation of the audio recording may be stored with its associated information on a storage device in a manner enabling retrieval and playback of the audio recording and identification of other devices active during the session.

Metrics of captured audio recordings may be calculated based on a set of criteria. An audio recording may be selected based on the metrics, and the audio recording may be stored at a central server or at least one of the plurality of devices. The set of criteria may include at least one of the following example criteria: signal-to-noise ration (SNR), Sound Pressure Level (SPL), echo, signal power, audio range, and distortion.

Calculating metrics may include partitioning each audio recording into multiple sequential segments and calculating a metric for each segment in each audio recording. Further, selecting an audio recording based on the metrics may include comparing the metrics associated with each corresponding segment of each audio recording and selecting segments based on results of the comparing. The selected segments may be arranged to form a sequential composite audio recording. Voice quality enhancement may be applied to the sequential composite audio recording. Transition between segments associated with different audio recordings of the composite audio recording may be smoothed.

In yet another embodiment, a method for processing audio recording may include recording audio signals at a device. User interaction with the device during the recording of audio signals may be monitored. The audio recording may be associated with the user interaction in a manner enabling synchronized playback of the audio signals and the user interaction.

It should be understood that the foregoing example embodiments, or aspects thereof, may be combined in systems, devices, methods, etc. to form various combinations of same.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 14A-D are schematic diagrams illustrating orientations of a device with respect to a viewing angle of a user;

FIG. 24A-C are flow diagrams of methods of operating a plurality of devices each acting in a master or slave mode using an intermediate server in accordance with an example embodiment of the present invention;

FIG. 31A is a schematic diagram of location(s) of a microphone on a device;

FIG. 31C is a schematic diagram illustrating conversion of sound waves into electrical signals by the microphone of FIG. 31A;

FIG. 32A is a schematic diagram of a noise reduction module operationally coupled to a plurality of microphones associated with a device;

FIG. 32D is a schematic diagram of a device capturing sound via microphones each positioned on a different edge of the device;

FIG. 34C is a block diagram of a metric calculation unit and an audio selection unit used to process audio recordings;

FIG. 34D is a block diagram of a partitioning module, metric calculation unit, and audio selection unit used to process audio recordings;

FIG. 38 is a schematic diagram that illustrates a device in a folded, open position state in which fronts of displays of the device face outward away from each other;

DETAILED DESCRIPTION OF THE INVENTION

Figure 1:
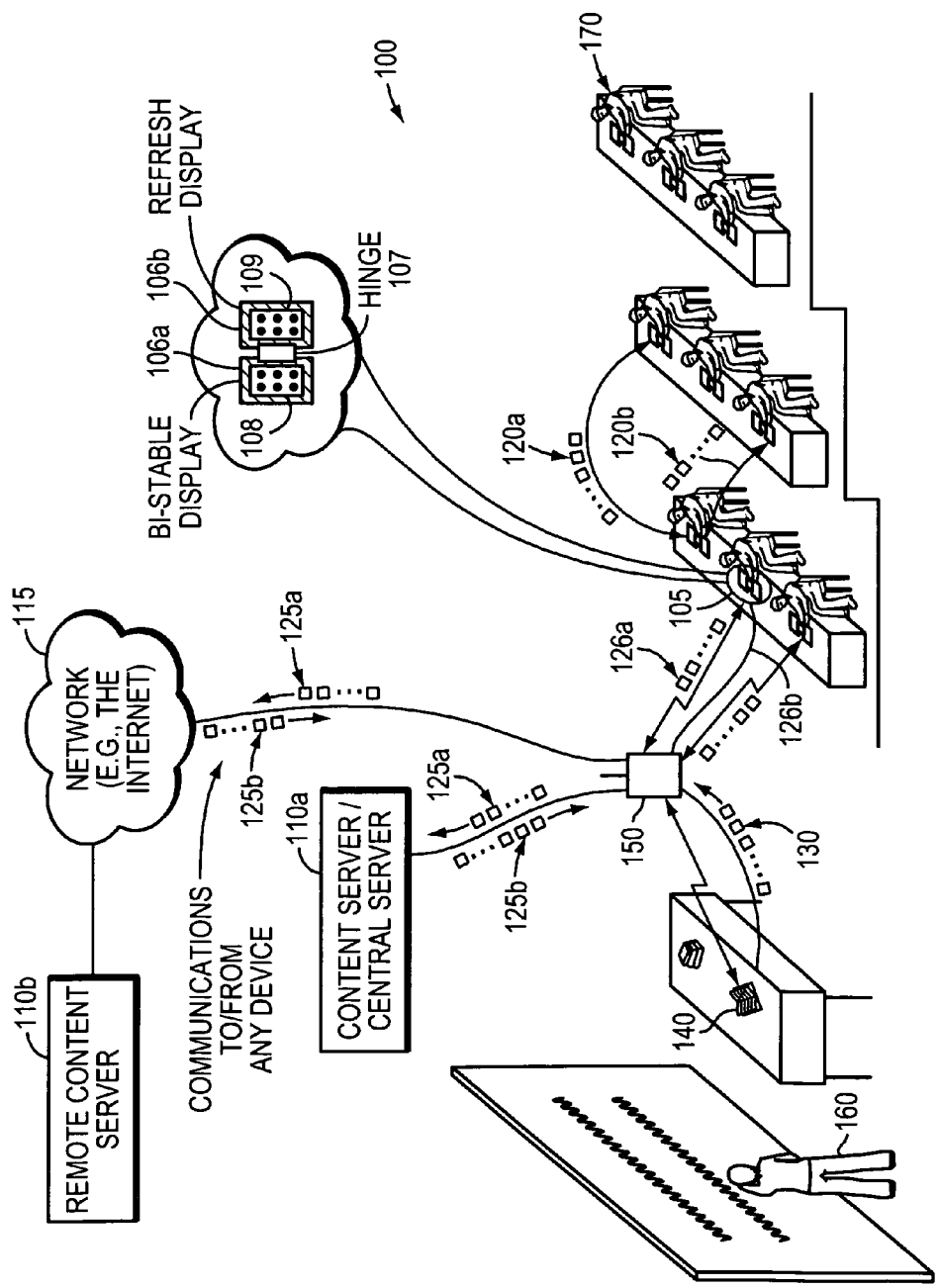
FIG. 1 is a diagram of an electronic device ("device") having one or two displays, in accordance with an example embodiment of the present invention, being used in a classroom setting.

A description of example embodiments of the invention follows.

In many instances throughout the following description, example embodiments of single or dual display devices, elements employed therein, systems, network servers, networks and corresponding methods are described in reference to a classroom environment and textbooks used by students in a class. However, the classroom environment is just a convenient example in which the example embodiments may be employed. Other example environments are mentioned interspersed hereinbelow. Environments in which the example embodiments may be employed are as diverse as environments in which computers and hand-held computing devices are employed.

The cost of paper, and consequently textbooks, is increasing; the number of textbooks carried by students is increasing. An embodiment of the present invention serves to replace the weight of textbooks and reduce cost of the textbooks by enabling students to access textbooks, work, and notes (e.g., digital annotations or self-contained notes files) in an electronic environment.

Current approaches to paperless textbooks and notebooks use single screen laptop computers. Laptop computers consume too much power and cannot be used without recharging or charging its battery for extended periods of time, such as an entire school day. Many classrooms are not equipped with sufficient power outlets for all student to plug-in their laptops. Additionally, laptop power cords may not have sufficient reach to have access to a power outlet, and, if each student requires access to a power outlet, the classroom becomes cluttered with laptop power cords.

To address the power issue, an electronic device that consumes less power than a laptop computer may be employed. An example of such a power-savings electronic device is an Electronic Paper Display (EPD). An EPD is a form of a bi-stable display, meaning it toggles display pixels using very little energy, and display pixels maintain their respective states using no or negligible energy. The states include black or white, or different states of spectral color, and the density of pixels enables the display pixels to be coordinated in groups to form black and white or grey-scale (or color) images. Pixel state stability allows for very low power consumption.

Current electronic book devices based on EPD technology have single display screens. EPD devices are limited in functionality due to their slow refresh rate and grey-scale only images. Because textbooks (and other forms of publications) use many colors and pictures, an electronic textbook replacement should be able to display colors in a manner in which refresh displays (e.g., light emitting diode (LED) displays) do. Further, computers and handheld devices allow for video, and users have come to expect electronic devices to provide that level of functionality, too, not to mention audio and other electronic device functionality that has become ubiquitous in the electronic and wireless device age.

An embodiment of the present invention integrates bi-stable display technology and refresh display technology into a single device and manages the use of these technologies to achieve power savings functionality while providing a rich set of display functionality in a synergistic manner. The power savings functionality enables the device to have a battery operating life between charges of many hours of operation, such as eight hours or more.

Thus, an embodiment of the present invention integrates today's two best technologies for reading text and displaying images—still or in motion—in a manner that is greater than the sum of its parts. This integration is well-suited for textbook replacement.

FIGS. 1-5 provide an overview of the device, an example user environment in which the device may be employed, various embodiments and operating modes of the device, and network configurations and operations within which the device may operate. Thereafter, the figures illustrate details and other examples of the device network, operations, and so forth.

FIG. 1 is a diagram of an electronic device having two displays ("device") 105, in accordance with an example embodiment of the present invention, being used in a classroom setting 100. A teacher 160 is providing classroom instructions to a group of students 170. The students 170 are following classroom instructions using respective devices 105. Each device 105 includes a bi-stable display 106a and a refresh display 106b, coupled together by a hinge 107. The bi-stable display 106a renders images 108 in a bi-stable display format, while the refresh display 106b renders images 109 in a refresh display format.

The teacher 160 may provide students 170 with classroom materials through data messages 130 via an electronic device 140 to student devices 105. The teacher's electronic device 140 may be a laptop computer, desktop computer, personal digital assistant (PDA), or device 105 that the students are using. The students 170 may receive classroom materials from the electronic device 140 via a wireless router 150, which may pass the data messages containing the classroom materials through a wireless connection 126a or through a physical link 126b. Classroom materials may include handouts, homework assignments, textbooks, articles, notes, annotations or any other material that the teacher 160 may deem as educational for the students 170.

In addition, students 170 may pass classroom materials to each other through device-to-device communications 120a, 120b. Further, students 170 may obtain access to content through a central server 110a or a remote content server 110b accessible through a network 115, such as a Wide Area Network (e.g., the Internet) or a local area network (LAN). The students 170 may send requests 125a for classroom content or other information to either the central server 110a or remote content server 110b. The central server 110a or remote content server 110b may respond with messages 125b acknowledge the request and containing the requested content or information relating to same. The content may include handouts, homework assignments, textbooks, articles, notes, annotations or any other material.

The device 105 enables display of images of any type in format(s) students have come to expect, yet, optionally or controlled, in a power efficient manner. The device 105 may be selectively configured in various and mechanical orientations by the students, and the visual display and access to information to be displayed may be controlled by the students 170 or overridden individually or collectively by the teacher 160. These and many other features are described in further detail below.

Figure 2:
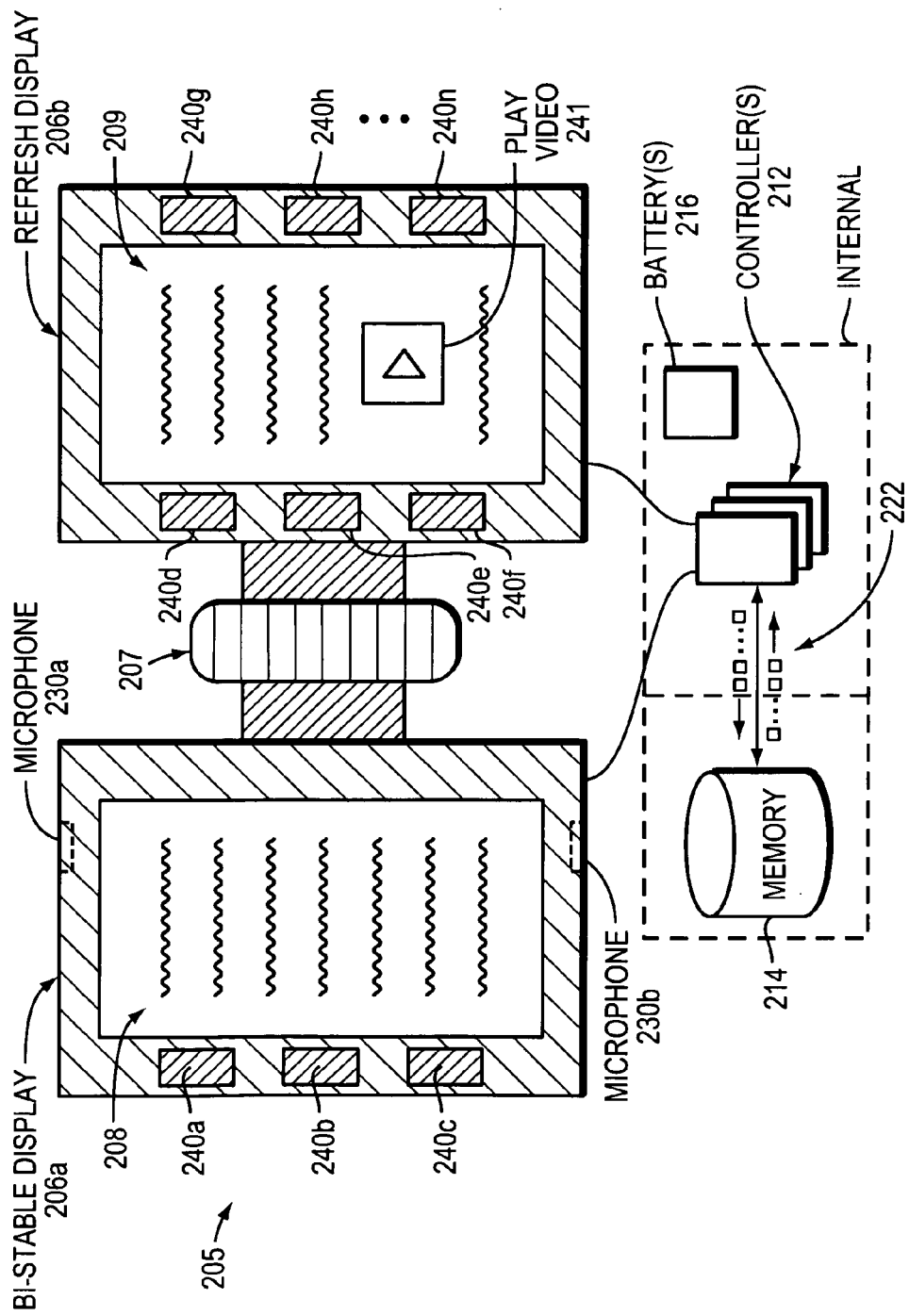
FIG. 2 is a schematic diagram of a device having a bi-stable display and a refresh display operationally coupled to controller(s) and memory in accordance with an example embodiment of the present invention.

FIG. 2 is a schematic diagram of a device 205 having a bi-stable display 206a and a refresh display 206b operationally coupled to controller(s) 212 and memory 214 in accordance with an example embodiment of the present invention. The bi-stable display 206a may be mechanically and electrically coupled to the refresh display 206b via a hinge 207. The device 205 may include several user control buttons 240a-n, microphone(s) 230a-b, and battery(s) 216. The controller(s) 212 and memory 214 are internal to the device 205, but also may be externally connected to the device 205 in alternative embodiments.

The bi-stable display 206a renders images in grey-scale similar to or the same as an electronic paper display (EPD). The bi-stable display 206a is designed to mimic the appearance of ordinary ink on paper. Unlike a conventional flat panel display, which uses a backlight to illuminate its pixels, an electronic paper display reflects light like ordinary paper and is capable of holding text and images indefinitely or effectively indefinitely without drawing electricity, while allowing the image to be changed. Therefore, the bi-stable display 206a is an extremely low power device that retains an image in a zero or very low power state.

Bi-stable displays are considered more comfortable to read than conventional displays. This is due to a stable image, which does not need to be refreshed constantly, wider viewing angle, and reflection of ambient light rather than emission of light. The bi-stable display 206a can be read in direct sunlight without images becoming difficult to see due to glare or overexposure from the sunlight. However, the bi-stable display 206a has a slow refresh rate, similar to other EPD devices, as compared to Liquid Crystal Display (LCD) technologies. This slow refresh rate discourages device manufacturers and software developers from implementing sophisticated interactive applications (e.g., using fast moving menus, mouse pointers, or scrolling) like those which are possible on handheld computers. Examples of functions negatively impacted by a slow refresh rate include zooming in or out of images, scrolling images, and replacing images with other images, where the images may be text or graphics, for example. An example in which the slow refresh rate is particularly noticeable is in navigating webpages or other on-line content-rich images provided by network servers.

Continuing to refer to FIG. 2, as stated above, the bi-stable display 206a in this example embodiment is coupled to the refresh display 206b. The refresh display 206b can be any display useful for rendering graphics, video, or images that are not easily rendered on the bi-stable display 206a, such as due to lack of color or slow refresh rate reasons. Examples of the refresh display 206b may be a display, such as a Liquid Crystal Display (LCD), Plasma Display Panel (PDP), or Light Emitting Diode (LED) display.

User interaction that may require a higher refresh rate than that which is supported by the bi-stable display 206a may be supported by the refresh display 206b. For example, an image 209 may be a video, activated by a mechanical button 240d or virtual button 241, that is better displayed at a high refresh rate, and the video is, therefore, displayed on the refresh display 206b rather than the bi-stable display 206a, albeit at a higher rate of power consumption than were it displayed on the bi-stable display 206a.

Selection of whether to render an image on the bi-stable display 206a or the refresh display 206b may be controlled by the controller(s) 212. The controller(s) 212 may select a display on which to render an image as a function of operational characteristics of the displays 206a, 206b and user interaction with the device, display(s), or image(s).

The memory 214 may store content to be rendered by either the bi-stable display 206a or refresh display 206b, operational characteristics of either display, and information relating to user interaction with either display. The controller(s) 212 may communicate with the memory 214 via messages 222. The communication may include a request from the controller(s) 212 to the memory 214 for information related to content to be rendered via either of the displays, operational characteristics of either display, and information related to user interaction with either of the displays. Upon receiving such a request, the memory 214 supplies the controller(s) 212 with the requested information, thereby enabling the controller(s) 212 to render an image on either display based on the received information from the memory 214.

The microphone(s) 230a-b may be mechanically coupled to either of the displays or hinge 207 and operationally coupled to the controller(s) 212. The microphone(s) 230a-b may be positioned on the device 205 in a manner enabling mitigation of interference caused by a phase difference between a direct sound wave and a reflected sound wave from a common source. In addition, the microphone(s) 230a-b may be positioned on the device 205 in a manner facilitating reduction of unwanted ambient sound detected by the microphone(s) 230a-b. In addition, the sound recorded by the microphone(s) 230a-b may be related to the image(s) 208 or 209, and stored and retrieved with relation thereto, using memory 214, by the controller(s) 212.

Figure 3:
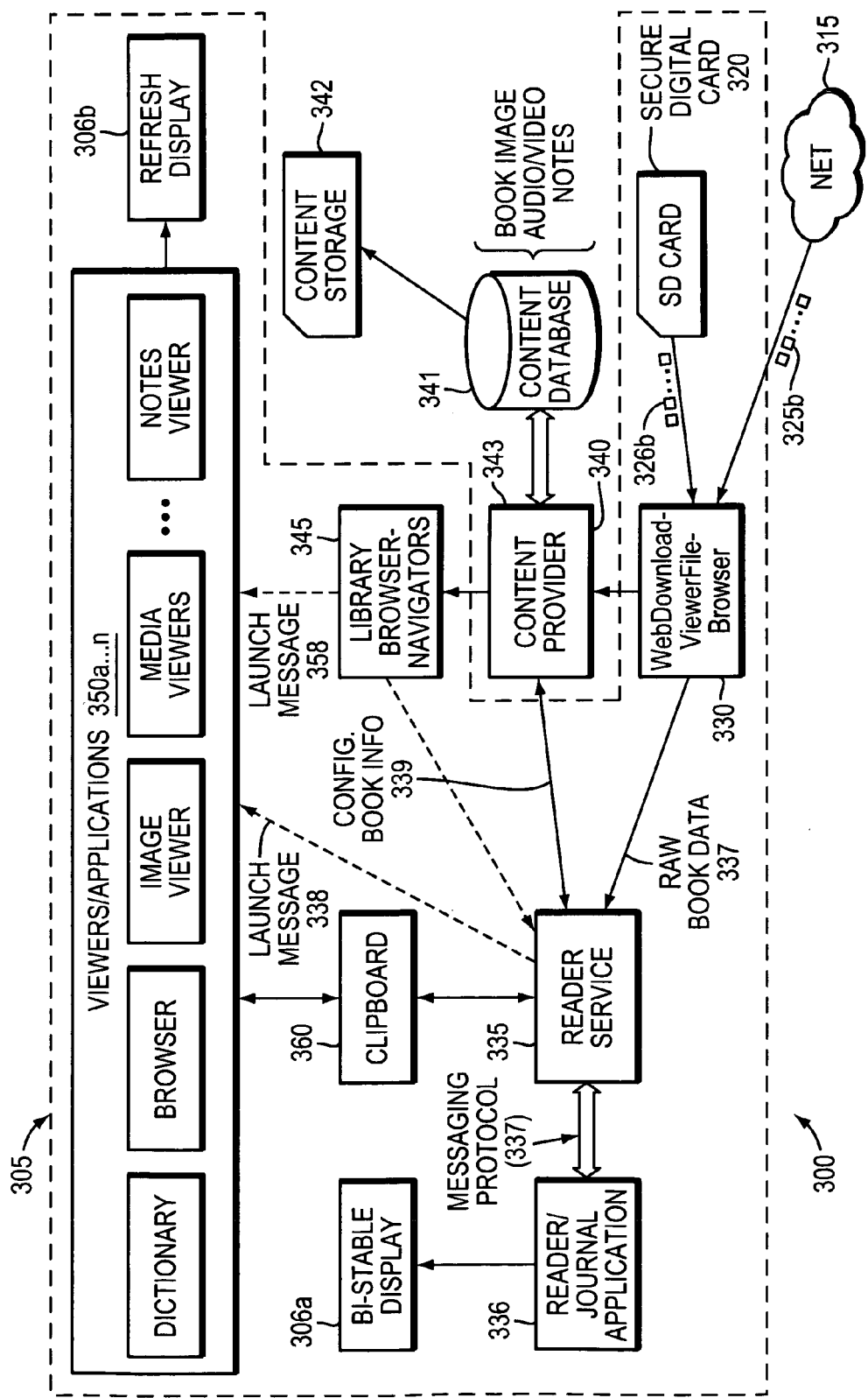
FIG. 3 is an architectural diagram of a software in the device and of a system with which a device may be associated.

FIG. 3 is an architectural diagram of software in the device 305 and of a system 300 with which the device 305 may be associated. In this example, the device 305 includes a bi-stable display 306a and a refresh display 306b. A content database 341 (also referred to herein as a library) is a repository for a student's class content, including, for example: books and handouts, images, video, audio, or combinations thereof. Records in the content database 341 may describe a single piece of content and may also or alternatively describe the properties of the content and where the referenced content is located in the content storage 342.

Content may be added to the content database 341 via a network, such as the Internet, or from local storage e.g., Secure Digital (SD) card or browser application 330. Content may be stored in internal or external storage (e.g., a plug-in (SD card)). Alternatively, the content database 341 may reside in internal flash memory. The content database 341 may be managed by a content provider 340. The content provider 340 in some embodiments allows access to the content using content Uniform Resource Identifiers (URIs). For example, books may be added to the database indirectly by first passing through a reader application 335 by way of a reader service 335. This may be done in order to extract a common set of information about the book, such as author and title or for other traditional or non-traditional reason.

A reader/journal application 336 decode downloaded raw book content, allowing conversion and rendering of document formats, such as documents in a format selected from a group consisting of: mobi, epub, html, txt, pdf, docbook, cnxml, and esi-edb. For example, books may be converted from one of the foregoing formats into a common format using a decoding plug-in appropriate for the book format type. In addition, the reader/journal application 336 may allow free-form data entry at the device 305 using a keyboard or stylus via a touch screen element of a display. The application 336 may display using a number of display layers.

Display layers may include background layer which can include a bit-mapped image. For example, the background layer may be a bit-map representation of notebook paper or a pdf image converted to a bit-map. Text or graphics may be overlaid over the background. This methodology allows, for example, annotation of pdf/ppt files and also allows for free-form note taking, journaling and scribbling. The layers may be represented in a package representation including the bit-map images and xml-based drawing instructions. It should be understood that other existing and later developed format may also be supported.

A library browser 345 allows database content to be selected for viewing. The library browser 345 supports viewing of content by types, such as books, audio, and video. Depending on the content type, the library browser 345 invokes an application/activity to display the content on either the bi-stable display or refresh display. For example, the library browser 345 can be used to invoke the reader/journal application 336 via a reader service 335. For other data types, the library browser 345 invokes an appropriate view/application 350a-n. In addition to browsing by type, the library browser 345 allows flexible views of the database content based on tags or labels that can be applied to the content stored in a content database 341. Tags/labels can be derived from the downloaded content (when added to the content database 341) or can be added by the user.

Viewers/applications 350a-n allow the system to access content within the content database 341 and render images based on user intent and criteria of either the bi-stable display or refresh display. Criteria may be defined by the operational characteristics of the displays. For example, criteria may include power, refresh rate, color, motion of images (e.g., video), speed, page refresh, resolution, content format, and media type. The applications/viewers 350a-n may include a book browser, image viewer, video player, or audio player. The book browser allows the user to navigate quickly through content, by providing a hierarchical view of a book's content. For example, the book browser may allow the highlighting of a particular section of a book and viewing of figures/notes that are associated with that section. The image viewer can be configured to allow images to be rendered on either the bi-stable display in a bi-stable format (e.g., grey-scale) or the refresh display in a refresh display format (e.g., color). The video viewer and audio viewer allow basic or advanced multimedia operations. Each viewer/application 350a-n can be configured to allow at least two methods of invocation. One example method of invocation may use an absolute path to a record in the content database, and the other may use the URI of a record in the content database. Another viewer/application 350a-n may include a sound recorder. The sound recorder application may use the built-in microphone(s) of the system 300. Recordings may be stored as sound files that can be accessed like any other audio content for playback.

In some embodiments, the reader service 335 provides an interface between the bi-stable display 306a and refresh display 306b applications. Information may be exchanged between applications using a data exchange protocol, such as custom or generic interchange protocol. The reader service 335 may implement the use of a virtual clipboard 360 to allow data to be passed between viewers/applications 350a-n.

Figure 4A:
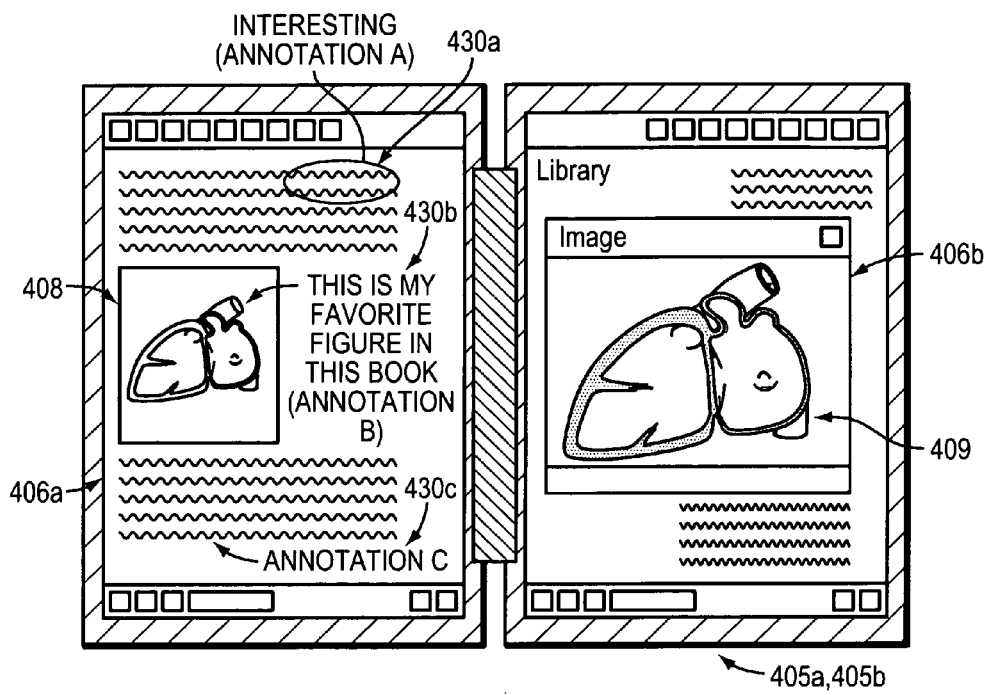
FIG. 4A is a graphical diagram of content of a primary source (e.g., a book) annotated by a user of a device in accordance with an example embodiment of the present invention.
Figure 4B:
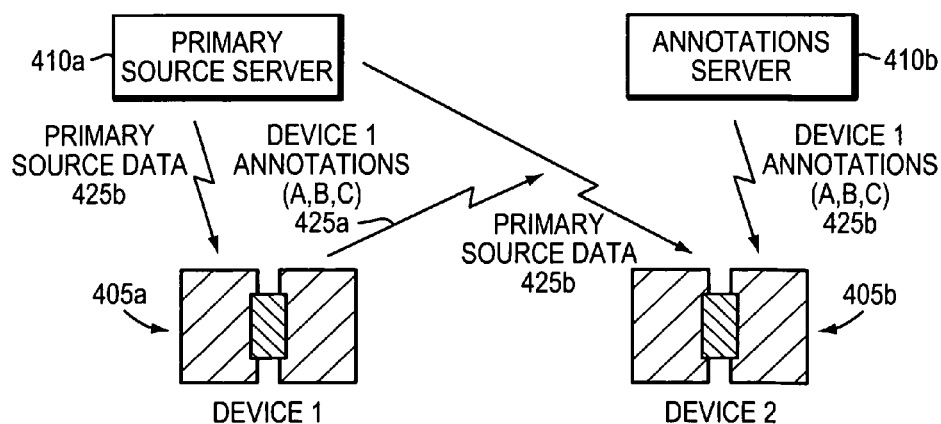
FIG. 4B is a network diagram that illustrates storage and retrieval of annotations.

FIGS. 4A and 4B are a screen view and network diagram, respectively, of annotations applied to content as enabled by devices 405a, 405b, and storage/retrieval by the devices.

FIG. 4A is a graphical diagram of content of a primary source (e.g., a book) annotated by users of devices 405a, 405b in accordance with an example embodiment of the present invention. The devices 405a and 405b include a bi-stable display 406a and refresh display 406b. Content of a primary source may be rendered on the bi-stable display 406a as an image 408. A user may then annotate the primary source, such as by using a stylus and touch screen aspect of the display(s) 406a and 406b, to include notes to supplement the content. For example, the user may include annotations 430a-c that provide additional notes/information that are associated with the primary source. The user may include handwritten annotations 430a-b, or textual annotations 430c. Selections of the primary source may be rendered on the refresh display 406b as an image 409. The image 409 displayed on the refresh display 406b may or may not include the annotations provided by the user.

The devices 405a, 405b include memory (not shown) from which display controller(s) can access data representations of the content to display on the bi-stable and refresh displays 406a, 406b and store or retrieve the annotations. The memory may be dual access memory to enable the controller(s) to access the data and update the images simultaneously on both displays 406a and 406b.

FIG. 4B is a network diagram that illustrates storage and retrieval of annotations via wired or wireless, upstream and downstream, network communications paths 425a, 425b, respectively. A user of a first device 405a may request content from a primary source server 410a. The content may be, for example, a book, image, or news article. The user may then annotate the primary source as described in relation to FIG. 4A. Representations of an annotation may be associated with information to identify the primary source, user, and device that are associated with the annotation. The representations of the annotations may be submitted to an annotations server 410b for storage via the upstream network communications path 425a between the first device 405a and annotations server 410b. A second device 405b may request the same primary source from the primary source server 410a. The primary source server 410a provides primary source data 425b to the second device 405b. The user of the second device may also request annotations that are associated with the primary source and the user of the first device 405a, or annotations from any other device that are associated with the primary source.

Figure 5:
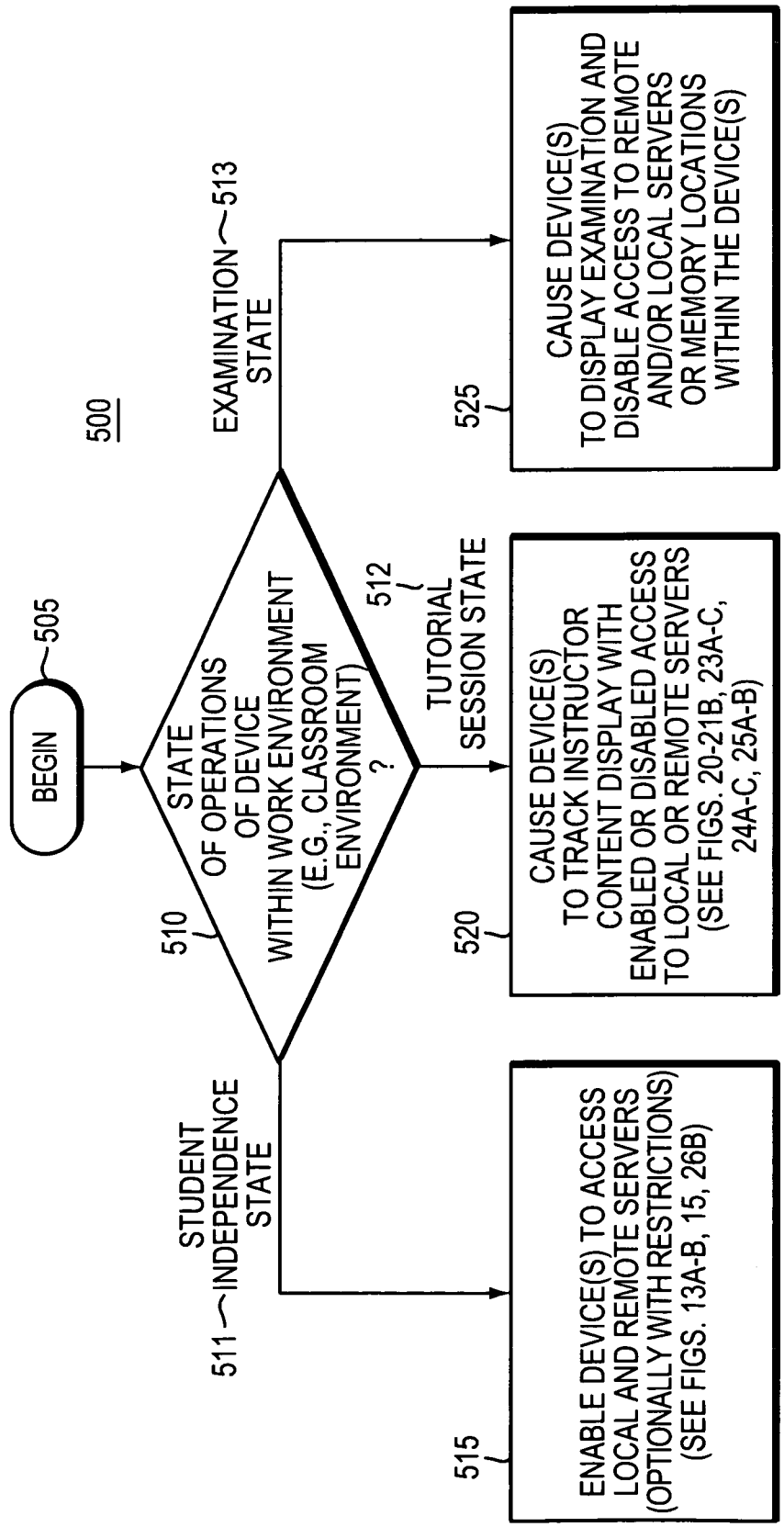
FIG. 5 is flow diagram indicating working environments in which a device may be employed.

FIG. 5 is flow diagram of a method 500 indicating example working states within a classroom environment in which devices may be set. At 505, the method 500 begins. At 510, the state of operations of a device within a work environment is determined, where the states of operations may be a student independence state 511, tutorial session state 512, or examination state 513.

Student independence state 511 as used herein refers to a student's ability to use a device to access another device or server for content. In the student independence state 511, a central server or instructor's device may be used by the instructor to issue a corresponding command wirelessly to the device(s) to enable the device(s) to access local or remote servers for data representative of content. Optionally, the instructor or other person(s), such as a parent or school administrator, may place certain restrictions on access to servers by the device(s), but, as used herein, the student independence state 511 covers a restricted version thereof.

Device operation in the student independence state is further described below in reference to FIGS. 13A-B, 15, and 26B.

Tutorial session state 512 as used herein refers to a student's restricted ability to use a device for activities other than in conjunction with an instructor's guidance through a document or other lesson content. Restriction may be minimal or complete, but, generally a student's device is controlled in some manner to force the student to follow along with a lesson. In the tutorial session state 512, a central server, instructor device, or student device may be used to issue a corresponding command wirelessly to other device(s), to enable the other device(s) to track instructor or student tutorial session, by rendering images on the other device(s) that are rendered on the instructor or student device conducting the tutorial session. The command may enable or disable access to local or remote servers by the device(s). Tutorial sessions may include, for example, classroom instructions, study groups, or online classes/seminars. Device operation in the tutorial session state 512 is further described below in reference to FIGS. 20-21B, 23A-C, 24A-C, and 25A-B.

Examination state 513 as used herein refers to a student's restricted ability to use a device to access content, stored thereon or remotely accessible, while taking an examination. Restriction may be minimal or complete, but, generally a student's device is controlled in some manner while taking the examination thereon or external therefrom. In the examination state 513, a central server or instructor's device may be used by the instructor to issue a corresponding command wirelessly to the device(s), to enable the device(s) to access an examination via a local or remote server and, contemporaneously, disable the device(s) from having access to remote and/or local servers for other content or memory locations within the device(s). Device operations in the examination state 513 is further described below in reference to FIG. 19.

It should be understood that the classroom setting and corresponding device states 511, 512, 513 are merely examples of both environment and states. Other device states for a classroom environment may be provided, and other environments with other device states are also within the scope of the present invention. Further, embodiments of the present invention enable users or administrators to customize device states for their typical or unique environments.

Now that an overview of an example user environment, embodiments and aspects of the device, and network configurations and operations have been presented in reference to FIGS. 1-5, details of the foregoing and additional description is provided in reference to FIGS. 6-42. FIGS. 6-25B illustrate system level embodiments of a device. FIGS. 26A-26D illustrate annotation capabilities of the device and network, FIGS. 27-30 illustrate a device capability of user-selectable rendering of an image from one display to the other. FIGS. 31A-34B illustrate a microphone aspect of the device with associated noise reduction processing. FIGS. 35-42 illustrate mechanical user-selectable or equations of the displays relative to each other.

Figure 6A:
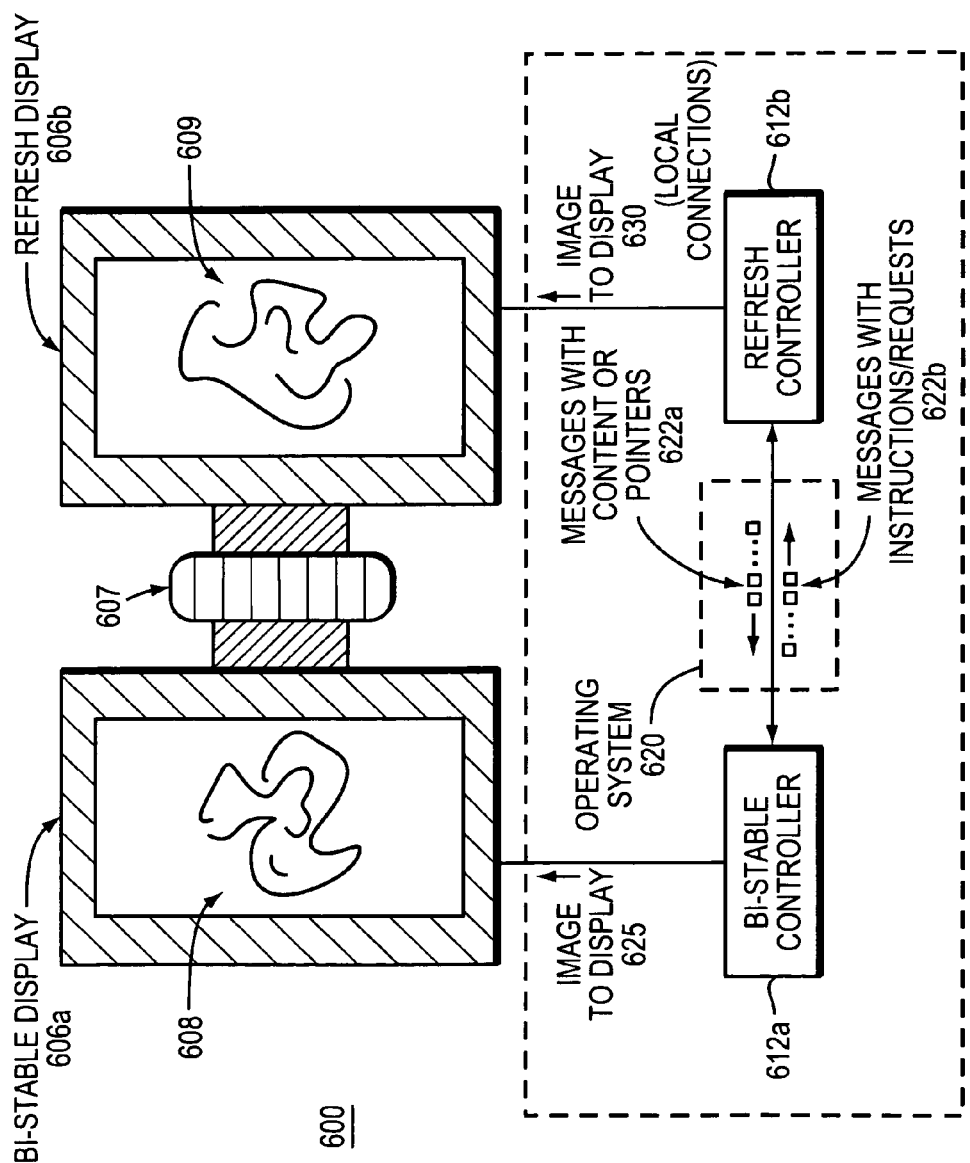
FIG. 6A is a schematic diagram of a display device having a bi-stable display and a refresh display with associated controllers and messages passing therebetween in accordance with an example embodiment of the present invention.

FIG. 6A is a schematic diagram of a display device 600 having a bi-stable display 606a and a refresh display 606b electrically and logically connected by associated bi-stable display and refresh display controllers 612a, 612b respectively, and messages 622a, 622b passing therebetween in accordance with an example embodiment of the present invention. In this embodiment, the bi-stable display 606a is operationally and mechanically coupled to the refresh display 606b via a hinge 607, where the hinge may include electrical paths for the messages.

In operation of this example embodiment, each controller 612a, 612b is configured to download or upload content and annotations. Each controller is further configured to determine whether user interaction with its respective display 606a, 606b is within the operational characteristics of its respective display, and, if within, the controllers 612a, 612b are still further configured to render an image responsive to the user interaction via its respective display 606a, 606b. If user interaction is not within the operational characteristics of the controller's respective display, the controller causes, notifies, or requests the other controller, via messages 622a or 622b to render an image via its respective display responsive to the user interaction.

For purposes of illustration, "user interaction" with respect to user interaction with a display 606a, 606b means any logical or physical interaction the user performs with respect to the display, its operating state, or a state of an image or other human or animal-perceptible indication capable of being made by either display. For example, a logical or physical interaction with respect to a display may include changing a state of a soft switch (e.g., graphical button on a display screen) or hard switch (e.g., mechanical button on either side of a display screen). A logical or physical interaction with respect to an operating state of a display may include selection of a low or normal power state of the refresh display (e.g., low or high brightness) or slow or fast update rate of the bi-stable display.

A logical or physical interaction with respect to an image may include selection of a user resource locator (URL) within text of a book or periodical on the bi-stable display to access a webpage or data corresponding to the URL; request to present a color version of an image, represented in a bi-stable display format on the bi-stable display, on the refresh display; request to view a video referenced in a book; or request to search a term of a book via a network. In each of these examples, action(s) associated with regard the logical or physical interaction are typically better executed by the refresh display rather than the bi-stable display due to the refresh display's higher update rate, even though the action requires more energy than if performed by the bi-stable display. Similarly, user interaction with the refresh display, such as downloading and viewing content of an electronic book or periodical (e.g., newspaper) or other static publication, may be more suitably performed by the bi-stable display for battery energy conservation reasons.

In any of the foregoing cases, the bi-stable and refresh display controllers communicate with each other to coordinate a response to the request. For example, in the case of a user's selection of a URL, the bi-stable display controller 612a may determine that loading and presenting a webpage is outside the operating characteristics of the bi-stable display and, in turn, send messages 622b with instructions or a request to the refresh display controller 612b to access, load and display the corresponding website. Example reasons the webpage may be outside the operating characteristics of the bi-stable display 606a include lack of color or slow (e.g., 1 second) update rate on the part of the bi-stable display 606a.

Continuing to refer to FIG. 6A and with the foregoing example interactions and operational characteristics kept in mind, the bi-stable controller 612a monitors user interaction with bi-stable display 606a. If the user interaction with bi-stable display 606a is within the operational characteristics of the bi-stable display 606a (e.g., the user requests an electronic turn-to-the-next-page of a book), the bi-stable controller 612a renders an image 625 (e.g., the next page of the electronic book) via the bi-stable display 606a. Similarly, the refresh controller 612b monitors user interaction with the refresh display 606b (e.g., display an embedded video on a webpage) and renders an image 630 (e.g., the webpage with embedded video playing) via the refresh display 606b if the user interaction is within the operational characteristics of refresh display 606b.

Alternatively, if the bi-stable display controller 612a determines that the user interaction with the bi-stable display 606a is not within operational characteristics of the bi-stable display 606a (e.g., color required), the bi-stable display controller 612a notifies the refresh display controller 612b via an instruction/request message 622b to render an image 630 via the refresh display 606b. Similarly, if the refresh display controller 612b determines that the user interaction is not within the operational characteristics of the refresh display 606b (e.g., low energy display required, allowable, or preferred), then the refresh display controller 612b notifies or requests, via messages 622b, the bi-stable display controller 612a to render an image via the bi-stable display 606a. In notifying the refresh display controller 612b to render an image, the bi-stable display controller 612a may pass a message 622a to the refresh display controller 612b, in which the message may include a pointer to an object stored in memory (not shown) or the content to be rendered. The instructions and request 622b, as well as content or pointer 622a, may be passed logically via an operating system 620. Because both displays 606a, 606b may download the same content and annotations and share current states of the content and annotations via messages 622a or 622b, the messages 622a or 622b, used to cause the "other" display 606a, 606b to render an image, can refer to the content or annotations in a number of ways, such as by memory location, content relative information, or other way(s) known in the art.

Further, when monitoring user interaction with the bi-stable display 606a, the bi-stable display controller 612a may further or alternatively be able to determine whether the user interaction results in an image that, if within operational characteristics of the bi-stable display 606a, is better suited to be rendered on the refresh display 606b. If better suited to be rendered on the refresh display 606b, the bi-stable display controller 612a sends an instruction/request 622b to the refresh display controller 612b to render an image via the refresh display 606b. Similarly, if the refresh display controller 612b is able to determine whether user interaction with the refresh display 606b results in an image that is better suited to be rendered via bi-stable display 606a, then the refresh display controller 612b sends a message 622a with content of pointers (or other information) to cause the bi-stable display controller 606a to render the image on the bi-stable display 605a. The determination of which display on which to render an image may be based on a comparison of the operational characteristics of the displays specific to the user interaction. Criteria of operational characteristics may include power, refresh rate, color, motion, speed, page refresh, resolution, content format, and media type.

Figure 6B:
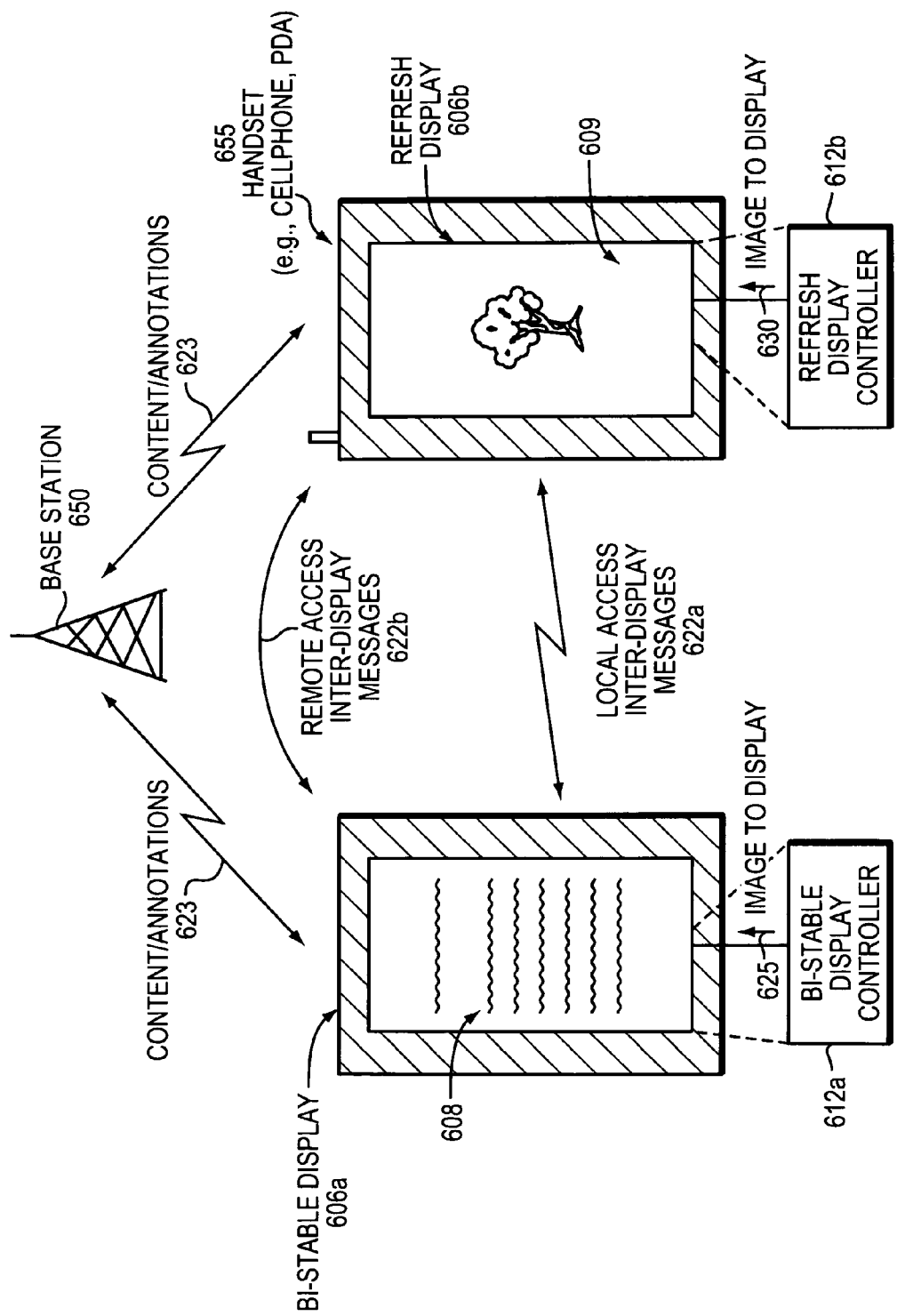
FIG. 6B is a schematic diagram of a bi-stable display device and a handset device with associated controllers and messages passing therebetween via local wireless or wired communications or via base transceiver station ("base station") communications in accordance with an example embodiment of the present invention.

FIG. 6B is a schematic diagram of a bi-stable display device 606a and a handset device 655 operatively and logically connected by associated bi-stable display and refresh display controllers 612a, 612b, respectively, and local inter-display messages 622a, or remote access inter-display messages 622b passing therebetween. The local access inter-display messages 622a may be communicated using a local wireless (or wired) protocol, such as Bluetooth®, and the remote access inter-display messages 622b may be communicated using a remote access protocol, such as a Wide Fidelity (WiFi) protocol using IEEE 802.11, via a base transceiver station 650 in accordance with an example embodiment of the present invention. The handset device 655 may be any wireless transmit/receive unit (WTRU), such as a cell phone or PDA.

A user of the bi-stable display 606a may require the use of a display device having a refresh rate suitable for rendering rich content. The user may then initialize communications between the bi-stable display 606a and handset 655, having a refresh display 606b suitable for rendering the desired rich content, via local inter-display messages 622a, or remote access inter-display messages 622b. Once a communication session is initialized, the bi-stable display 606a and handset 655 may apply the same inter-device methodologies described in reference to FIG. 6A. However, this alternative embodiment illustrates a device having a bi-stable display 606a operating in connection with a refresh display 606b provided by a standard or specially-equipped handset 655 (e.g., cell phone or PDA), depending upon implementation of the inter-display messages 622a, 622b, and other aspects understood in the art.

Figure 7:
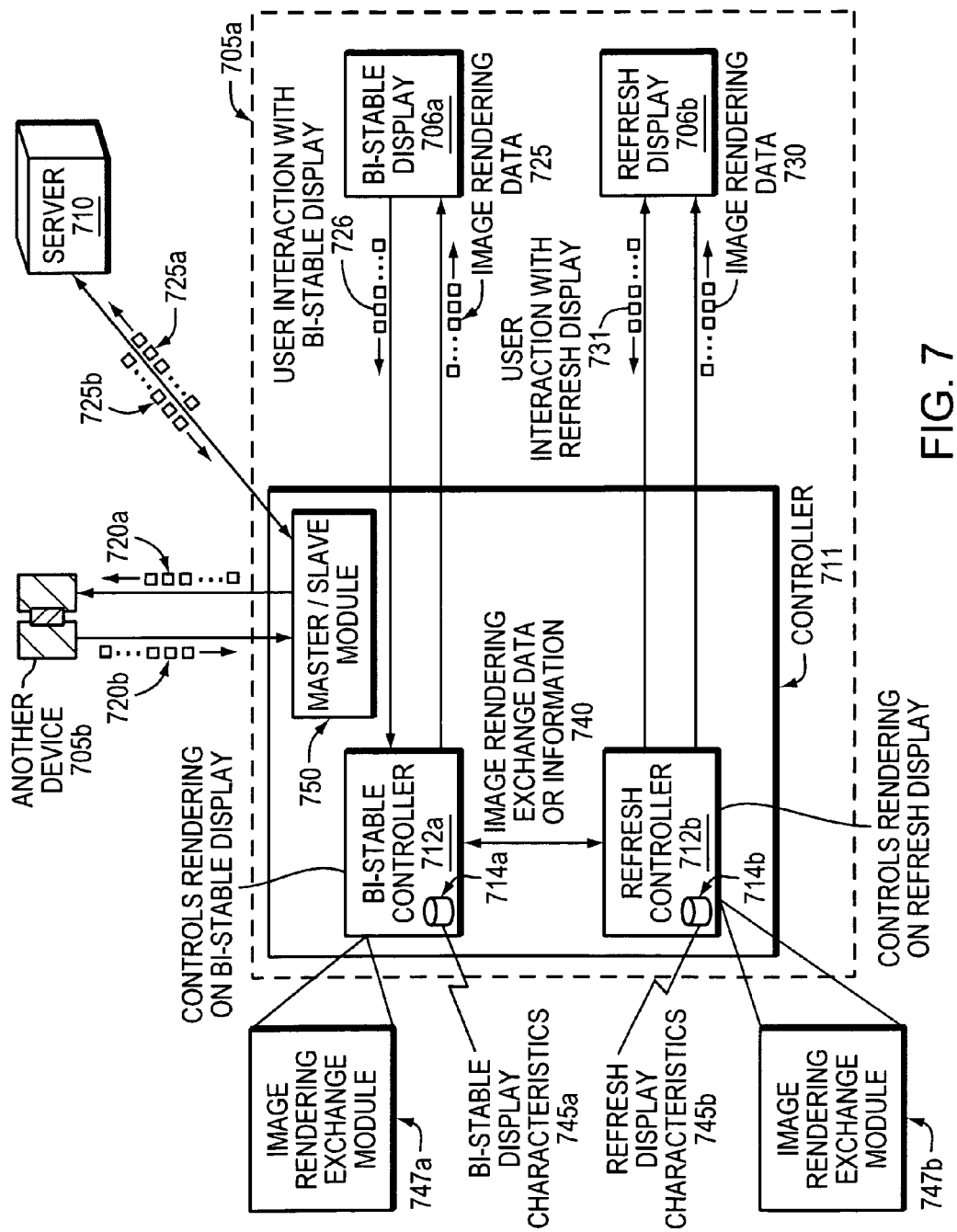
FIG. 7 is a schematic diagram of a device and its controller operating in connection with another device and a server in accordance with an example embodiment of the present invention.

FIG. 7 is a schematic diagram of the device 705a and its controller 711 operating in connection with another device 705b and a server 710 in accordance with an example embodiment of the present invention. The device 705a includes a bi-stable display 706a and a refresh display 706b operationally coupled to the controller 711. The controller 711 includes a bi-stable display controller 712a, refresh display controller 712b, and master/save module 750. The bi-stable display controller 712a receives user interaction data 726 via the bi-stable display 706a. Similarly, the refresh display controller receives user interaction data 731 via the refresh display 706b.

Each controller 712a, 712b controls rendering via its respective display or causes the other controller to render the image via its display in a manner described in reference to FIG. 6. In this example embodiment, the controllers 712a, 712b include respective image rendering exchange modules 747a, 747b that use display characteristics 745a, 745b stored in respective memories 714a, 714b. The image rendering exchange modules 747a, 747b may be hardware, firmware, or software construction configured to perform in a manner as described above with respect to rendering images as a user interaction and operational characteristics of the respective displays. It should be understood that image rendering exchange data or information 740 may employ forms of exchange protocols, representations of data or information, or referencing of memory and span any type of data exchange path or interface consistent with exchanging information as disclosed herein by way of examples or otherwise understood in the art.

In addition, the device 705a may interact with the server 710. The device 705a may request content from the server 710 via a request 725a and, in response, receive content 725b from the server 710. Similarly, the device 705a may interact with another device 705b. Messaging data 720a, 720b may be exchanged between the two devices. The devices 705a, 705b may interact for several reasons, one of which being a tutorial session, where one device is acting in a master mode and another device is acting in a slave mode. The master/slave module 750 controls such operations in this example embodiment. For example, the device 705a, while acting in a master mode, controls rendering on the other device 705b. Alternatively, the device 705a, while acting in a slave mode, accepts commands from the other device 705b to control rendering on its displays. More details about master and slave modes are presented below at least in reference to FIGS. 21A through 25B.

Figure 8:
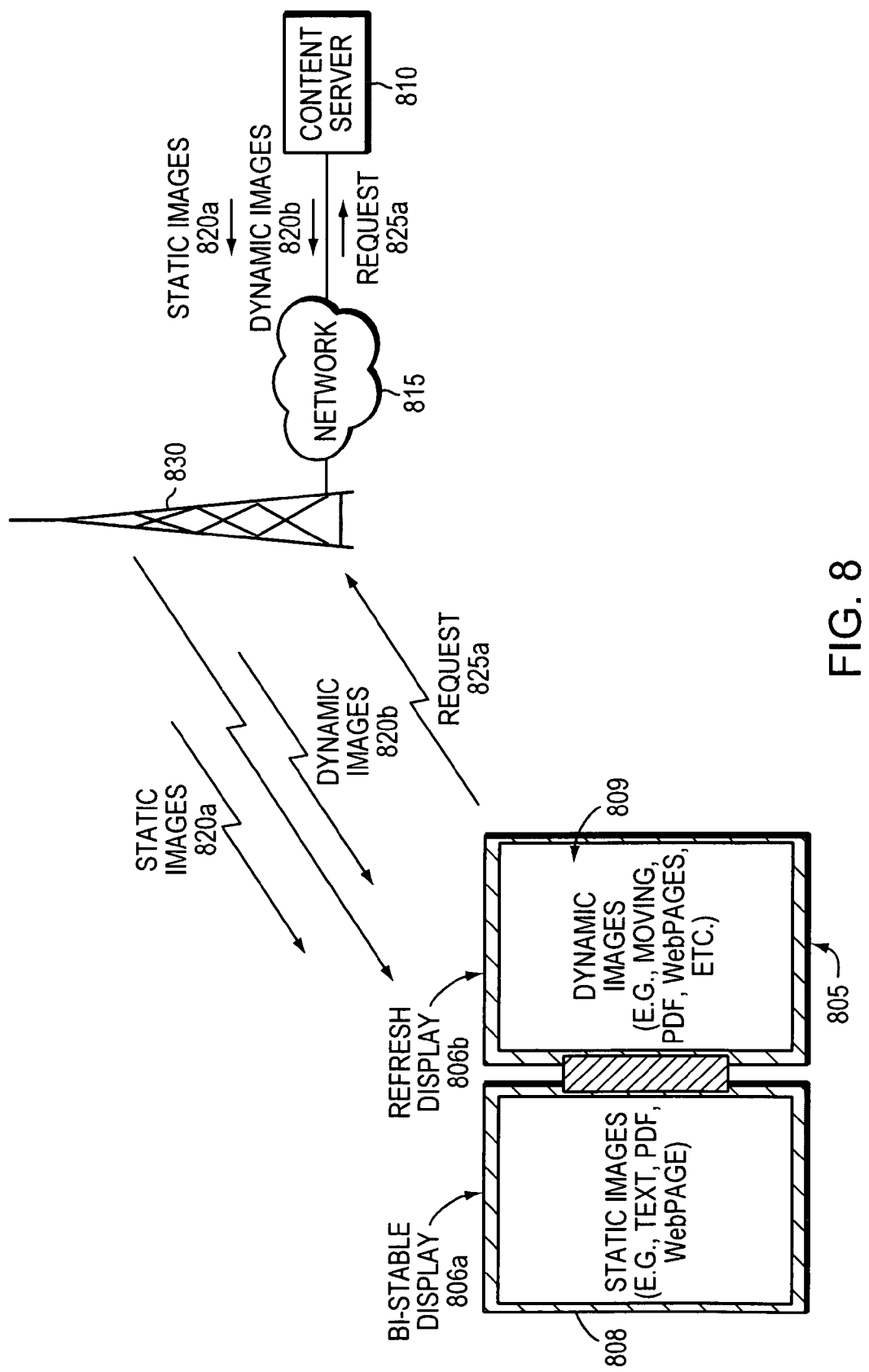
FIG. 8 is network diagram that illustrates a device requesting and receiving images via wireless communications.

FIG. 8 is a network diagram that illustrates a device 805 requesting and receiving images via wireless communications. The device 805 includes a bi-stable display 806a and a refresh display 806b. The bi-stable display 806a renders static images 808 while the refresh display 806b renders dynamic images 809. The device 805 may send a request 825a upstream for content, which may either be static or dynamic images, from a content server 810. The request 825a is sent through a wireless tower 830 to a network 815, and, in turn, to the content server 810. In response, the content server 810 locates the requested content, the requested content in this example being either static images 820a or dynamic images 820b. The content server 810 then sends representations of the content via the network 815 through the wireless tower 830 to the device 805. Static images 820a are rendered via the bi-stable display 806a, while dynamic images are rendered via the refresh display 806b, and should be understood that the simplified network example can be more complete in other example networks, such as one in which the device 805 enables a user to browse multiple network nodes in search for content to download. Also, the device 805 may support typical encryption, security, virtual private network (VPN) protocols, other communications protocols, and so forth.

Figure 9:
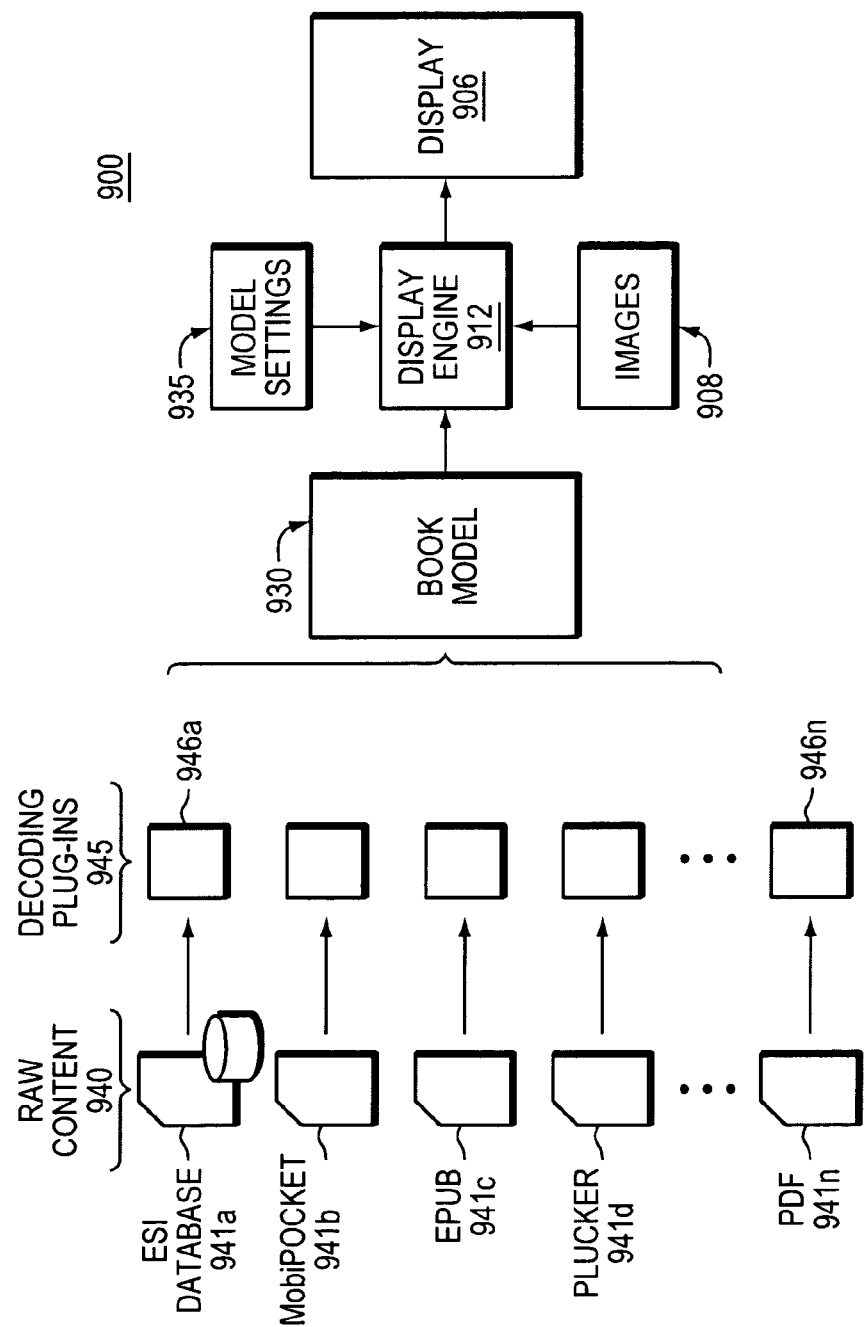
FIG. 9 is a block diagram that illustrates inputs and a display engine used to render images on a display of a device.

FIG. 9 is a block diagram that illustrates a display engine that is used to render images on a display 906 of a device 900. As depicted in the diagram, raw content 940 may be received by the device 900, such as via a wired or wireless interface (not shown). The raw content 940 may be in many forms 941a-n, such as a PDF file, electronic publication (EPUB), electronically stored information (ESI) database, or word document. Multiple decoding plug-ins 945 may be included in the device 900 or optionally downloadable from a server (not shown), where the decoding plug-ins 945 are used to decode one or more of the formats of the formats 941a-n of the raw content 940. The decoding plug-ins 946a-n may be used to convert the raw content into a common format for the device 900, the display 906, or a limited set of formats.

For example, if the device 900 receives several books having different raw content format, a book model 930, using decoding plug-ins corresponding to the book format type, converts the raw content to a format compatible with the device 900 or display 906. The book model 930 may utilize a small set of simple data structures in order to represent the book data. At the lowest level are entries. Entries contain actual text content, image pointers, attribute data (e.g., bold, italic, etc.) or control information (e.g., skip a line, end page, etc.). Entries may be grouped into paragraphs. Sections provide for document structure. Sections may include other sections or may contain paragraphs. Therefore, from top-down, the book model may be as simply as a hierarchy of sections, where each lead section includes lists of paragraphs, and each paragraph contains a list of one or more entries. This format is well-suited for storage and retrieval from a database. Storage of book content and database form allows for easy, efficient retrieval of subsets of book content, for efficient search for a wide variety of indexing optimization. The book modes 930 may also allow for easy association of note data (e.g., text/audio/graphical/hyperlink). Model settings 935 may be employed to provide customized or default display formatting. The display engine 912 renders content via the display 906. In operation, the display engine 912 receives information via the book model 930, model settings 935, and images 908 in order to render content via the display 906. It should be understood that portions or all of the elements other than the display 906 may be in the device 900 or external from the device 900. In some embodiments, other elements, such as a display driver (not shown), interface (not shown), or other elements configured to carry out portions of processing raw, party processed, or fully processed data to be rendered may also or alternatively be employed by the device 900 depending on how much processing is performed in the device 900 and how much is performed in, for example, a network made prior to reaching the device 900. An example reason for having some or all processing external from the device 900 is to save on processing power, which, in turn, extends battery operating life between recharges.

Figure 10:
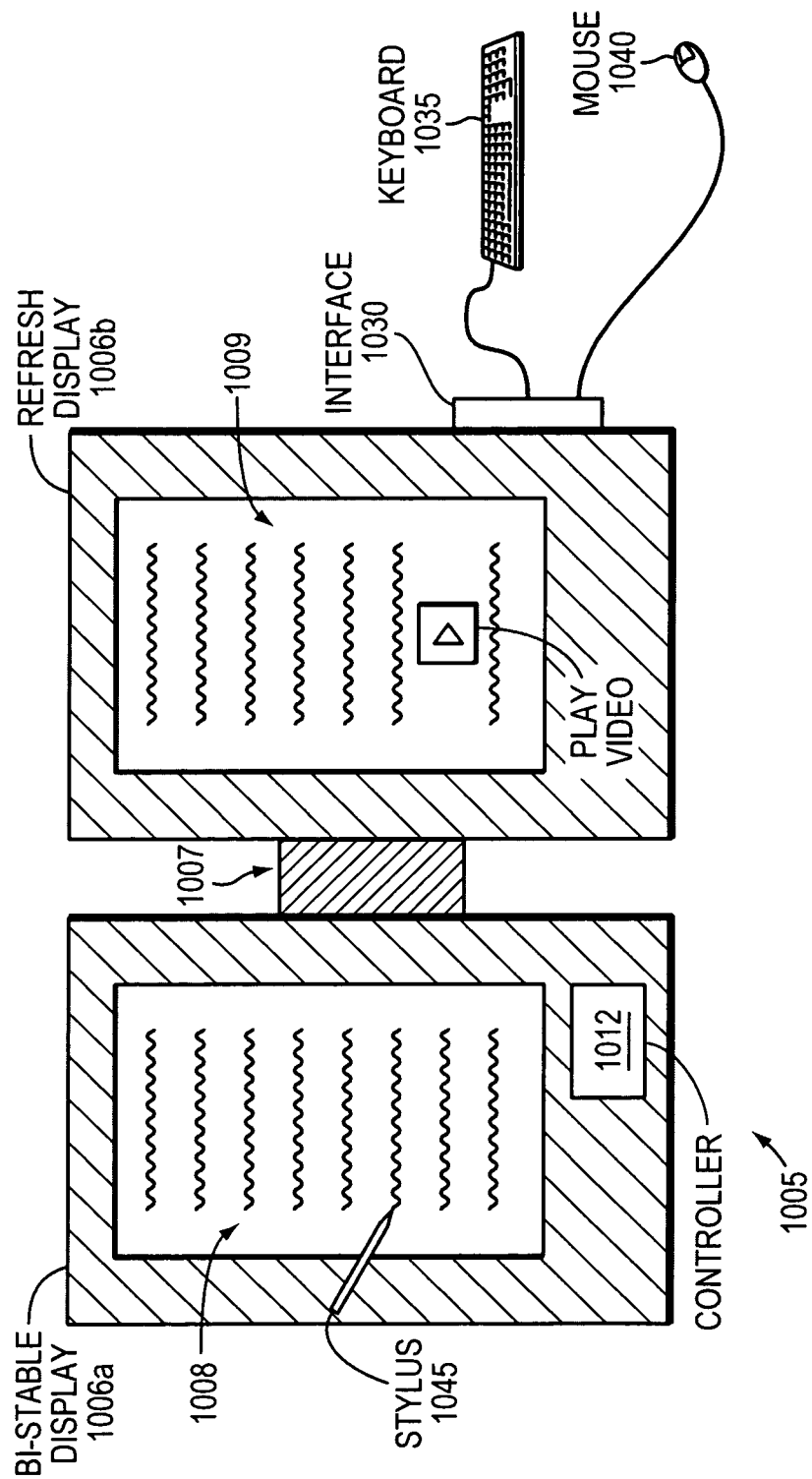
FIG. 10 is a schematic diagram of a device that accepts user input via an attachable user-input peripheral or touch screen.

FIG. 10 is a schematic diagram of a device 1005 that accepts user input via an attachable user input peripheral or touch screen. The device 1005 includes a bi-stable display 1006a and a refresh display 1006b mechanically coupled together via a hinge 1007. In this example embodiment, the displays are operationally coupled to a controller 1012 that controls rendering via each display. Further, the device 1005 includes an interface 1030. The interface 1030 allows attachment of peripheral devices, such as keyboard 1035 and mouse 1040, to enable a user to enter data, retrieve data, alter a state of the device 1005, or alter a state of an image rendered via one of the displays 1006a, 1006b. In addition, each display 1006a, 1006b may be configured to accept user input in relation to a rendered image on one or both displays using touch screen technology. The device 1005 may also accept such user input via a touch screen through a stylus 1045 or by human physical contact with either of the displays 1006a, 1006b. Similarly, the device 1005 may accept user interaction via the interface 1030 from either the keyboard 1035 or the mouse 1040, or other known human-to-machine interface peripheral, such as voice activated command receiver module (e.g., a microphone) with voice recognition system.

Figure 11:
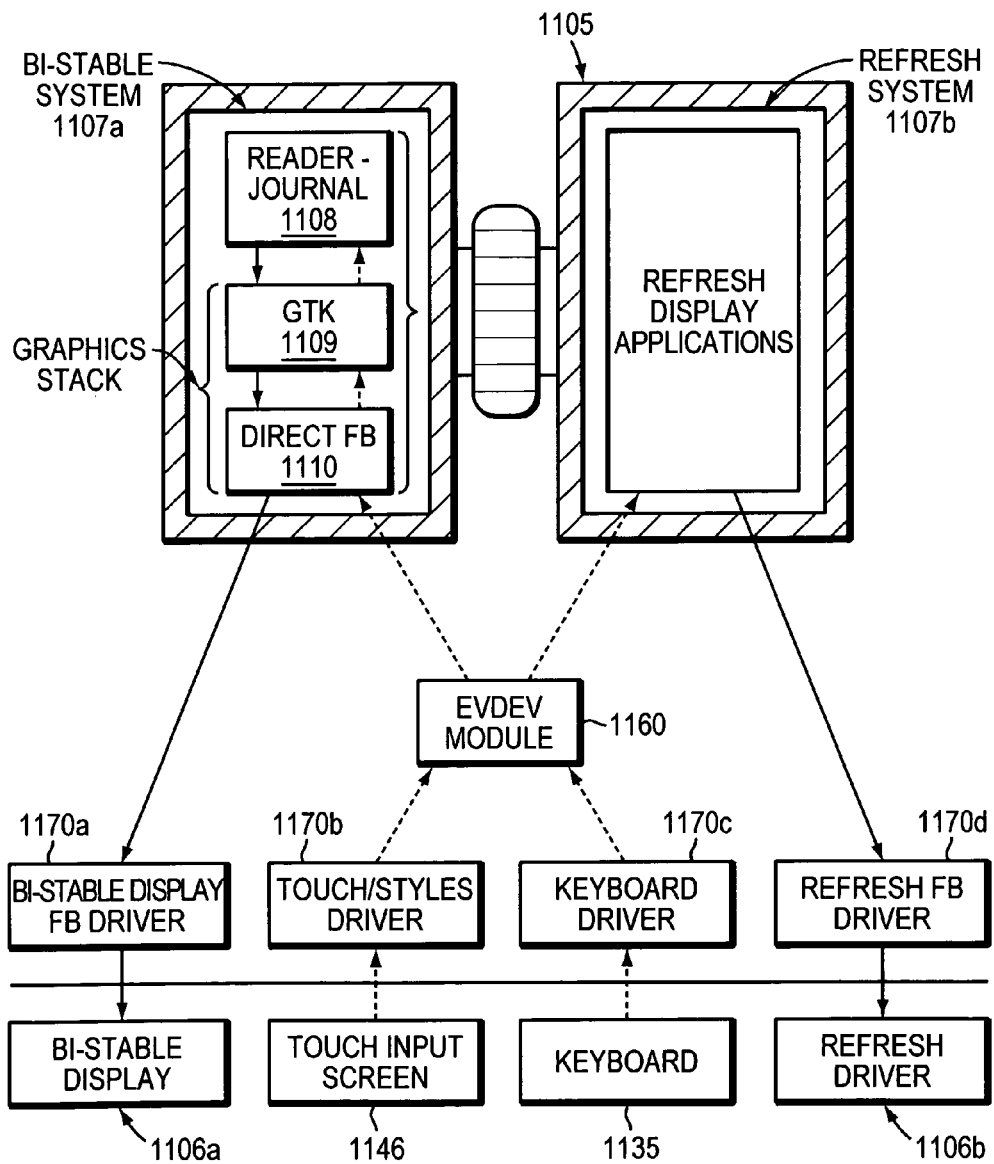
FIG. 11 is a block diagram illustrating high level peripheral data flow of a device.

FIG. 11 is a block diagram illustrating high level data flow from peripherals to a device 1105. The device 1105 includes a bi-stable display 1106a and a refresh display 1206b. The bi-stable display 1106a is operated by a bi-stable system 1107a. The refresh display 1106b is operated by a refresh system 1107b. The bi-stable system 1107a and the refresh system 1107b may employ core software that runs on dual-display hardware, one being hardware associated with the bi-stable display 1106a and the other being hardware associated with the refresh display 1106b.

In this example embodiment, the bi-stable system 1107a and refresh system 1107b utilize two separate graphics stacks. The bi-stable display 1106a may use a graphic stack that includes GTK+, which is an example of a cross-platform widget tool kit for creating graphical user interfaces and a direct frame buffer space (direct FB space), which is a software library operating system that provides hardware graphics acceleration, input device handling and abstraction, and integrated windowing system with support for translucent windows and multiple display layers. The refresh display 1106b utilizes the refresh system 1107b, which includes a graphics stack that may be an android/open GL space graphic stack.

In operation, the device 1105 may accept user interaction via the bi-stable display 1106a or the refresh display 1106b through a touch input screen 1146 or a keyboard 1135. If user interaction includes interaction via the touch input screen 1146 overlayed or incorporated into one or both of the displays 1106a, 1106b, a touch/stylus driver 1170b determines whether the user is implementing the use of a stylus touch input or a human-to-machine touch interface. The touch/stylus driver 1170b then interprets the touch input 1146 and sends messages to an EVDEV module 1160 that determines whether the user interaction occurred via the bi-stable display 1106a or the refresh display 1106b, in an embodiment supporting input via both displays. If the input occurred via the bi-stable display 1106a, the EVDEV module 1160 sends messages to the bi-stable system 1107 to render an image. The bi-stable graphics stack comprising GTK+ (GNU Image Manipulation Program, or GIMP, toolkit) 1109 and direct frame buffer direct FB) 1110 then processes in the input, passes the input messages to bi-stable driver 1170c, and, in turn, the bi-stable display 1106 renders the image.

Alternatively, user interaction may be via keyboard 1135. In this case, a keyboard driver 1170c interprets the interaction and sends messages to the EVDEV module 1160. The EVDEV module 1160 determines whether interaction occurred via the refresh display 1106b or the bi-stable display 1106a. At this point, the EVDEV module 1160 sends interaction messages to the appropriate graphics stack of either the refresh system 1107b or the bi-stable system 1107a. In turn, rendering information is sent to either the bi-stable frame buffer (FB) driver 1170a or the refresh frame buffer cm driver 1170b. Each driver then sends corresponding rendering data to either (or both) the bi-stable display 1106 or the refresh display 1106b via which an image is rendered.

Figure 12:
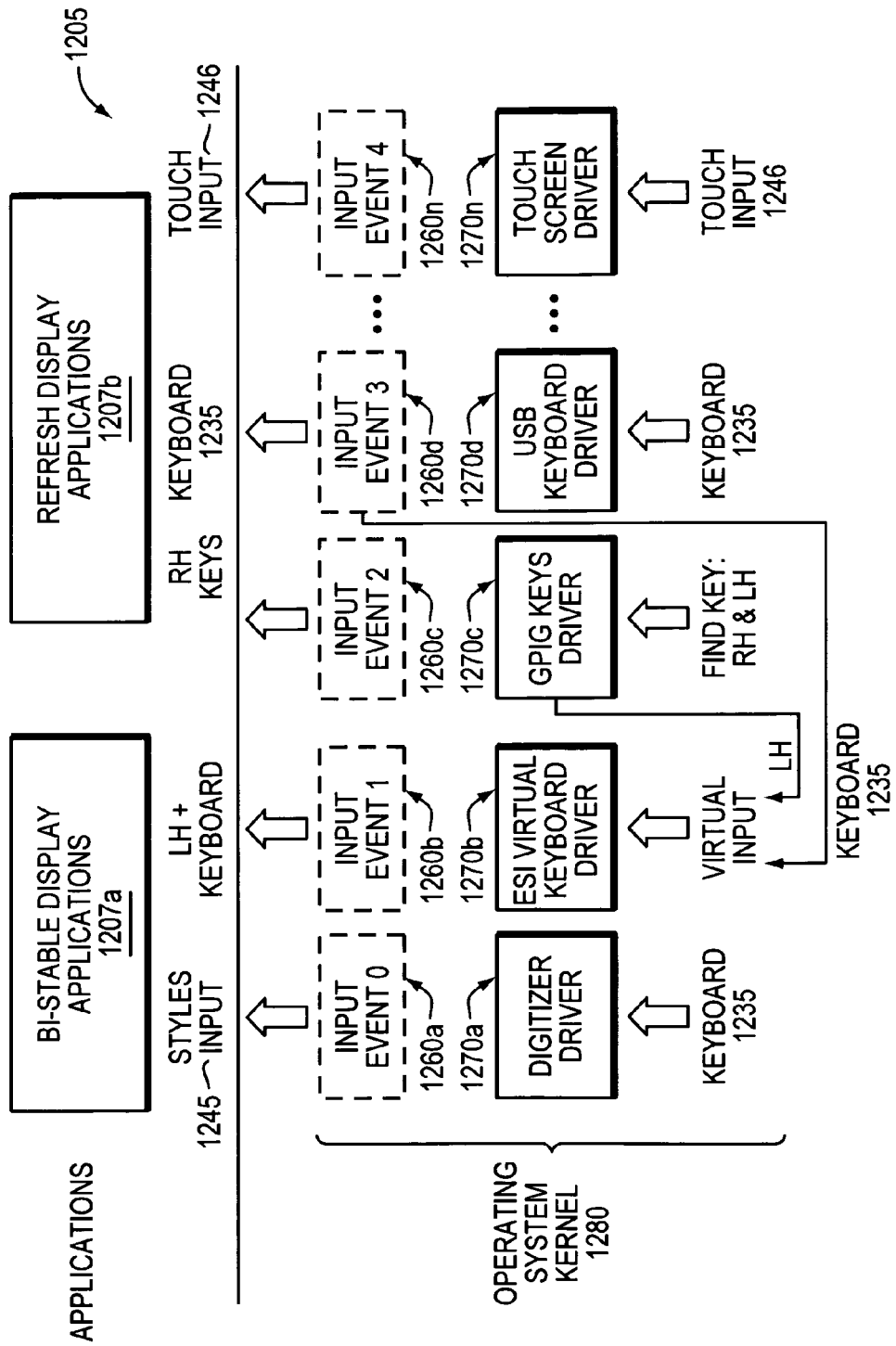
FIG. 12 is a block diagram of a device accepting user input via different types of user input peripheral.

FIG. 12 is a block diagram of a device 1205 accepting user input via different types of user input peripherals. The device 1205 in this example embodiment includes an operating system kernel 1280 which includes peripheral drivers 1270a-n, which accepts multiple keyboard input devices which may include keys dedicated to bi-stable display applications 1207a that operate with a bi-stable display. Similarly, the multiple keyboard input devices may include keys specifically dedicated to refresh display applications 1207b that operate with a refresh display. In addition, the multiple keyboard devices may include keys that can be shared by the bi-stable display applications 1207a and the refresh display applications 1207b. For example, a Bluetooth® or a Universal System Bus (USB) keyboard may be shared by the bi-stable display applications 1207a and the refresh display applications 1207b.

The device 1205 may accept input from a keyboard 1235 via a digital driver 1170a, Electronic System Interface (ESI) virtual keyboard driver 1270b, a General Purpose Input/Output (GPIO) keys driver 1270c, USB keyboard driver 1270d, . . . , or touch screen driver 1270n. The digital driver 1270a, GPIO keys driver 1270c, USB keyboard driver 1270d and touch screen driver 1270n may be configured to accept direct physical input. The physical input may be from the keyboard 1235 or touch input 1246. The ESI virtual keyboard driver 1270b accepts virtual input because it does not directly receive physical input. Instead, input is passed from other drivers, such as the GPIO keys driver 1270c (which receives all of the key switch events from the device 1205 unit buttons (not shown) and from a USB Bluetooth® keyboard driver). Input events 1260a-n are passed to the corresponding display applications, which may be either the bi-stable display applications 1207a or the refresh display applications 1207b for rendering images representing content on the device 1205.

Figure 13:
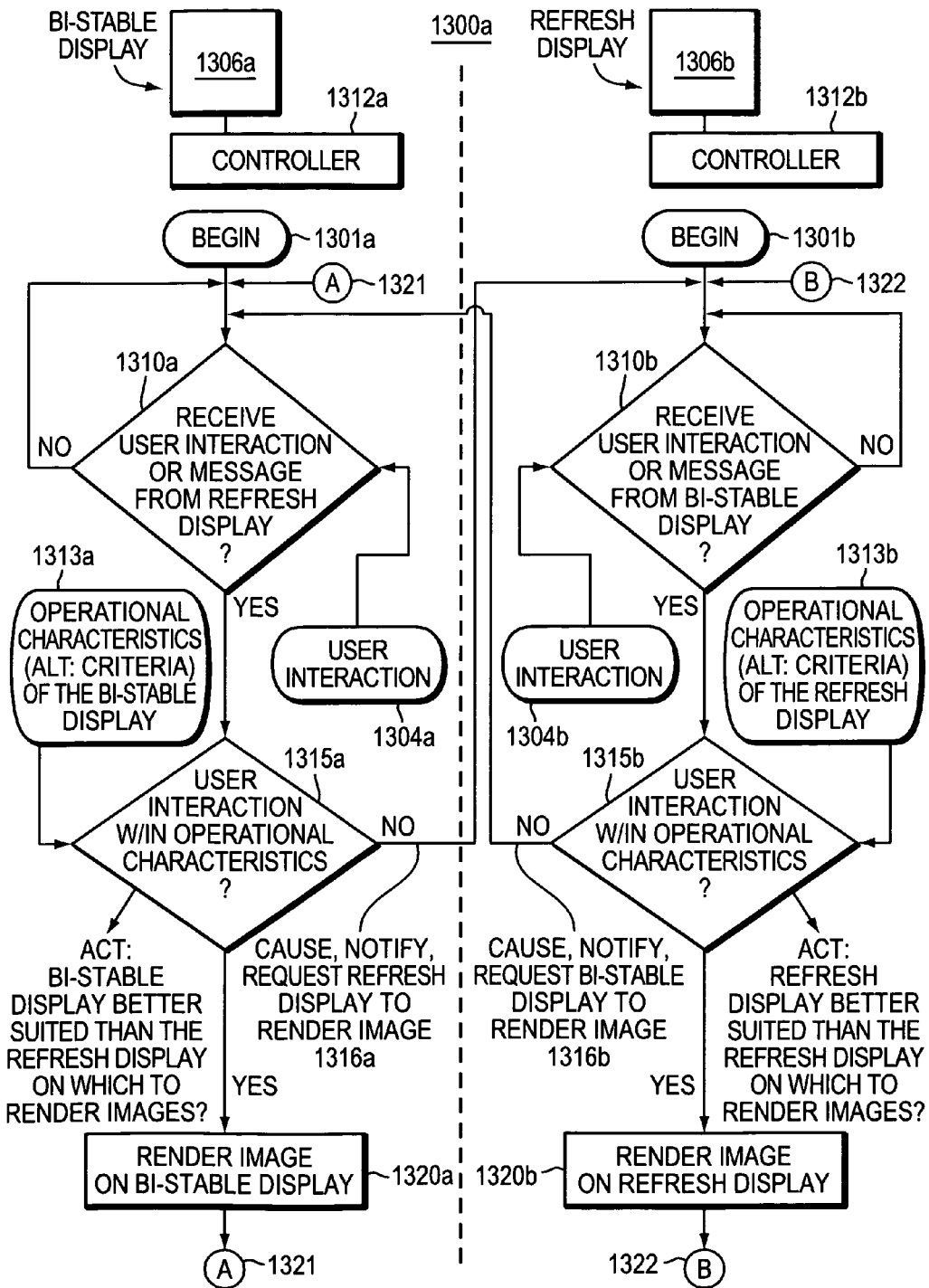
FIG. 13 is a flow diagram of an example method for rendering images on either a bi-stable display or a refresh display of a device.

FIG. 13 is a flow diagram of an example method 1300 for rendering images on either a bi-stable display 1306a or refresh display 1306b. For purposes of this example, the bi-stable display 1306a is operationally coupled to a controller 1312a that controls rendering of the images on the bi-stable display 1306b, and, similarly, the refresh display 1306b is operationally coupled to a controller 1312b that controls rendering on the refresh display 1306b.

The method begins at 1301a, 1301b. Referring to the bi-stable display portion (left) of the example method 1300, at 1310a, the bi-stable display 1306a determines whether it has received user interaction 1304a or a message 1316b from the refresh display controller 1312b. Assuming that the bi-stable display controller 1312a has received user interaction 1304a, the method 1300a proceeds at 1315a, at which the bi-stable display controller 1312a determines whether the user interaction 1304a is within the operational characteristics or criteria 1313a of the bi-stable display 1306a. If the user interaction 1304a is within the operational characteristics or criteria 1313a of the bi-stable display 1306a, the bi-stable controller 1312a, at 1320a, renders an image via the bi-stable display 1306a. Subsequently, at 1321, the method 1300a begins again. In an event the user interaction 1304a is not within the operational characteristics or criteria 1304a of the bi-stable display 1306a, a message 1316a is sent to the refresh display controller 1312b to cause, notify, or request it to render an image via the refresh display 1306b. It should be understood that operations characteristics may be manufacturer-defined as a function of limits of the display, whereas criteria may be manufacturer-defined as a function of limits of the display within the content of the device. In the case of criteria, the determination 1315a may alternatively be a determination of whether the bi-stable display 1306a is better suited than the refresh display 1306b on which to render the image.

Referring now to the refresh display portion (right) of the example method 1300b at 1310b, the refresh display controller 1312b may receive the message from the bi-stable display controller 1312a. At 1315b, the refresh display controller 1312b determines whether the user interaction 1304a is within operational characteristics of the refresh display 1306b (or which display is better suited for rendering of the image), which is determined using the refresh display operational characteristics or criteria 1312b. Assuming the request to render an image via the refresh display is within the operational characteristics or criteria of the refresh display 1306b, at 1320b, the refresh controller 1312b renders the image via the refresh display 1306b. Then, at 1322, the method for the refresh display begins again.

Alternatively, at 1310b, the refresh display 1306b may receive user interaction 1304b. At this point, the refresh display controller 1312b determines whether the user interaction 1304b is within the operational characteristics or criteria 1313b of the refresh display. If the user interaction 1304b is not within its operational characteristics or criteria 1313b, the refresh display controller 1312b sends a message 1316b to cause, notify, or request the bi-stable display controller 1312a to render an image via the bi-stable display 1306a. At 1310a, the bi-stable display controller 1312a receives this message as mentioned above. However, if the user interaction 1305b is within the operational characteristics or criteria 1313b of the refresh display 1306b, then, at 1320b, the refresh display controller 1312b causes the refresh display 1306b to render the image.

FIGS. 14A-D are schematic diagrams illustrating physical orientations of a device 1405 with respect to a viewing angle 1400 of a user. The device 1405 includes a bi-stable display 1406a, refresh display 1406b, and hinge connecting the displays 1406a, 1406b together in a user-selective arrangement. The bi-stable display 1406a renders an image 1408 in a bi-stable display format, and the refresh display 1406b renders an image 1409 in a refresh display format. Each display also includes several user input buttons, one of which being an orientation selection button 1410. Alternatively, the device 1405 or a component of the device, such as one of the displays 1406a, 1406b, or the hinge connecting the displays 1406a and 1406b may include therein a position or orientation sensor to sense automatically an orientation of the device with respect to a user or with respect to vertical or horizontal angles relative to up or down of an edge of a display 1406a, 1406b as a function of gravity.

FIG. 14A illustrates an orientation that may be better suited for right-handed users, where the device 1405 is an orientation in which the bi-stable display 1406a is to the left of the viewing angle 1400 of the user and the refresh display 1406b is to the right of the viewing angle 1400 of the user. FIG. 14B illustrates an orientation of the device 1405 which may be better suited for a left-handed user, where the refresh display to the left of the viewing angle 1400 of the user and the bi-stable display 1406a is located to the right of the viewing angle 1400 of the user.

FIGS. 14C-D illustrate alternative orientations of the device 1405, where either the bi-stable display 1406a is above the refresh display or, alternatively, the refresh display 1406b is above the bi-stable display 1406a with respect to the viewing angle 1400 of the user.

For any of the viewing orientations, the user can effectively change which display 1406a, 1406b is on the left or right in the vertically held orientations (FIGS. 14A and 14C), or upper or lower (FIGS. 14B and 14D) through use of the orientation selection button 1410 or as automated by an internal sensor. Changing orientations may be more comfortable for a user in annotating documents via the bi-stable display 1406a or navigating webpages via the refresh display 1406b, as two examples. Orientation issues are different for this device 1405 embodiment with two displays 1406a, 1406b in an open-clamshell configuration, as compared to a stacked configuration or a device embodiment employing a single display, due to the users having to reach across the dominant hand to interact with a second display, thereby potentially obstructing viewing of the first display.

It should be understood that changing images on the display(s) 1406a, 1406b via the orientation selection button 1410 or other mechanism may include rotation of rendered images, changes of states of hard or virtual buttons or other physical or virtual elements on the display, activation/deactivation microphone(s) and other possible state changes of the device 1405 or peripherals associated therewith.

Figure 15:
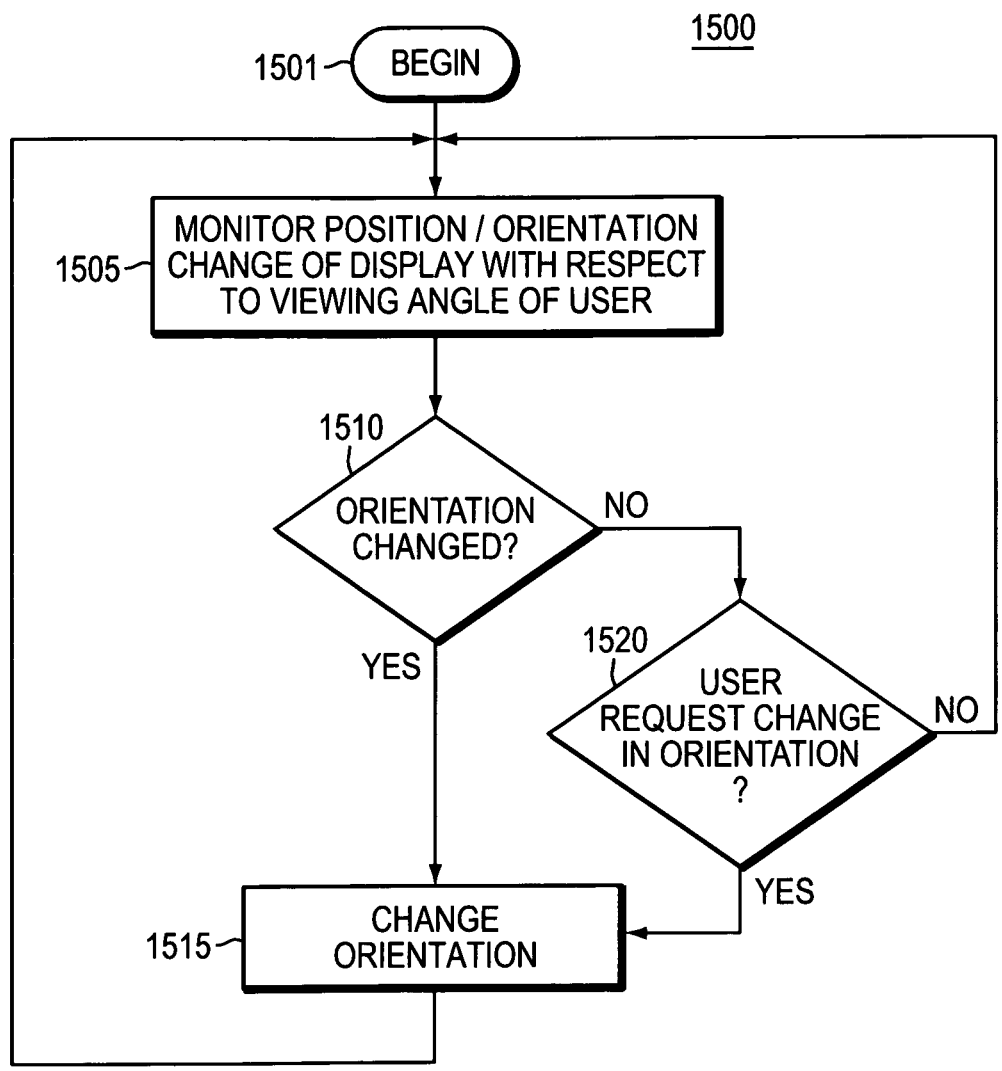
FIG. 15 is a flow diagram of a method for changing the orientation of a rendered image on a device.
Figure 16:
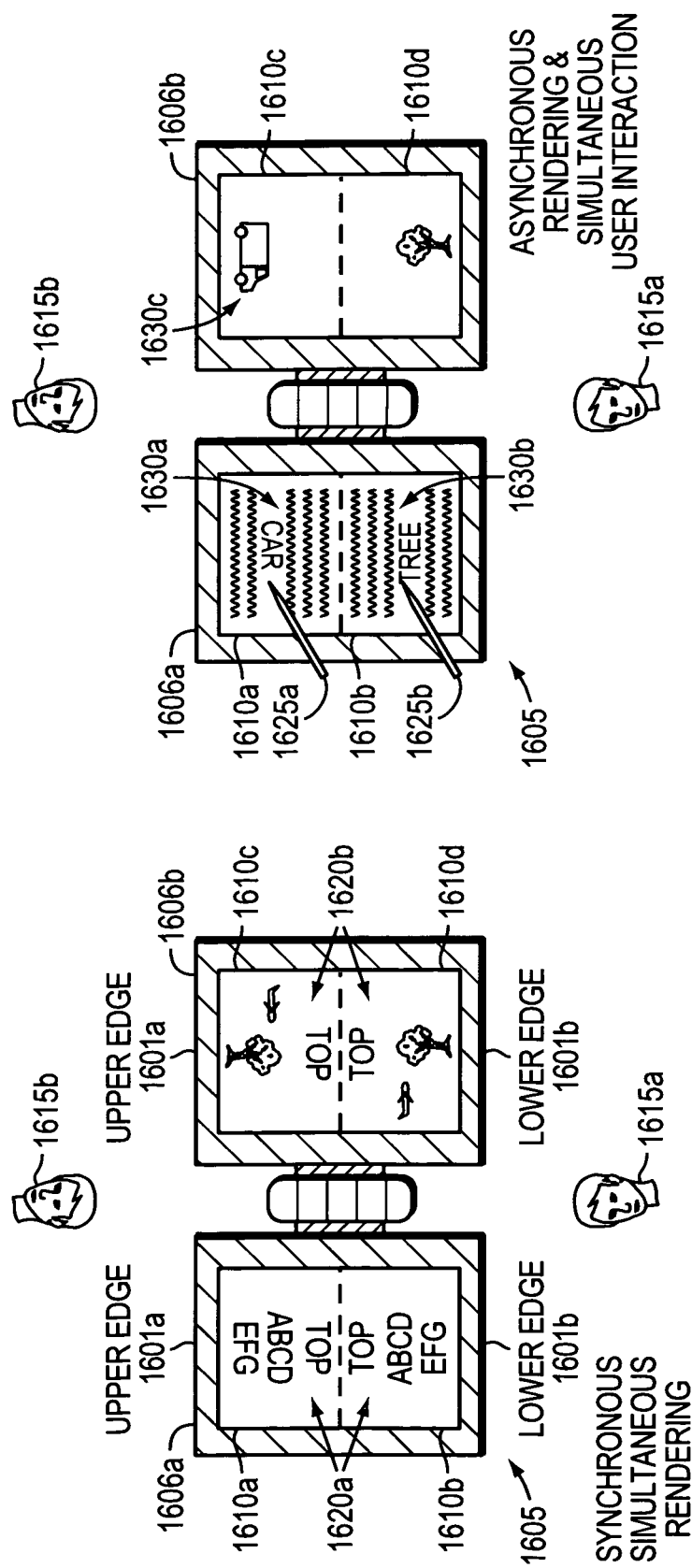
FIG. 16A is a schematic diagram that illustrates synchronous rendering of images rendered on virtual displays of a device allowing multiple simultaneous user interaction.
FIG. 16B is a schematic diagram that illustrates asynchronous rendering of images rendered on virtual displays of a device allowing multiple simultaneous user interaction.

FIG. 15 is a flow diagram of a method 1500 for changing orientations of an image rendered on a device. At 1501, the method begins. At 1505, the method monitors a position/orientation of the device with respect to a viewing angle of the user monitored. At 1510, the method determines whether the orientation of the device with respect to the viewing angle of a user has changed. If the orientation has not changed, the method determines whether the user has requested to change the orientation of the images rendered on the displays of the device, and, if not, the method repeats beginning at 1501. If the orientation has changed, then, at 1515, the method 1500 changes the orientation of the images rendered on the device. Alternatively, at 1510, if the device has detected a change in orientation, the orientation and the images rendered on the displays of the device are changed at 1515, and the method begins again at 1501.

FIG. 16A is a schematic diagram that illustrates synchronous rendering of images rendered on virtual displays of a device allowing multiple, simultaneous, user interactions such as by allowing two or more users to interact with the device 1605 or images rendered therein while viewing the same or different images rendered with respective orientations enabling each user to view right-side-up images. In this example embodiment, the device includes a bi-stable display 1606a and a refresh display 1606b, each having an upper edge 1601a and lower edge 1601b. The bi-stable display 1606a is illustrated as having two virtual displays 1610a and 1610b, each rendering the same image 1620a with respect to a right-side-up viewing angle of a first user 1615a and a second user 1615b respectively. Similarly, the refresh display 1606b may be split into virtual displays 1610c and 1610d, each rendering the same image 1620b in an orientation with respect to a rightside-up viewing angle of the respective user 1615a and a first display with hand 1615b.

In operation, the device 1605 allows two users to interact simultaneously with content rendered on the display(s) 1606a, 1606b of the device 1605. Each user 1615a, 1615b is able to interact with the same (or different) image rendered on each of the virtual displays. The rendering of images on the virtual displays facilitates peer study sessions or tutorial sessions. Further in the case of viewing the same images, the device 1605 (i.e., the controller(s)) (not shown) rendering the images on the display(s) 1606a, 1606b may cause the rendered images to scroll vertically or horizontally, zoom in or out, or otherwise change states in a synchronous manner as a function of interaction with a display 1606a, 1606b or image 1610a, 1610b rendered thereon.

FIG. 16B is a schematic diagram that illustrates asynchronous rendering of images rendered on virtual displays of a device, also allowing multiple user interaction. As stated above, the device 1605 includes a bi-stable display 1606a and a refresh display 1606b. Each of the displays is split into multiple virtual displays, each in an orientation with respect to a first user 1615a or a second user 1615b. Each virtual display 1610a-1610d may be configured to render images from a primary source. In this example embodiment of synchronous viewing and interaction, each user 1615a or 1615b may be able to access content from the primary source in an asynchronous manner. For example, user 1615a may be viewing page 1 of one primary source while user 1615b may be viewing page 10 of the same primary source. Further, each virtual display may be configured to accept user interaction from the user 1615a and user 1615b simultaneously or as a function of controlled access.

In either of the foregoing examples of FIGS. 16A and 16B, interactions that include, for example, the first user's 1615a annotating a representation of the primary source may be immediately reflected as corresponding annotations on the representation of the primary source to the second user 1615b. Further, the annotations may be represented in different colors, line styles, or other manner to enable the users to distinguish their edits from each other's. Further, timecodes or a "collaboration annotation" code may be associated with particular annotations to provide traceability such that the users, administrators of annotations, or other persons can identify annotations made while collaborating with another user and those made while not collaborating with another user. In another embodiment, a collaborative environment may be in the form of a single virtual display, but two style users recognizable from each other (e.g., different thickness, capacities, or radio frequencies) by the displays may enable different collaboration-annotation codes to be associated with the different annotations. It should be understood that in some embodiment, the collaboration-annotations may include more than simply single user identifiers—they may include indications of multiple users making annotations at the same time and which user made the respective particular annotation and, optionally, in which viewing orientation (e.g., left, right, up or down with respect to the bottom edge of the device).

In addition, the displays of the device may include multiple virtual displays meant for a single user. For example, a user may be reading a book on a first virtual display, using a viewing application, while simultaneously taking notes using a note taking application or journal application on a second virtual display on the same (physical) display.

Figure 17:
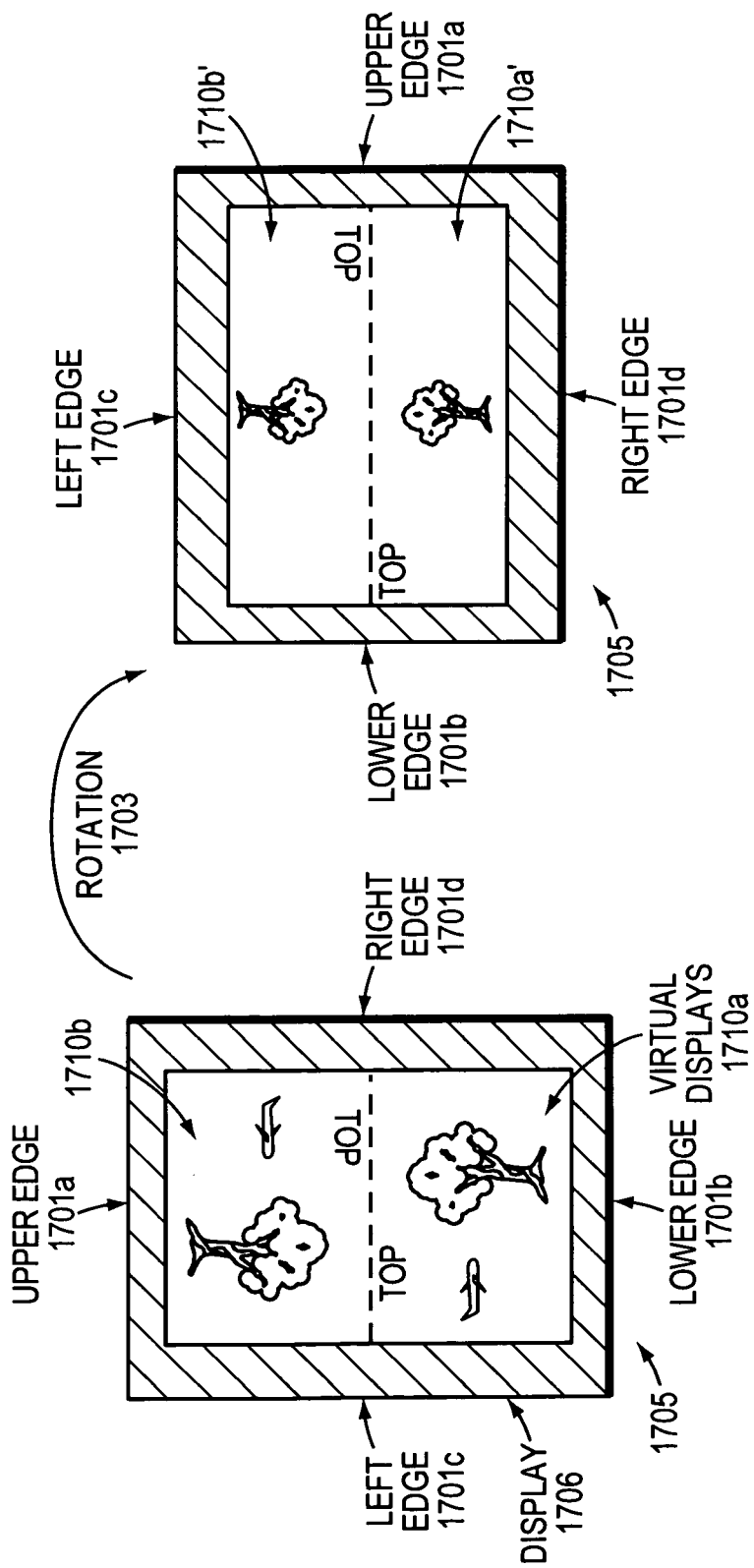
FIG. 17 is a schematic diagram that illustrates rendering of images on a device with respect to an edge of the device.

FIG. 17 is a schematic diagram that illustrates rendering of images on a device 1705 with respect to an edge of the device.

The device includes an upper edge 1701*a* and lower edge 1701*b*. Further, the device includes a display 1706 that is split into virtual displays 1710*a*, 1710*b*, in which the virtual displays have different viewing orientations relative to the lower edge 1701*b*. For example, as illustrated, the display 1706 is split into two virtual displays, one of which (1710*a*) having a viewing orientation which is right-side up with respect to the lower edge and another (1710*b*) which is upside down with respect to the lower edge.

In addition, the device 1705 also includes a left edge 1701*c* and right edge 1701*d*. The display 1706 may be related 1703 and split into virtual displays 1710*a*', 1710*b*' in which the orientations of the virtual displays are defined relative to the left edge or the right edge. For example, as illustrated, one of the virtual displays 1710*a*' is right-side up with respect to the right edge, and the other virtual display 1710*b*' is in orientation upside down with respect to the right edge. The change of orientation of the virtual displays may occur automatically due to a repositioning or reorientation of the display relative to a user, as illustrated, or due to a user request via a human-to-machine interface. Further, the virtual displays 1710*a*, 1710*b*, 1710*a*', 1710*b*' may render images in a synchronous or an asynchronous manner, meaning that multiple users may interact with the same image or different images of a primary source, respectively, optionally with interactions being sensed by the device 1705 and optionally, via the virtual displays simultaneously or individually controllable manner.

Figure 18:
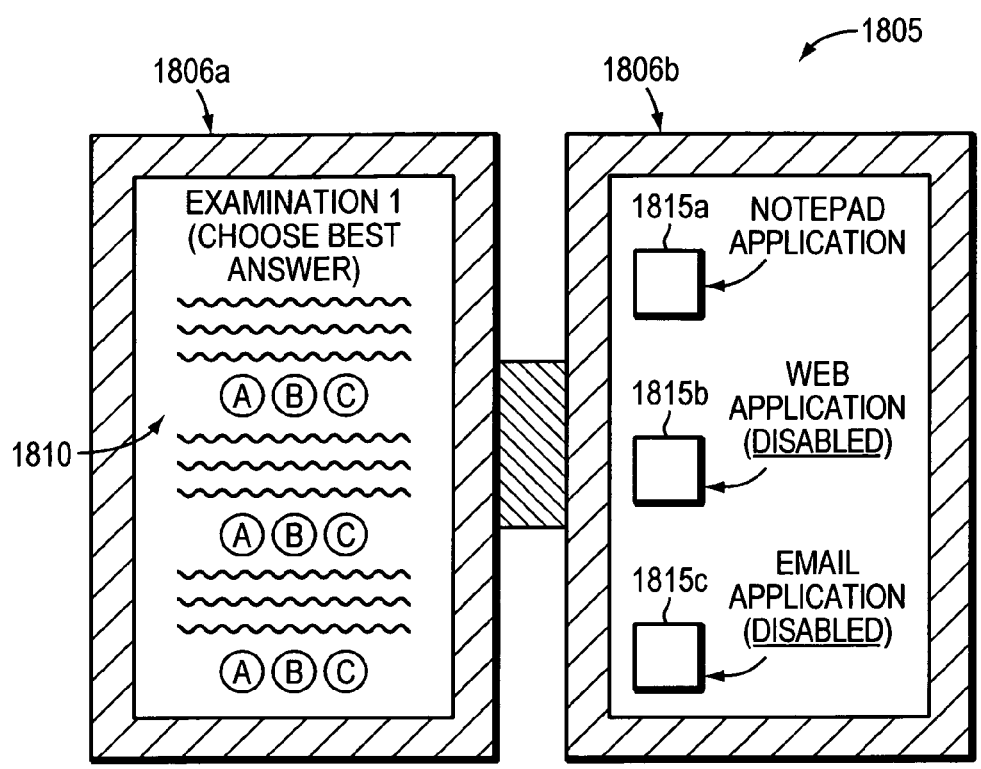
FIG. 18 is a schematic diagram of a device having restricted access to content.

FIG. 18 is a schematic diagram of a device 1805 having restricted access to content via a wired or wireless network connection or even from within its own memory. The device 1805 includes a bi-stable display 1806*a* and a refresh display 1806*b*. As illustrated, an examination 1810 is being rendered on bi-stable display 1806*a*. On the refresh display 1806*b*, user access to content and functions is illustrated. For example, a user may have access to a notepad application 1815*a*, but the user's access to a web application 1815*b* and email application 1815*a* is disabled. Therefore, the user of device 1805, while taking an examination 1810, may be able to take the examination in a similar manner as annotations can be applied or scribble notes while taking the examination via a notepad application 1815*a*. However, the user of device 1805 is restricted from accessing a web application 1815*b* to access content via a network, such as the Internet. Similarly, the user of device 1805 is restricted from accessing an email application 1815*c* in order to communicate with other users. This functionality allows the device 1805 to be used in different settings, where access to certain content needs to be restricted for purposes of an examination.

Further, interaction with a representation of the examination may be direct (e.g., an application enables the user to select an answer via checkbox or freeform text) or indirect (e.g., annotations that are recorded as independent images from the representation of the examination and later processed in some manner based on spatial positioning of the annotations to provide automated examination scoring or printing to allow for manual examination scoring). Additionally, codes may be applied to enable later determination of the examination taker and device on which the examination was taken. Encoding or encrypting in a standard or customized manner may be employed for transferring examination annotations or markings by the user to a server via wired or wireless connection.

Figure 19:
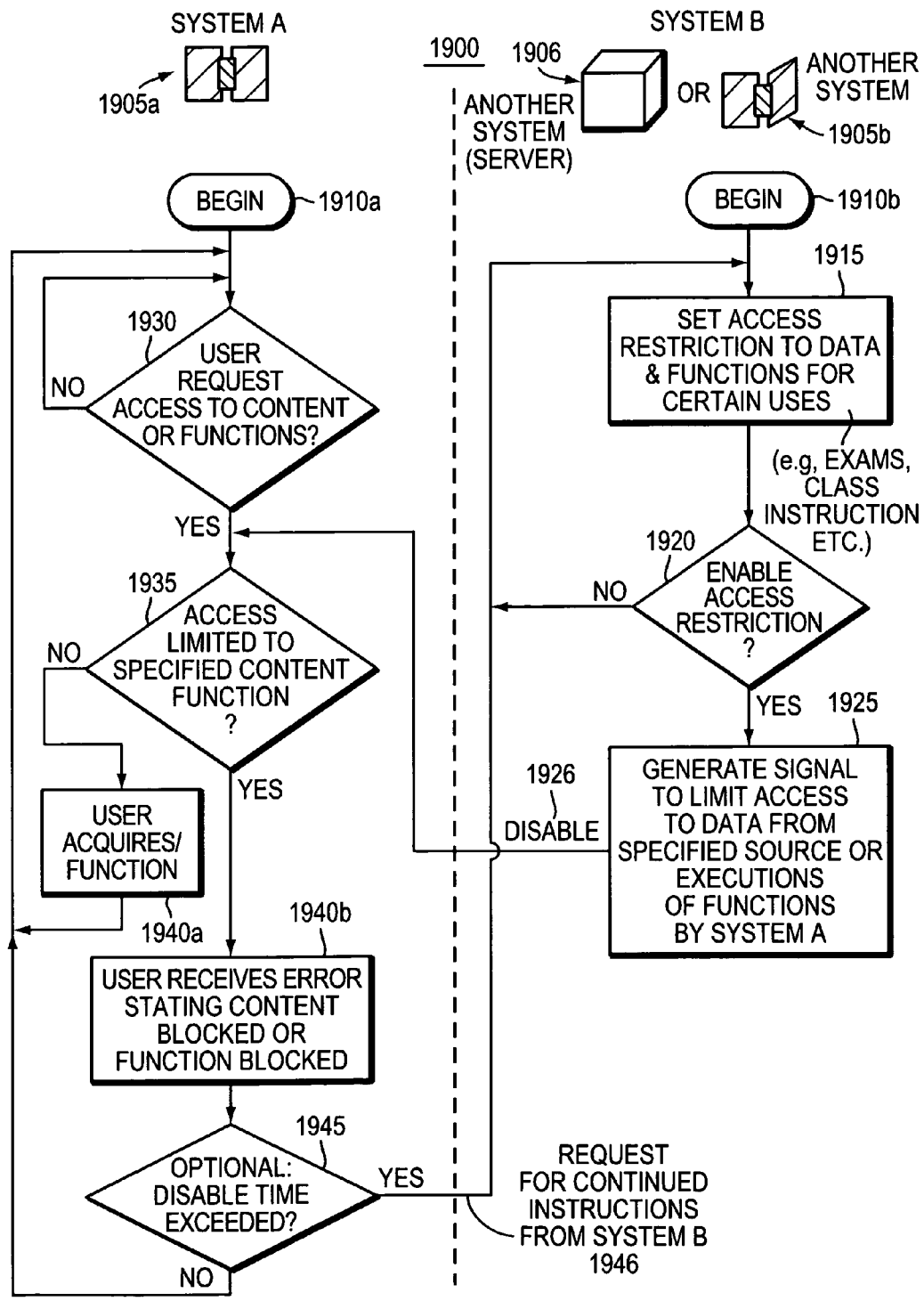
FIG. 19 is a flow diagram of a method of limiting access to content or functions of a device in accordance with an example embodiment of the present invention.

FIG. 19 is a flow diagram of an example method 1900 that may be employed to limit access to content of functions of a device with an example embodiment of the present invention. An example of why such a method may be employed was presented above in reference to FIG. 18 with respect to an examination to be given and taken via a device. Referring to FIG. 19, a device 1905*a*, which is system A that is being used by an examination taker, for example, may be in communications with system B, which may be another device 1905*b* or a server 1906 controlled by an examination giver in this example. The method begins at 1910*a* and 1910*b*. At 1930, the method determines if the user is requesting access to content or functions of the system 1905*a*. If not, the method continues to monitor user request. If the user is requesting access to content or functions, the method determines, at 1935, whether access to such content or functions has been or is being limited by another system B, either the server 1906 or another system 1905*b*. Contemporaneously, system B, at 1915, sets access restriction to data and/or functions of system A. At 1920, system B determines whether to enable access restrictions. If access restrictions are not enabled, a user of system A is able to acquire content or functions requested at 1940*a*. However, if access restrictions are enabled, at 1925, system B generates a signal to limit access of data from a specified source or limits execution of functions of system A. The signal sent may be a disable signal 1926 that enables access restrictions of system A. Therefore, at 1935, the method determines that access to certain functions or content is limited. Next, at 1940*b*, a user requesting access to such content or functions of system A, receives an error stating that the content or functions are blocked. Optionally, at 1945, system A is able to determine whether such limitations have exceeded a disable time. If not, at 1930, the user may begin to request access to content or functions. If the disable time has been exceeded, then the system A, at 1946, can make a request for continued instruction from system B.

To allow control of a device by another device or a server, the devices may be configured to support master and/or slave modes, where master mode enables a device to control device(s) acting in slave mode, and vice-versa.

Figure 20:
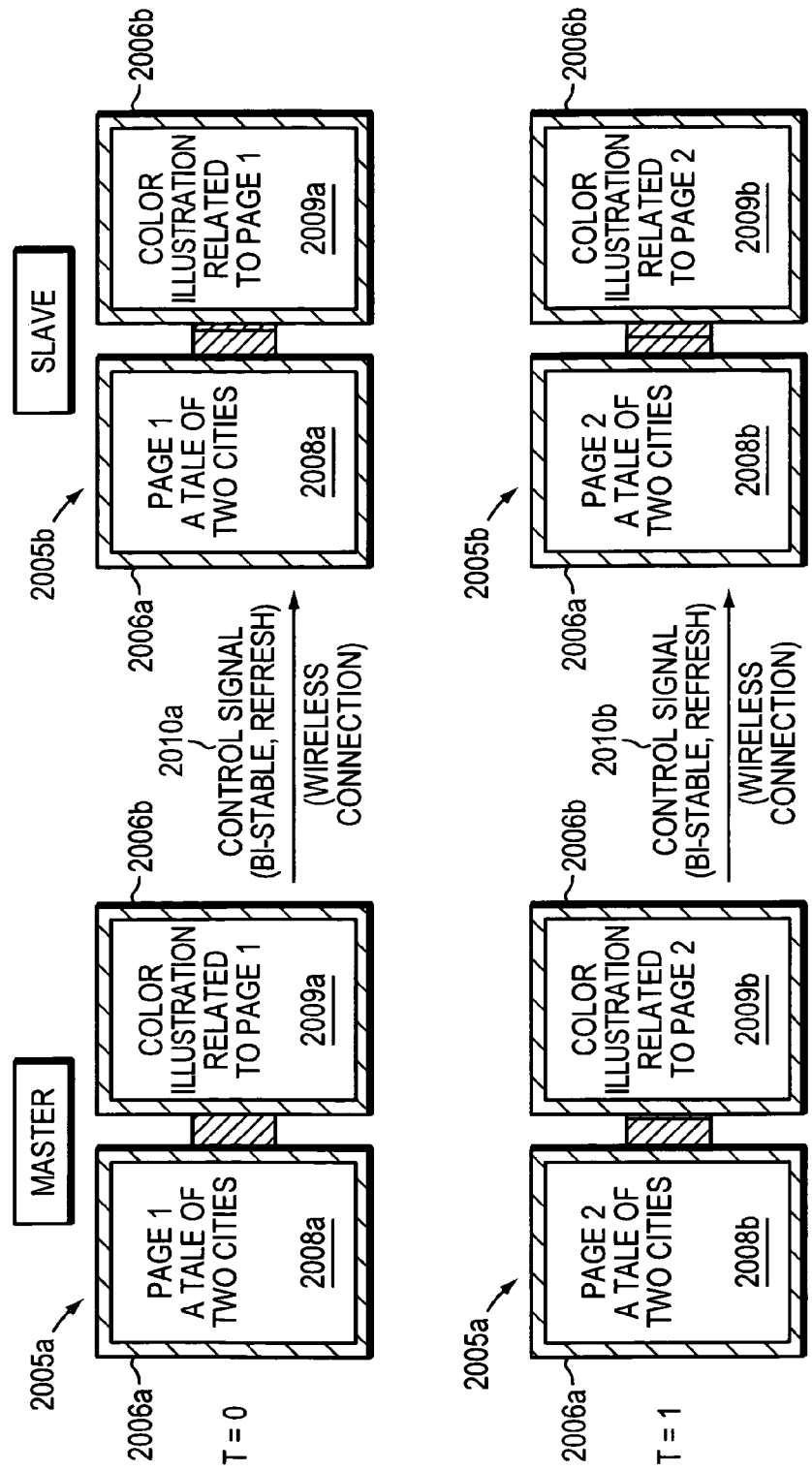
FIG. 20 is a schematic diagram of a device acting in a master mode used to control rendering of images on another device acting in a slave mode.

FIG. 20 is a schematic diagram of a device 2005*a* acting in a master mode used to control rendering of images on another device 2005*b* acting in a slave mode or to control functions at the slave mode devices or functions supporting slave mode devices to communicate with other devices or servers. The device 2005*a* includes a bi-stable display 2006*a* which renders images 2008*a* in a bi-stable display format, and a refresh display 2006*b* which displays images in a refresh display format. Continuing to refer to FIG. 20, in an example scenario, at time T=0, the device 2005*a* is acting in a master mode. In such a state, the device 2005*a* controls rendering of slave device(s), such as device 2005*b*. For example, the user of device 2005*a* is reviewing an image 2008*a* of page 1 of "A Tale of Two Cities" and a color illustration 2009*a* related to page 1. While acting in a master mode, the device 2005*a* can send a control signal 2010*a* via a wireless connection to the device 2005*b*, acting in a slave mode, to render an image 2008*a* of page 1 of "A Tale of Two Cities" on the bi-stable display 2006*a* and the color illustration 2009*a* related to page 1 on the refresh display 2006*b*. At time T=1, the device 2005*a*, still acting in a master mode, has rendered page 2 of "A Tale of Two Cities" 2008*b* on the bi-stable display 2006*a* and color illustrations 2009*b* related to page 2 of "A Tale of Two Cities" on the refresh display 2006*b*. Because the device 2005*a* is still acting in the master mode, the device 2005*a* sends another control signal 2010*b* to the device 2005*b*, still acting in a slave mode, to render another image 2008*b* of page 2 of "A Tale of Two Cities" on the bi-stable display 2006*a* and the color illustrations 2009*b* related to page 2 on the refresh display 2006*b*. Such master and slave modes facilitate the use of classroom instructions such that the user of a slave device is forced to follow along or guided through, depending on one's perspective, a tutorial session given by a professor using a device (or server or computer) acting in a master mode. In addition, master and slave modes can be used to make certain that every user in a classroom setting is following along at the same pace.

Figure 21A:
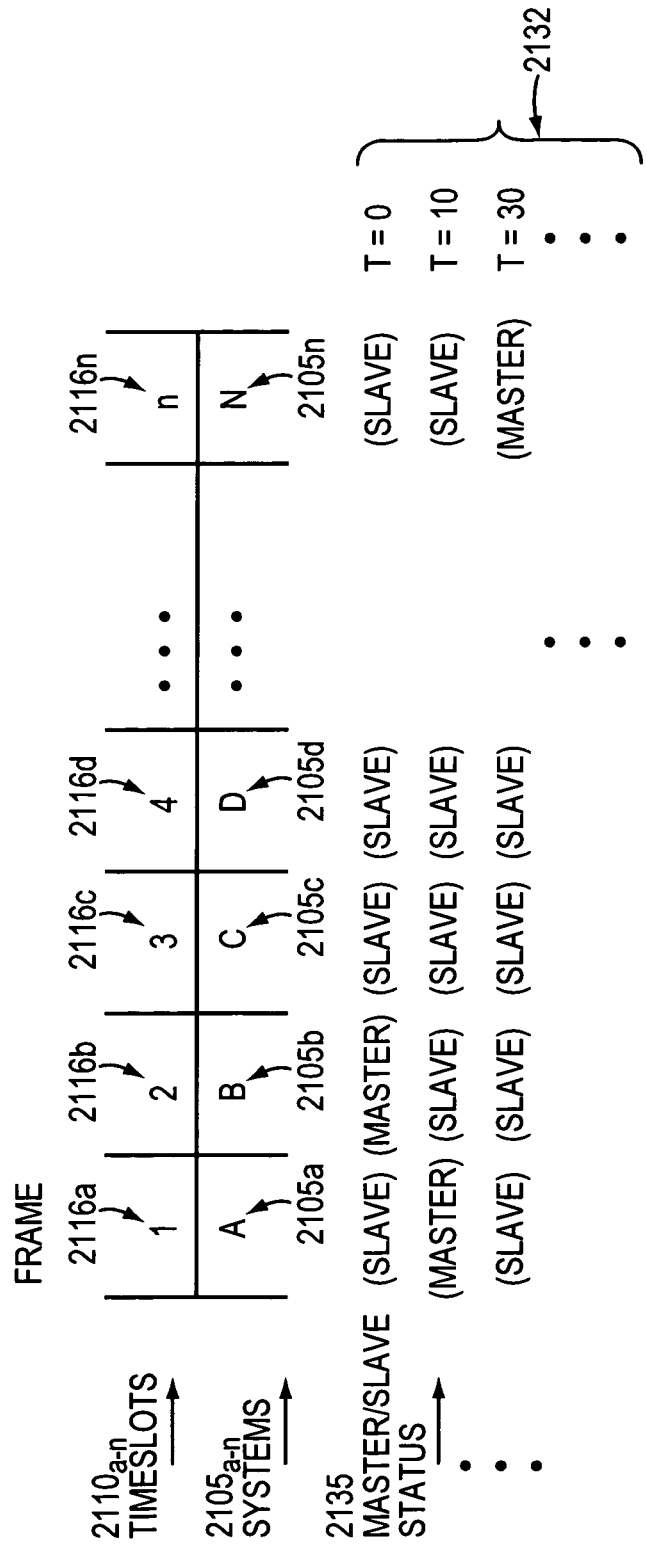
FIG. 21A is a timing diagram illustrating time division multiplexing (TDM) communications of a wireless network having communications with a plurality of devices each acting in a master or slave mode using.

FIG. 21A is a timing diagram illustrating time division multiplexing (TDM) communications of a wireless network having communications with a plurality of devices, where the devices may be communicating for master or slave mode purposes or other purposes. As illustrated, a plurality of systems 2105a-n, or devices, are assigned time slots 2110a-n to transmit frames of messages. For example, a system A 2105a is assigned time slot 1 2110a for messaging, system B 2105b is assigned a second time slot B 2110b for messaging, similarly system C 2105c and system D 2105d are assigned time slots 3 2110c and 4 2110d, respectively. This use of TDM allows a plurality of systems 2105a-n to communicate via one communications channel. As illustrated, at several time periods 2132, the devices 2105a-n may be acting in different master/slave states. For example, at time T=0, device A 2105a is acting in a slave mode, device B 2105b is acting in a master mode, device C 2105c is acting in a slave mode, and device D 2105d is acting in a slave mode. The devices may request to change master and slave states; for example, at time T=10 device A 2105a was granted permission (either by its peers or a master controller or scheduler, such as a network server or other mode, to act in a master mode while devices B-D are configured to act in slave modes and take instructions from device A. Similarly, at time T=30, the devices are configured to be in different master/slave states, as well. Although FIG. 21A illustrates messaging using time division multiplexing, code division multiplexing access (CDMA) or other multiple access protocols may be used.

Figure 21B:
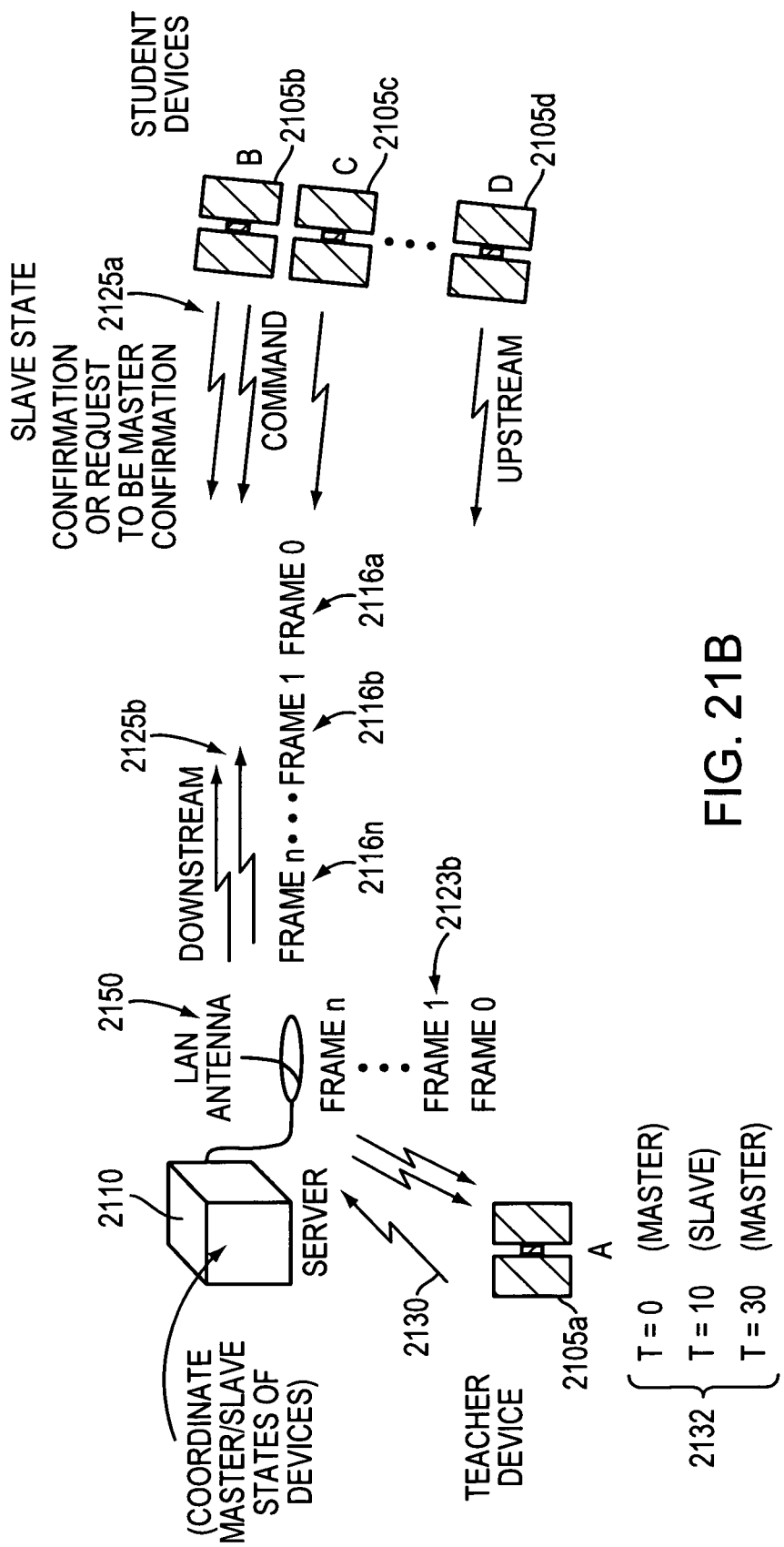
FIG. 21B is a network diagram illustrating wireless communications of a wireless network having communications with a plurality of devices each acting in a master or slave mode.

FIG. 21B is a network diagram illustrating wireless communications of a wireless network having communications with a plurality of devices, each acting in a master or slave mode. The network includes a teacher device 2105a in communication with several student devices 2105b-d. Communications occur via a server 2110 that coordinates master/slave states of the devices. Communications between the teacher device 2105a and student devices 2105b-d may occur wirelessly through a LAN antenna 2150. The teacher device 2105a sends communication messages 2130 via the server 2110 to create a master/slave relationship with the student devices 2105b-d. Messages sent downstream from the server 2110 to the student devices may occur through multiplexing, as described in reference to FIG. 21A, wherein each of the devices, the teacher device 2105a and student devices 2105b-d, are assigned time slots for transmitting messages. For example, at time T=0, the teacher device 2105a sends communication messages 2130 via the server 2110 to coordinate master/slave states between the teacher device 2105a and the student devices 2105b-d. Upon receiving master/slave communications from the teacher device via the server 2130, student devices send confirmations upstream via the server 2110 to the teacher device 2105a. Once master/slave states have been determined, messaging between the devices may occur.

In operation, a teacher using the teacher device 2105a can control classroom instructions once master/slave states of the devices have been coordinated via the server 2110. For example, the teacher device 2105a may be instructing students regarding math problems related to algebraic parabolas. By configuring a master/slave relationship between the devices, the teacher is able to ensure that students operating student devices 2105b-d are following along with the teacher device 2105a. The teacher using teacher device 2105a may request one of the students operating one of the student devices 2105b-d to take over instructions and provide examples of solving a math problem. For example, at time T=0, the master/slave states of the devices may be renegotiated via the server 2110, allowing the student device 2105b to temporarily act in a master mode, thereby controlling other student devices and the teacher device while the student presents the math problem. Once this instructional session has ended, the devices may renegotiate master/slave states, and, at time T=30, the teacher device 2105a may re-assume master mode and continue lecturing while controlling student devices 2105b-d.

The example TDM states and timings are presented for illustration purposes only. To implement TDM or other multiplexing methodology to enable master/slave coordination and messaging exchanges, one would follow standards associated with the respective methodology, as well as understood in the art. The importance of the illustrations is with respect to the master/slave modes between the devices and optionally server(s), not with respect to a chosen communication protocol used to implement the modes.

Figure 22:
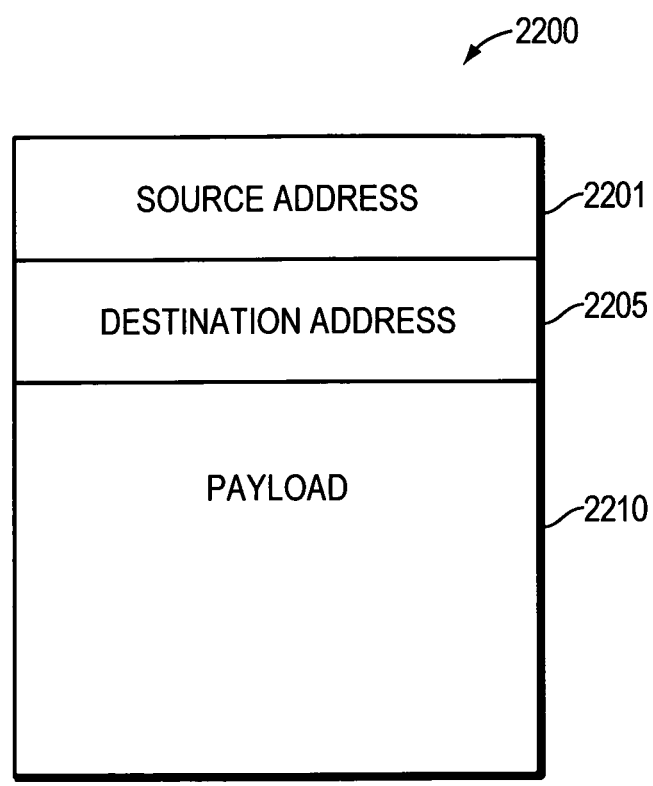
FIG. 22 is a diagram illustrating an example communications packet optionally used to communicate between a server and a device or a device with another device in accordance with an example embodiment of the present invention.

FIG. 22 is a diagram illustrating an example communications packet 2200 optionally used to communicate information between a server and a device or a device with another device in accordance with an example embodiment of the present invention. The communications packet 2200 may include various message fields including a source address field 2201, destination address field 2205, and payload field 2210. The source address field may hold information such as a hardware address of the device sending the packet 2200, an IP address of the device sending the packet 2200 or any other form of address identification of the device sending the packet 2200. Similarly, the destination address field 2205 may hold the hardware address, IP address, or any other type of address information relating to a destination device of the packet 2200. The payload field 2210 holds data being sent between the two devices or with a server.

Figure 23A:
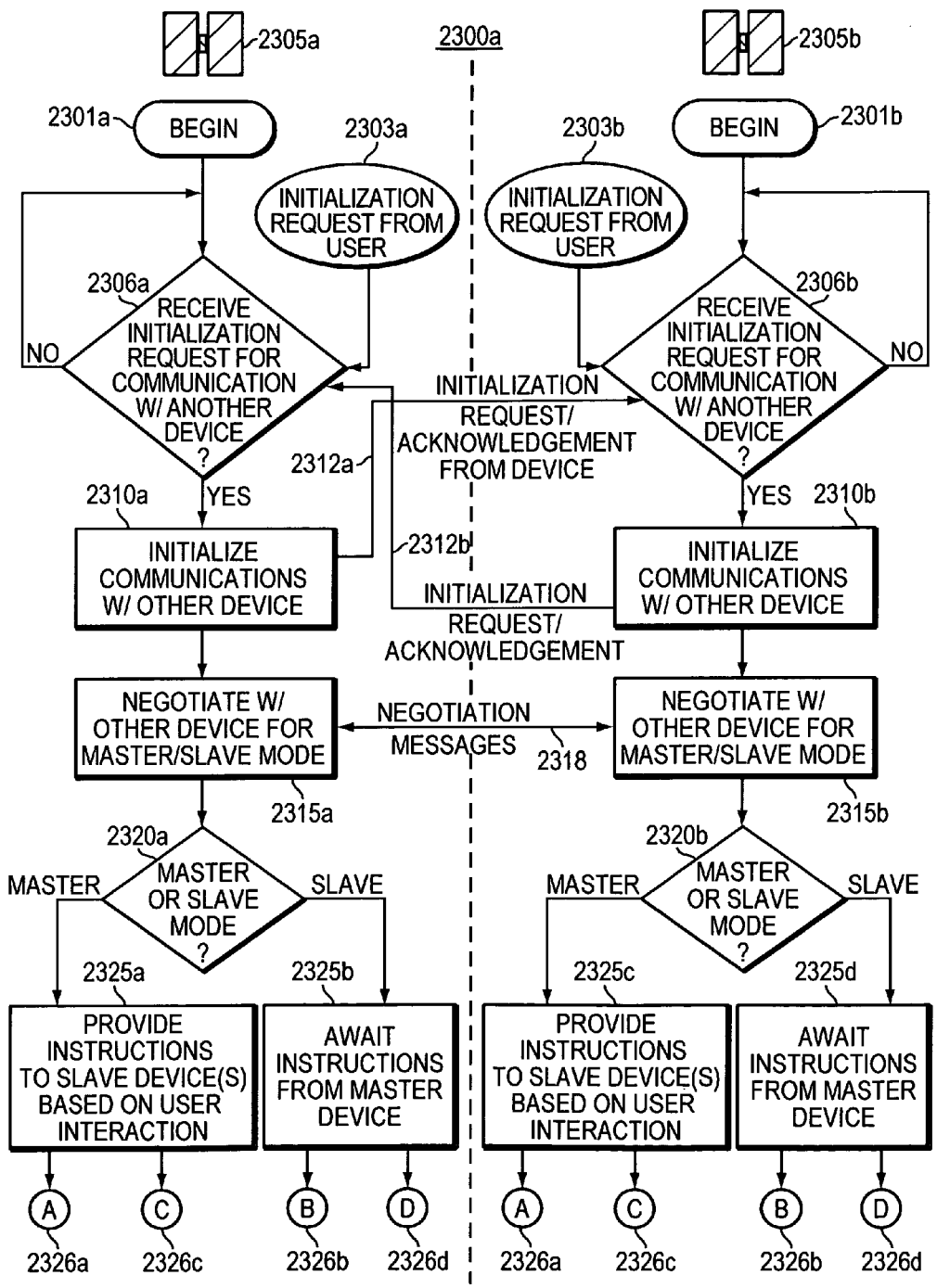
FIG. 23A-C are flow diagrams of methods of operating a plurality of devices each acting in a master or slave mode in accordance with an example embodiment of the present invention.
Figure 23B:
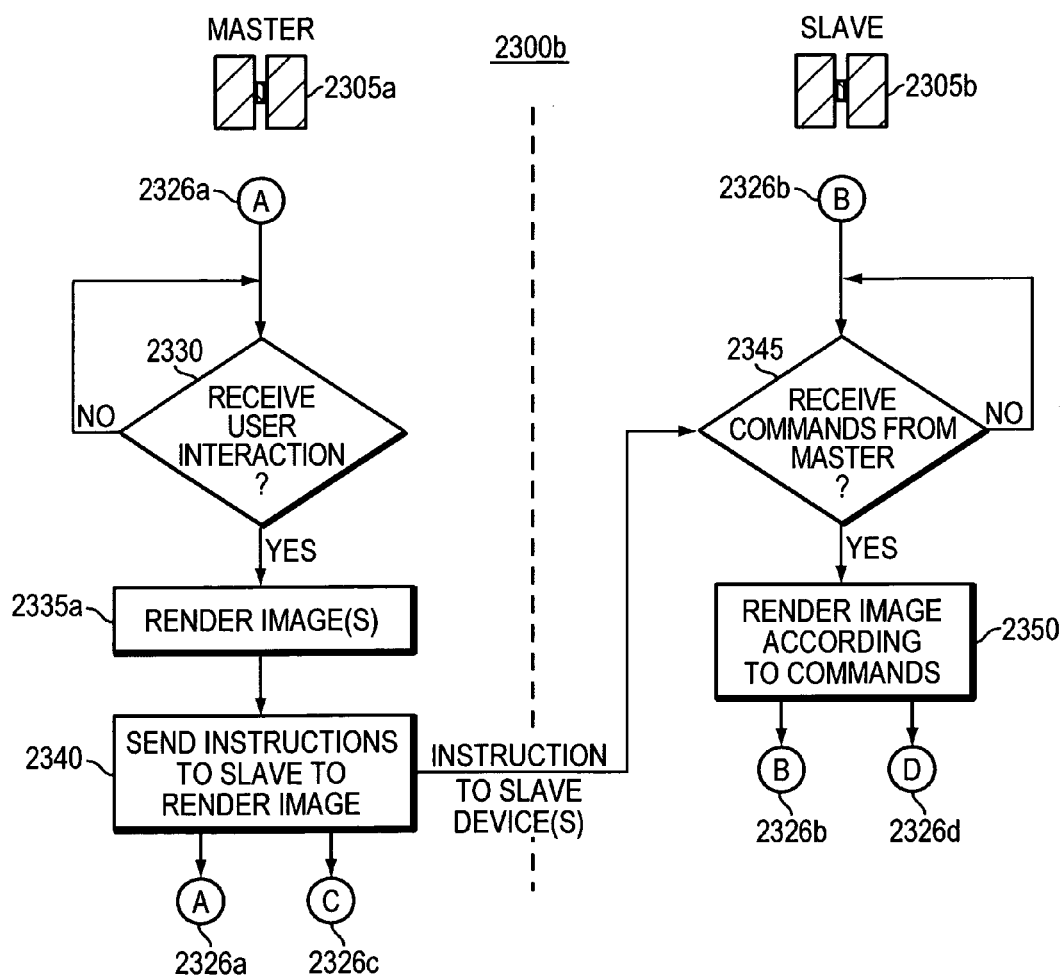
Figure 23C:
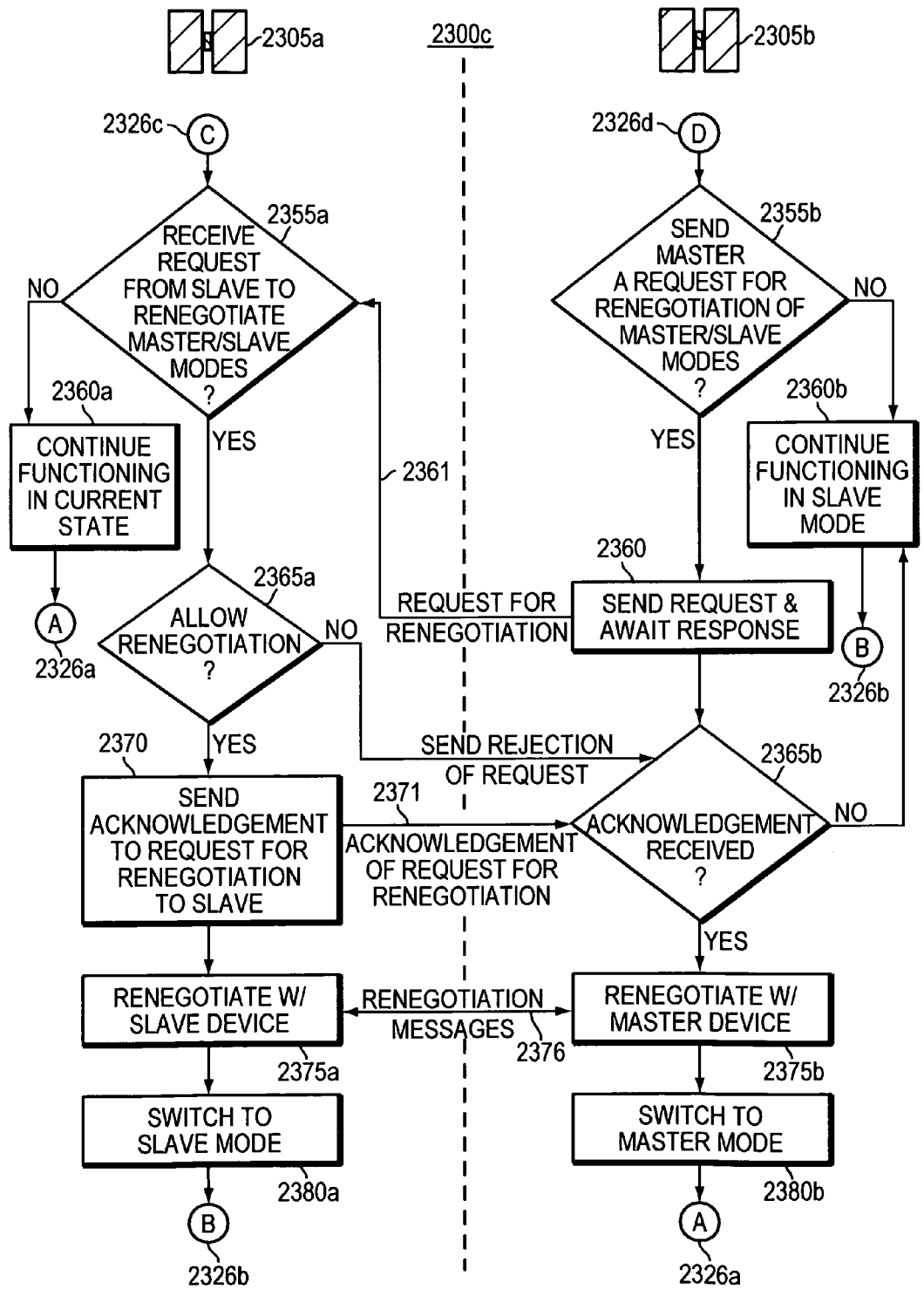

FIGS. 23A-C are flow diagrams of methods of operating a plurality of devices, each acting in the master or slave mode in accordance with an example embodiment of the present invention.

FIG. 23A illustrates a method 2300a of initializing and negotiating master/slave modes between two devices 2305a, 2305b, referred to for the sake of description as the left device 2305a and the right device 2305b, based on their relative positions on FIG. 23A. The method begins at 2301a, 2301b for devices 2305a and 2305b, respectively. At 2306a, the left device 2305a awaits to receive an initialization request for communication with another device from either its user or another device, such as another device or a server, via wireless communications. Contemporaneously, the right device 2301b awaits an initialization request for communication with another device from its user or another device. Assuming, at 2306a, the left device 2305a receives an initialization request from its user 2303a, the left device 2305a, at 2310a, initializes communications with another device, such as the right device 2305b. In initialing communications with the right device 2305b, the left device 2305a sends an initialization request 2312a to the right device 2305b. Upon receiving this initialization request, the right device 2305b, at 2310b, responds with initialization communications by sending an initialization request or response 2312b.

Once initialization has completed, at 2312a and 2312b, the left device 2305a negotiates with the right device 2305b for a master/slave mode. In doing so, the devices 2305a, 2305b send negotiation messages 2318 to each other. At 2320a and 2320b, the devices 2305a, 2305b determine whether they are acting in a master or slave mode. If the left device 2305a is acting in a master mode, at 2325a, the left device 2305a provides instructions to the right, now slave device 2305b, based on user interaction with the left, now master device 2305a. Then, at 2326a or 2326c, the method continues. Alternatively, if the left device 2305a is acting in a slave mode, the left, now slave device 2305a, at 2325b, awaits instructions from a master device, the left, now master device 2305b. Then, at 2326b and 2326d, the method continues.

Contemporaneously, the right device 2305b determines whether it is to be acting in a master or slave mode. At 2325c, the right device 2305b, if acting in a master mode, provides instructions to slave devices based on user interaction with the right, now master device 2305b. Alternatively, if the right device 2305b is acting in slave mode, at 2325d, the right, now slave device 2305b awaits instructions from a master device.

FIG. 23B is a flow diagram of a method 2300b of operating a plurality of devices acting in a master or slave mode. The flow diagram illustrates the left device 2305a, acting in a master mode, communicating with the right device 2305b, acting in a slave mode. The method begins for each device at 2326a and 2326b. At 2330, the left device 2305a, acting in a master mode, awaits to receive user interaction. Until it receives user interaction, the left device 2305a continues to await user interaction, but, if it has, at 2355a, the left device 2305a renders an image based on the user interaction. Then, at 2340, the left device 2305a sends instructions to the right device 2305b, acting in a slave mode, to render images according to the received user interaction with the left device 2305a (i.e., the left, master device 2305a causes the right, slave device 2305b to perform actions it is performing, in this example master/slave mode embodiment). At 2345, the right, slave device 2305b awaits to receive commands from the left, master device 2305a. If it has not, the right, slave device 2305b continues to await commands from the left, master device 2305a. If it has, at 2350, the right, slave device 2305b renders an image according to the commands. The method continues for each device at 2326a-d.

FIG. 23C is a flow diagram of a method 2300c of exchanging master/slave states between the left, master device 2305a and right, slave device 2305b. The method for each device begins at 2326c and 2326d. The right, slave device 2305b, at 2355b may send the right, master device 2305a request for renegotiation of master/slave modes. If the user of the right, slave device 2305b does not send such a request, the right, slave device 2305b, at 2360d, continues to act in a slave mode. However, if, at 2355b, the user of the right, slave device 2305b wished to send a request for renegotiation 2361 of master/slave modes, at 2360, the right, slave device 2305b sends the request for renegotiation 2361 and awaits the response from the left, master device 2305a.

At 2355a, the left, master device 2305a monitors whether it has received a request from the right, slave device 2305b to renegotiate master/slave modes. If the left, master device 2305a does not receive such a request, at 2360a, the left, master device 2305a continues to act in a master mode. If, however, the left, master device 2305a does receive such a request, at 2365a, the user of the left, master device 2305a decides whether to allow such a renegotiation of master/slave modes. If the user of device 2305a does not wish to renegotiate, the left, master device 2305a responds with a rejection of the request. At 2365b, the right, slave device 2305b receives the rejection, and, at 2360b, the right, slave device 2305b continues to act in a slave mode. If, however, the user of the left, master device 2305a does wish to allow such a renegotiation, at 2370, the left, master device 2305a sends an acknowledgment 2371 for the renegotiation of master and slave modes.

At 2365b, the right, slave device 2305b determines that it has received the acknowledgment to renegotiate master/slave modes. Then, at 2375a and 2375b, the devices 2305a, 2305b renegotiate master/slave modes via renegotiation messages 2376. At 2380a, the left, master device 2305a switches to a slave mode, while, at 2380b the right, slave device 2305b switches to a master mode. The method, at 2326b, continues for the right, now master device 2305b and the method, at 2326a, continues for the left, now slave device at 2305a.

It should be understood that the methods 2300b, 2300c can be reversed in a case in which the left device 2305a is acting in a slave mode and the right device 2305b is acting in a master mode.

Figure 24B:
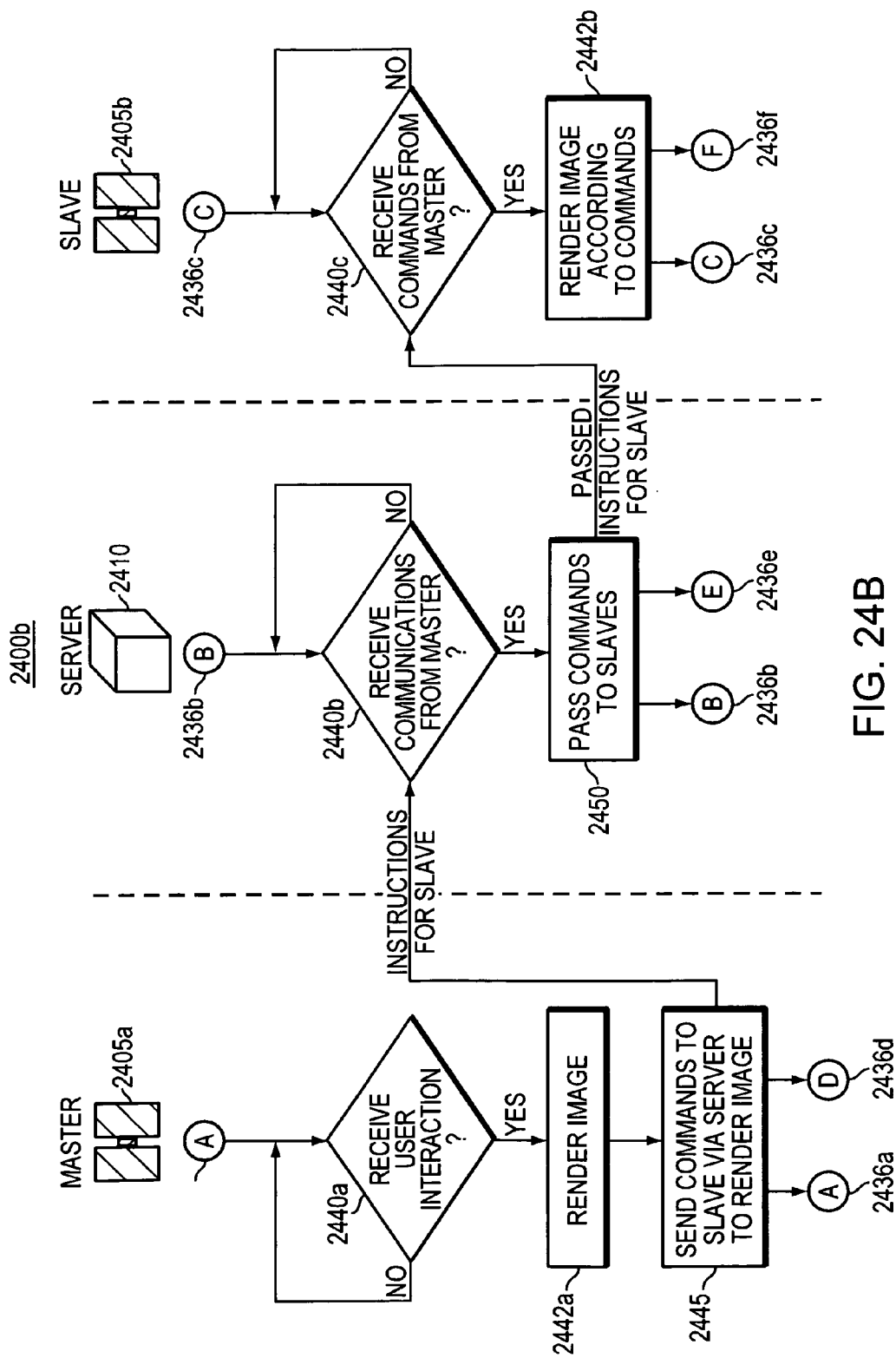

FIGS. 24A-C are flow diagrams of methods of operating a plurality of devices, each acting in a master/slave mode using intermediate server, in accordance with an example embodiment of the present invention.

FIG. 24A is a flow diagram of a method of initializing and negotiating master/slave modes via an intermediate server between two devices, 2405a, 2405b, referred to for the sake of description as the left device 2405a and the right device 2405b, based on their relative positions on FIG. 24A. The method begins for each device at 2401a-c. At 2406a, the left device 2405a awaits to receive an initialization request for a communications session with another device. Contemporaneously, at 2406c, the right device 2405b awaits to receive an initialization request for a communications session with another device. At 2406b, an intermediate server 2410, awaits to receive communications to pass to a specified device. The left device 2405a or the right device 2405b may receive an initialization request from either user 2402a or 2402b, respectively. Alternatively, each device may receive initialization requests from the other device.

In this example, assume that the left device 2405a receives an initialization request 2402a from its user 2402a. At 2406a, the left device 2405a determines it has received an initialization request. Then, at 2412a, the left device 2405a begins initialization communications with the right device 2405b. The left device 2405a begins its initialization by sending an initialization request 2413 via intermediate server 2410. At 2406b, the intermediate server 2410 receives the request 2413 to pass to a specified device, being the right device 2405b. Then, at 2412b, the intermediate server 2410 passes the communications to the right device 2405b. At 2406c, the right device 2405b receives the initialization request from the left device 2405a. At 2412b, the right device 2405b initializes communications with the left device 2405a by sending an initialization acceptance 2414b via the intermediate server 2410. The intermediate server 2410, at 2406b, receives the initialization request. Then, at 2412b, the intermediate server 2410 passes the communications to the specified device, being the left device 2405a. The left device 2405a, at 2412a, receives the initialization communication. Once the left device 2405a receives the initialization communications, at 2420a, it negotiates with the right device 2405b for a master/slave mode. The left device 2405a then sends a negotiation communication 2421a via server 2410. The intermediate server 2410 passes the negotiation communications to the right device 2405b. At 2420b, right device 2405b responds with negotiation communications 2421b.

At 2430a-b, each device determines whether it is to be acting in a master or slave mode. The left device 2405a, if acting in a master mode, at 2435a, provides instructions to slave devices, such as right, now slave device 2405b, based on received user interaction. If, however, the left device 2405a is acting in a slave mode, at 2435b, the left, now slave device 2405a awaits instructions from a master device, such as the right, now master device 2405b.

Similarly, if the right device 2405b determines that it is acting in a master mode, at 2435a, the right, now master device 2405b provides instructions to slave devices, such as left, now slave device 2405a, based on received user interaction. If, however, the right device 2405b determines that it is acting in a slave mode, at 2425d, the right, now slave device 2405b awaits instructions from a master device, such as the left, now master device 2405a. The method for each device continues at 2436a-d.

FIG. 24B is a flow diagram of a method 2400b operating a plurality of devices each acting in a master/slave mode using intermediate server. The devices include the left device 2405a, acting in a master mode, intermediate server 2410, and right device 2405b, acting in a slave mode. The method begins for each device at 2436a-c. At 2440a, the left, master device 2405a awaits to receive user interaction. If it has not, the left, master device 2405a continues to await user interaction. If the left, master device 2405a receives user interaction, at 2442a, the left, master device 2405a renders an image on the appropriate display. Subsequently, at 2445, the left, master device 2405a sends commands to the right, slave device 2405b via intermediate server 2410 to render an image.

Intermediate server 2410, at 2440b, awaits to receive the communications to pass to a specified device. If the intermediate server 2410 has not received communications, it continues to monitor for received communications. If the intermediate server 2410 does receive communications from the left, master device 2405a, at 2440b, the intermediate server 2410, at 2450, passes the commands to the specified device, being the right, slave 2405b.

At 2440c, the right, slave device 2405b awaits to receive commands from the left, master device 2405a via intermediate server 2410. If the right, slave device 2405b has not received commands, it continues to monitor for received commands via the intermediate server 2410. If the right, slave device 2405b does receive commands from the left, master device 2405a via intermediate server 2410, at 2442b, the right, slave device 2405b renders an image on the appropriate display of the right, slave device 2405b, according to the received commands from the left, master device 2405a. The method continues, for each device, at 2436a-f.

FIG. 24C is a flow diagram of a method 2400c of operating a plurality of devices each acting in master or slave mode using an intermediate server to renegotiate master and slave modes. The left, master device 2405a is in communication with the right, slave device 2405b via the intermediate server 2410. The method begins for each device at 2436d-f. At 2455c, the right, slave device 2405b monitors whether its user wishes to request to renegotiate master and slave modes with the left, master device 2405a. If such a request is not detected, the right, slave device 2405b, at 2456b, continues to act in a slave mode. On the other hand, if the right, slave device 2406b does detect such a request, at 2460a, the right, slave device 2405b sends a request to the left, master device 2405a and awaits a response. The request to renegotiate master/slave mode 2461a is sent via intermediate server 2410. At 2455b, intermediate server 2410 monitors for communications to be passed to a specific device. If the intermediate server 2410 has not received communications to pass to another device, at 2455, the server 2410 continues to monitor for communication messages. If the intermediate server 2410 does receive a communication that needs to be passed to another device, at 2460c, the intermediate server 2410 passes the received communications to the specified device.

At 2455a, the left, master device 2405a monitors for received requests from a slave device, such as the right, slave device 2405b to renegotiate master and slave modes. If, at 2455a, the left, master device 2405a has not received such a request, at 2456a, the left, master device 2405a continues acting in a master mode and, at 2436a, the method continues. If, on the other hand, the left, master device 2405a does receive such a request from the right, slave device 2405b to renegotiate master and slave modes, at 2460b, the left, master device 2405a determines whether its user wishes allow a renegotiation of master and slave modes. If, at 2460b, the user of left, master device 2405a does not wish to renegotiate master and slave modes, the left, master device 2405a sends a rejection 2461b to the right, slave device 2405b via intermediate server 2410. At 2470, the right, slave device 2405b receives the rejection, and, at 2456b, the right, slave device 2405b continues acting in a slave mode. The method, at 2436c, continues.

However, if the user of the left, master device 2505a wishes to allow such a renegotiation, at 2465a, the left, master device 2405a sends an acknowledgment for the renegotiation of master and slave modes. The acknowledgment 2466a, is sent via intermediate server 2410. The right, slave device 2405b, at 2470, receives the acknowledgment. Upon determining that the renegotiation request has been acknowledged, at 2475, the right, slave device 2405b begins renegotiations with the left, master device 2405a for a switch of master/salve modes. The right, slave device 2405b then sends a renegotiation communication 2476a via intermediate server 2410. At 2480, the left, master device 2405a receives the renegotiation communication, and responds with renegotiation communications 2481a. At 2490a, the left, master device 2405a switches to a slave mode, and contemporaneously the right, slave device 2405b, at 2490b, switches to a master mode. The method for the left, now slave device 2405a continues at 2436a, while the method for the right, now master device 2405b continues at 2436a.

It should be understood that the methods 2400b, 2400c can be reversed in a case in which the left device 2405a is acting in a slave mode and the right device 2405b is acting in a master mode.

Figure 25A:
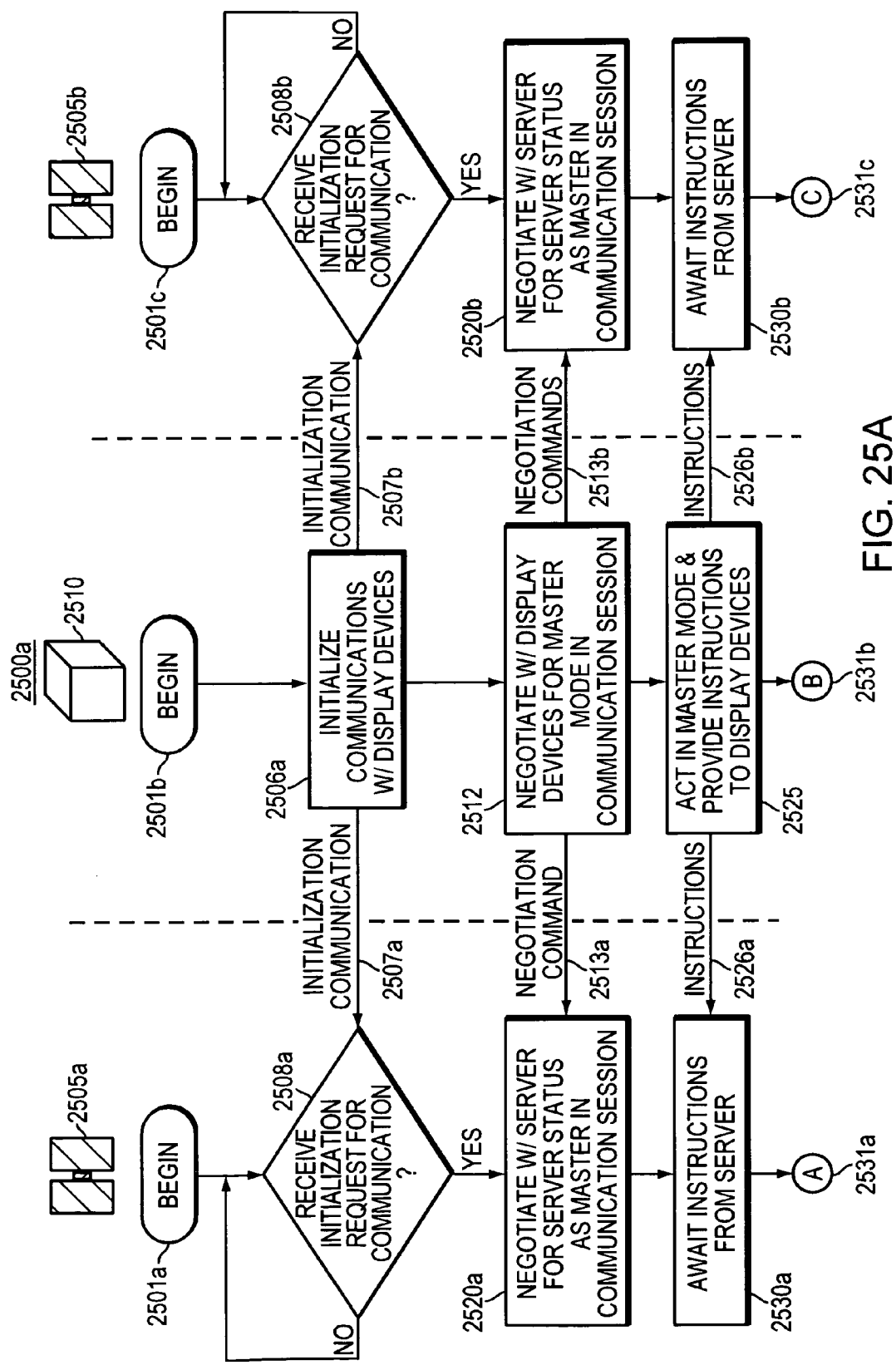
FIG. 25A-B are flow diagrams of methods of operating devices acting in a slave mode in combination with a central server acting in a master mode in accordance with an example embodiment of the present invention.
Figure 25B:
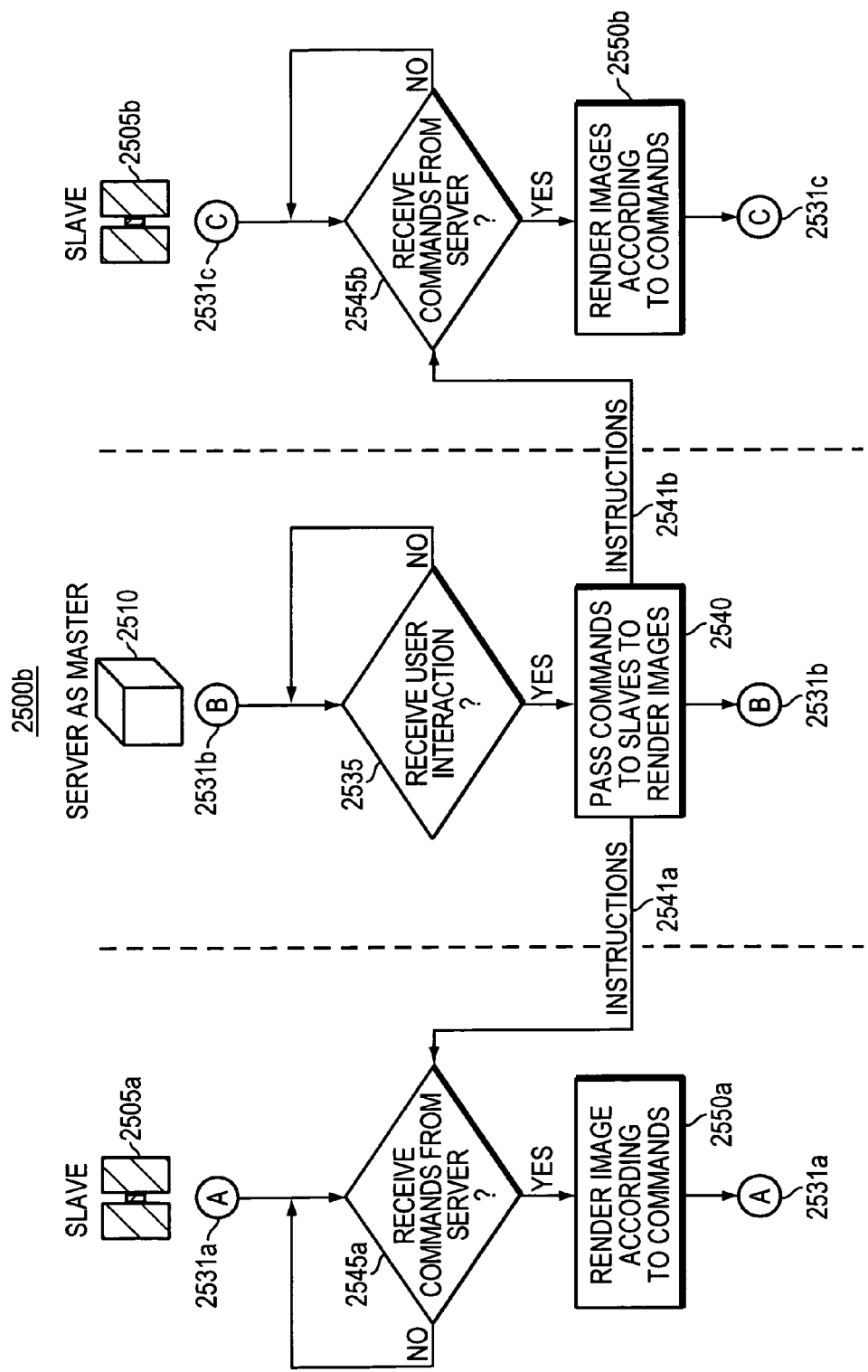

FIGS. 25A-B are flow diagrams of a method 2500a of operating devices acting in a slave mode in combination with a central server acting in a master mode.

FIG. 25A is a flow diagram of a method of initializing and negotiating master/slave modes between an intermediate server 2510 and two devices, 2405a, 2405b, referred to for the sake of description as the left device 2405a and the right device 2405b, based on their relative positions on FIG. 25A.

The server 2510 is in communication with devices 2505a and 2505b. The method begins for each device at 2501a-c. At 2506a, the server 2510 initializes communications with devices 2505a and 2505b by sending an initialization communication 2507a to the left device 2505a and sending an initialization communication 2507b to the right device 2505b. At 2508a, the left device 2505a monitors for received initialization requests. If the left device 2505a has not received an initialization request, the left device 2505a continues to monitor for such an initialization request. Similarly, at 2508b, device 2505b awaits for an initialization request. If the right device 2505b has not received a communication request, the right device 2505b continues to monitor for an initialization request.

On the other hand, if the left device 2505a receives an initialization communication 2507a, at 2520a, the left device 2505a negotiates with server 2510 for a server mode as master in a communication session. Similarly, the right device 2505b, at 2520b, upon receiving an initialization request from intermediate server 2510 at 2508b, negotiates with the server 2510 for the server mode as master in a communication session.

At 2512, the server 2510 negotiates with the left device 2505a and right device 2505b for a master mode in the communication session by sending a negotiation command 2513a to the left device 2505a, and a negotiation command 2513b to the right device 2505b. At 2525, the intermediate server now acting in a master mode provides instructions to the devices for rendering images. The server 2510 sends instruction 2526a to the left device 2505a. Similarly, server 2510 sends instruction 2526b to the right device 2505b.

At 2530a, device 2505a awaits instructions from the server 2510. Similarly, at 2530b, the right device 2505b awaits instructions from server. The method continues for the left device 2505a at 2531a, the method continues for server 2510 at 2531b, and the method continues for the right device 2505b at 2531c.

FIG. 25B is a flow diagram of a method 2500b of operating devices acting in a slave mode in combination with a server acting in a master mode. The method begins for server 2510, at 2531b, for the left device 2505a, at 2531a, and the right device 2505b, at 2531c. At 2535, the server 2510 monitors for user interaction. If the server 2510 has not received user interaction, it continues monitoring for such user interaction. If, however, the server 2510 receives user interaction, at 2540, the server 2510 passes commands to the left device 2505a and right device 2505b, each acting in a slave mode, to render images according to the user interaction. The server 2510 passes instructions 2541a to the left device 2505a and instructions 2541b to the right device 2505b.

At 2545a, the left device 2505a monitors for received commands from server 2510. Upon receiving a command from the server 2510, at 2550a, the left device 2505a renders images according to the commands. Similarly, at 2545b, the right device 2505b monitors for received commands from server 2510. Upon receiving such commands, at 2550b, the right device 2505b renders images according to the commands. The method continues, at 2531a, for the left device 2505a, at 2531b, for server 2510, and, at 2531c, for the right device 2505b.

Operations of a device within a context of a system were described above in reference to FIGS. 6-25B. FIGS. 26A-D illustrate an example application of the device, namely annotating a source reference, storing the annotations with coding to enable later retrieval with accurate presentation with respect to the source reference, and sharing the annotations with users of other devices.

Figure 26A:
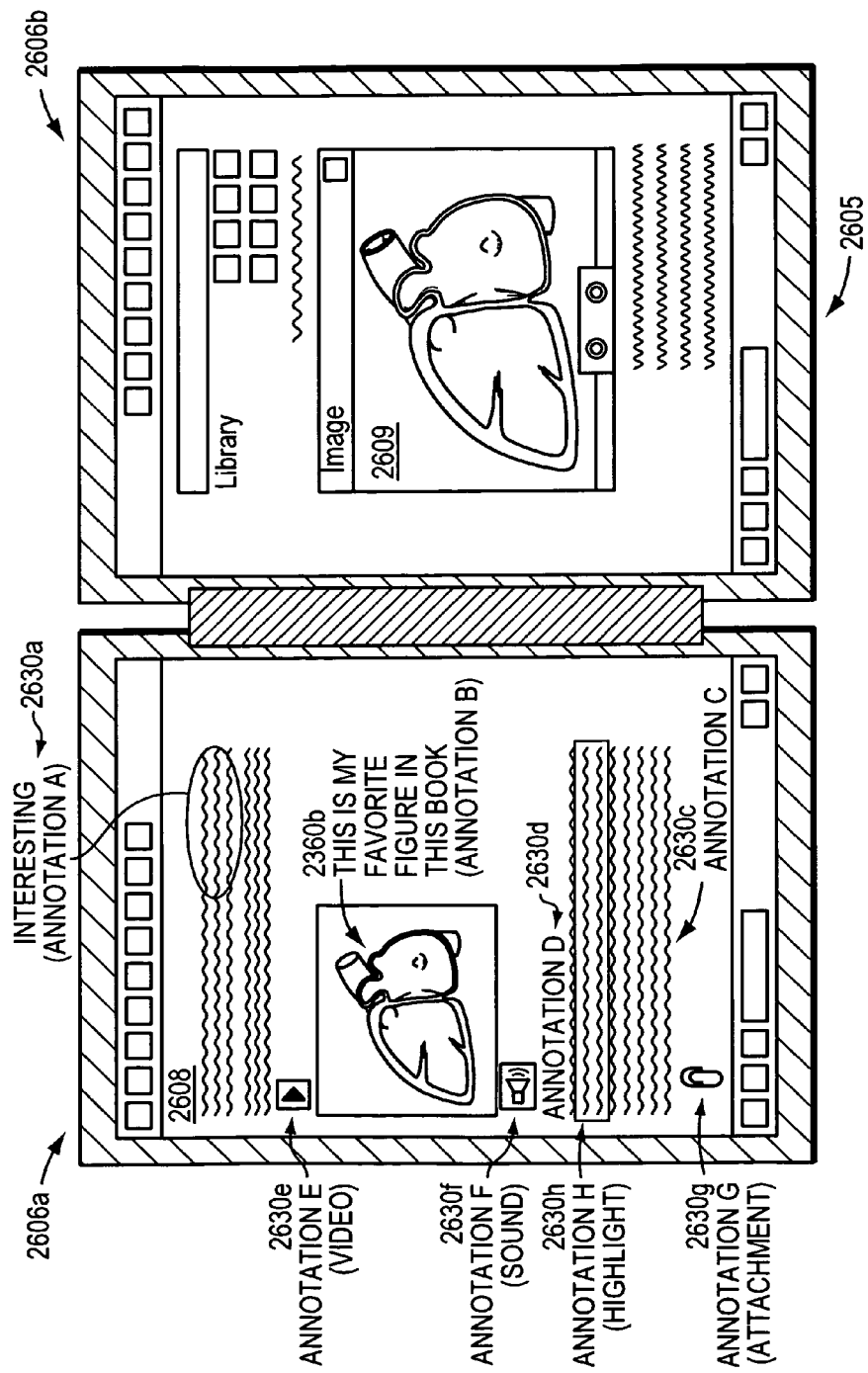
FIG. 26A is a graphical diagram of content of a primary source (e.g., a book) annotated by a user of a device.

FIG. 26A is a graphical diagram of content of a primary source (e.g., pages of a text book) annotated by a user of a device 2605. The device 2605 includes a bi-stable display 2606a and a refresh display 2606b. Content of the primary source may be rendered on the bi-stable display 2606a as an image 2608. Similarly, an image of the primary source may be rendered on the refresh display 2606b. The difference between the rendered images is that, with today's bi-stable displays, the image rendered on the bi-stable display 2606a is grey-scale and us updated slowly, such as when flipping to a next page of an electronic book, while the image rendered on the refresh display 2606b may be full color and updates very quickly, such as faster than video rates of 30 frames per second or more. The advantage of the bi-stable display 2606a is in its very low power consumption, but at an expense of color and refresh rate.

A user may annotate the primary source via either display 2606a or 2606b to include information used to supplement the content. For example, the user may include annotations 2630a-h that provide some additional information to be associated with the primary source for optional future reference. For example, the user may include hand-written annotations 2630a-b, textual annotations 2630c, link annotations 2630d, multi-media annotations such as video annotation 2630e, sound annotations 2630f, attachment annotations 2630g, or highlighted annotations 2630h. Other example annotations may include graphical annotations or formatting annotations.

The annotations may be associated with the primary source (or representation thereof) in a number of ways, including: graphical overlay in a separate layer; inline or embedded association in a form of in-line text, modified text, and so forth in a same graphical layer as the primary source; softbutton or icon located in the same or different layer as the primary source; and so forth, as understood in the art.

Figure 26B:
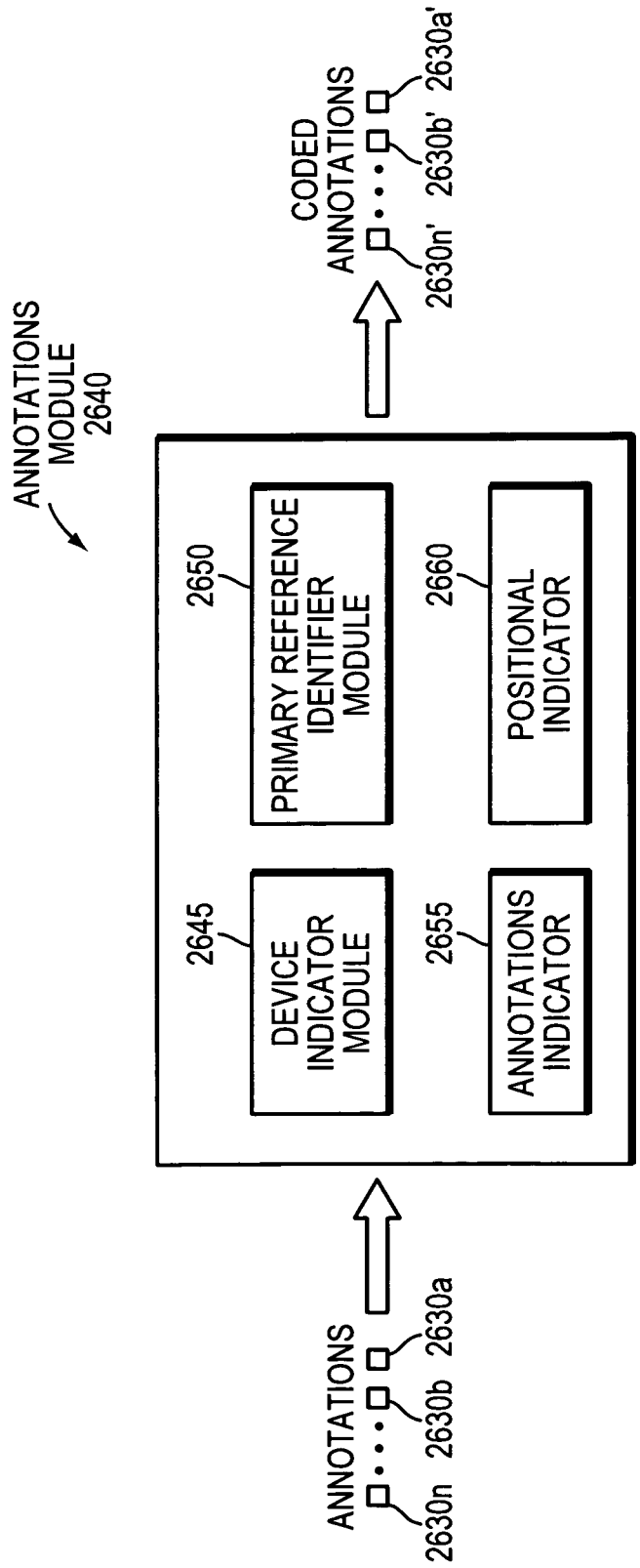
FIG. 26B is a block diagram of an annotations module used to annotate content of a primary source.

FIG. 26B is a block diagram of an annotations module used to annotate content of a primary source. The annotations module 2640 includes a device indicator module 2645, primary source identifier module 2650, annotations indicator 2655, and positional indicator 2660. When a user of the device 2605 applies annotations to a primary source via the device 2605, the annotations module 2640 associates information with the representation of the annotation. For example, the annotations module 2640 may associate a unique user device indicator (i.e., identifier) via the device indicator module 2645 to a representation of the annotation that identifies the specific device used to apply the annotations to the primary source.

Further, the device indicator module 2640 may also associate a unique user indicator that identifies a person that was using the device. For example, the device may have a biometric sign-in (e.g., fingerprint reader, iris reader, or voice identifier) that allows the device indicator module 2640 to determine that a given person made a particular annotation based on the sign-in information. Similarly, a user may provide annotations using a stylus pen (not shown) having a unique code, recognizable by the device, that identifies the person who owns the pen. In this example, in the case of an RF-emitting stylus pen, a unique code that rides on or modulates the RF signal and identity of the person who owns the stylus pen may be registered with a central registry (not shown). The annotations uploaded to an annotations server may include or otherwise be associated with the code, and the annotations server may access the central registry and associate with the annotations an identity of the person associated with the unique code. In a similar or the same way, the device indicator module 2640 may associate a specific person with the annotation.

In addition, the annotations module 2640 may provide a primary source identifier using the primary source identifier module 2650 that identifies the primary source upon which the annotation is applied. The annotations module 2640 may use an annotations indicator 2655 that monitors where the annotation is applied relative to the primary source in conjunction with positional indicator 2660 that indicates a position of the primary source to which the annotation was applied. The annotations with associated information may be referred to herein as coded annotations.

Figure 26C:
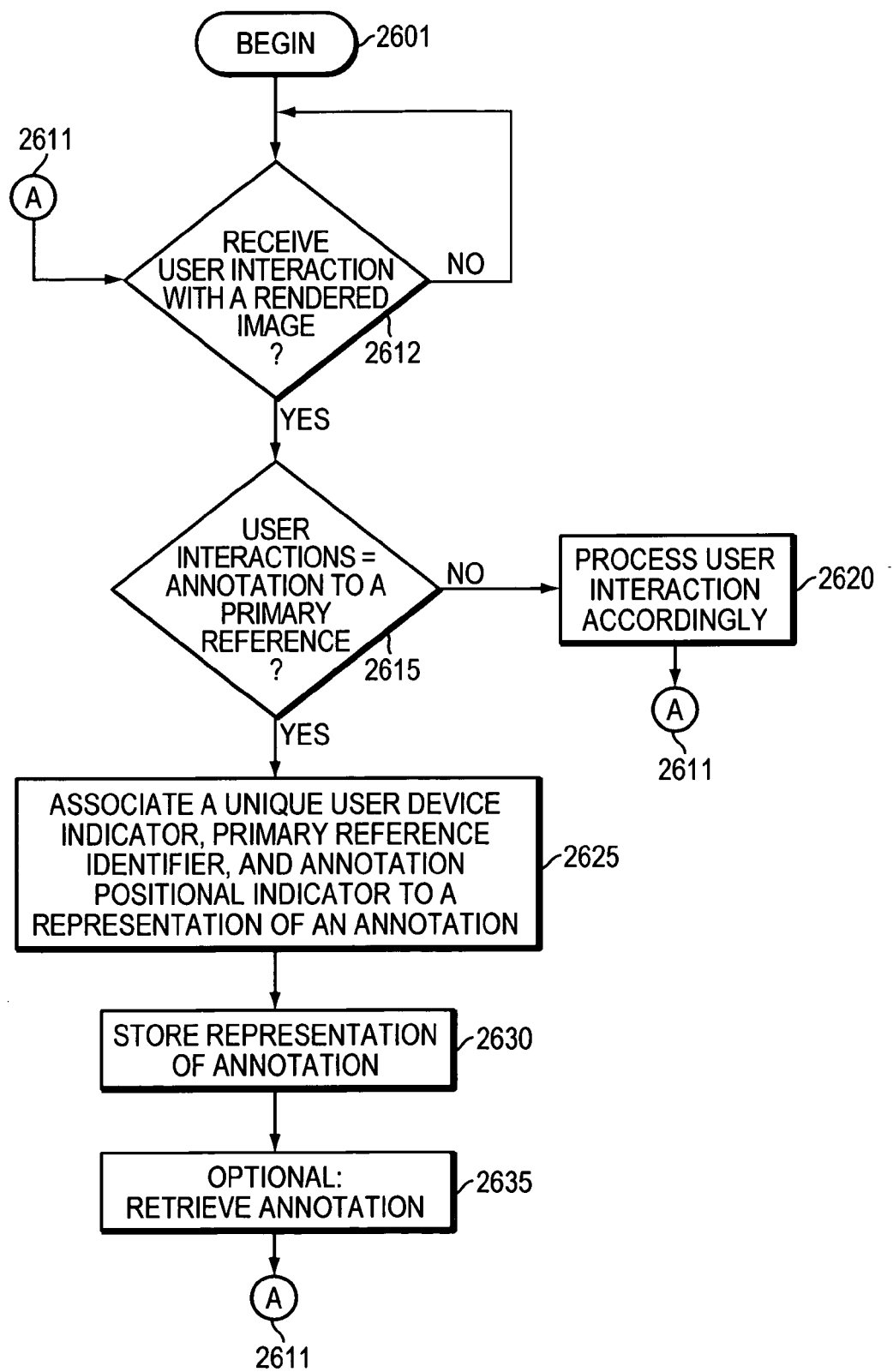
FIG. 26C is a flow diagram of a method of annotating content of a primary source by a user of a device.

FIG. 26C is a flow diagram of a method of annotating content of a primary source by a user of a device. At 2601, the method begins. The device, at 2612, monitors whether it has received user interaction with an image rendered via at least one of the device's displays. If the device has not received such a user interaction, the device, at 2612, continues monitoring for user interaction. If the device has received user interaction with an image rendered via at least one of the device's displays, at 2615, the device determines if the user interaction includes the annotation of a primary source by a user. If the user interaction does not include an annotation with a primary source, the device, at 2620, processes the user interaction, accordingly. The method, at 2611, continues. If, however, the user interaction does include an annotation to a primary source, the device, at 2625, associates information such as a unique user device indicator, primary source indicator, and annotation positional indicator, to a representation of the annotation. The device, at 2630, stores the representation of the annotation in storage. At 2635, the device or any other device may optionally retrieve the annotation from storage. The method, at 2611, continues.

TABLE

| Annotation | Primary Source Position Code | Time Code | Collaboration-Indication Code |
|---|---|---|---|
| a | page 2, (x,y) | 1 | user 1 |
| b | page 1, line 3 | 1 | user 1 |
| c | page 3, para 3 | 4 | user 1,2: user 2 |
| d | page 10, (x,y) | 7 | user 1,2: user 3 |

As discussed above in reference to FIGS. 26A-C, information may be associated with a representation of an annotation. This information may be useful to identify a device used to create the annotation, primary source upon which the annotation was applied, and position with respect to the primary source of the applied annotation. In addition, a collaboration-indication code and time code may be associated with the representation of the annotation. The collaboration-indication code may be used to identify users annotating a primary source via a single device, or users annotating a primary reference during a single session, such as a tutorial session, classroom instruction, or boardroom meeting. As illustrated in the Table above, the collaboration-indication code identifies users applying annotations to a primary source and the user that applied a specific annotation. The collaboration-indication code may be useful for forensic purposes, such as identifying users applying annotations collaboratively, and metrics to identify benefits of collaborative work.

Figure 26D:
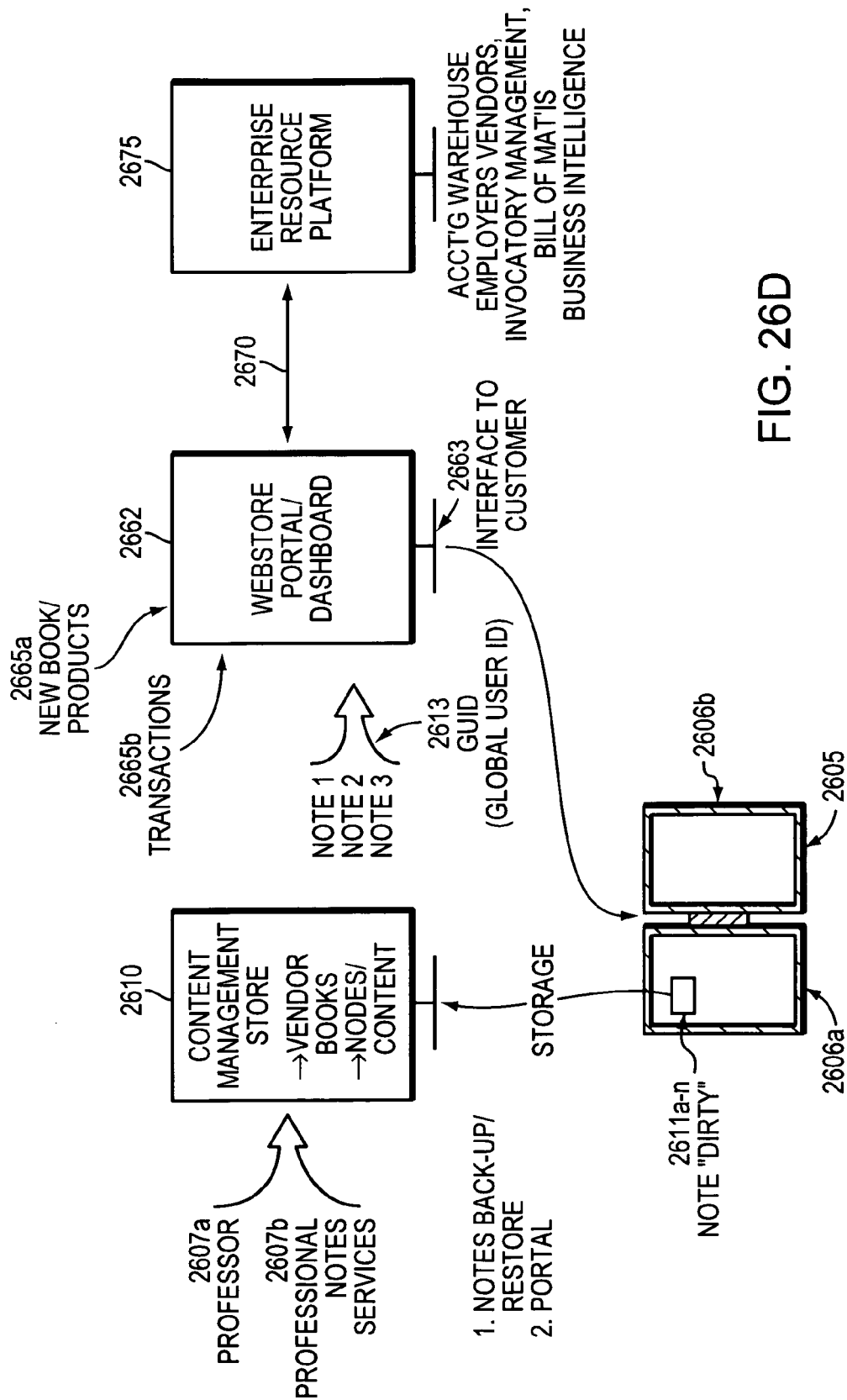
FIG. 26D is a block diagram illustrating storage and acquisition of annotations or notes by a device.

FIG. 26D is a block diagram illustrating storage and acquisition of annotations or notes by the device 2605. It should be understood that acquisition of the annotations may also be performed by other devices. The device 2605 may include a bi-stable display 2606*a* and a refresh display 2606*b* or a single display of either type. As illustrated, the user of the device has applied a note in the form of an annotation, which may be referred to herein as "dirty" before coding or other processing has been applied. The user may include more than one note 2611*a-n*. Upon providing notes associated with a primary source, the user of device 2605 may wish to store the notes in a storage device. The user may then upload the note to a content management store 2610. Similarly, the content management store may store 2610 notes from a professor 2607*a* or various other notes associated with a primary source, such as from a profession notes service 2607*b*. A global user ID (GUID) 2613 may be associated with each note. The GUID may be used to identify the user who created the note or what device was used to create the note. Many other forms of IDs may also be applied. In addition, many different codes, such as those described above in terms of identifying a particular book, version, page number, line number, spatial position, orientation, collaboration may also be stored with the note at the web store 2662 and later retrieved with the note. For example, a user who purchases an annotation or a note may access a link, associated with the annotation or provided in the note, pointing to a uniform resource locator (URL) of a webstore from which to purchase content associated with the note. The codes may be considered an annotation code or as type of metadata, depending on ones point of view.

These notes may be transferred to other users via a web store 2662, accessible via a standard or customized dashboard. The web store 2662 may be accessible by customers via an interface 2663. Using the web store 2662, other users may purchase or otherwise obtain notes, new books, or products 2665*a*.

The web store 2662 may be in communications with an enterprise resource platform 2675 via a communication link 2670. The enterprise resource platform 2675 may provide an accounting warehouse, employee information, vendor information, inventory management capabilities, and business intelligence capabilities.

Figure 26E:
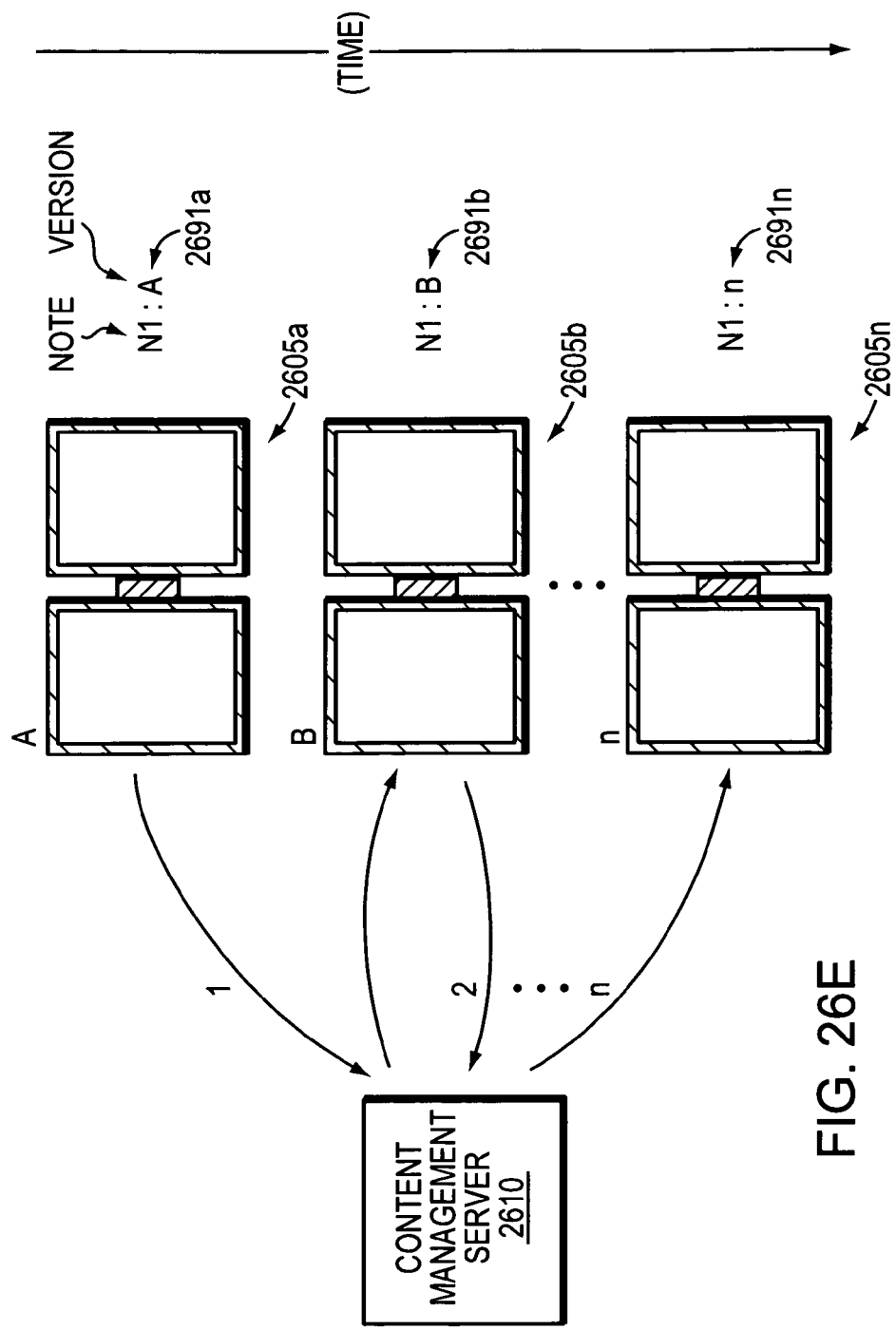
FIG. 26E is a block diagram illustrating storage and retrieval to and from a content management server of multiple versions of a single annotation or note, optionally by multiple devices.

FIG. 26E is a block diagram illustrating storage and retrieval of multiple versions of a single note (or annotation or other user-generated content such as audio or video content). A user of a first device 2605*a* may create a note 2691*a* associated with content the user of the first device 2605*a* may be accessing. The note 2691*a*, as stated in reference to FIG. 26D, may have information (e.g., metadata) associated with it. The user may then decide to upload the note 2691*a* to the content management server 2610 for storage, later retrieval, or distribution to other users. A user of a second device 2605*b* may then wish to download the note 2691*a*. The user of the second device 2605*b* may have found the note 2691*a* through a search of the content management server or otherwise have been notified of its existence and availability. Upon retrieving the note 2691*a*, the user of the second device 2605*b* may wish to edit the note 2691*a*. The user may wish to edit the first note 2961*a* for a multitude of reasons, such as for correcting an error or adding additional information. Following editing of the first note 2691*a*, the user of the second device 2605*b*, has created a second version 2691*b* of the first note 2691*a*. This second version 2691*a* may then be uploaded to the content management server 2610. The editing process may continue through an $n^{th}$ user of an $n^{th}$ device 2605*n*. Different versions of notes may be illustrated in the content management server 2610 numerically or through the use of color differentiation or other technique. Although the figure illustrates users editing a note to create several versions 2691*a-n* of the single note, any type of media content (e.g., audio, video, etc.) may be amended to have several versions.

Figure 26F:
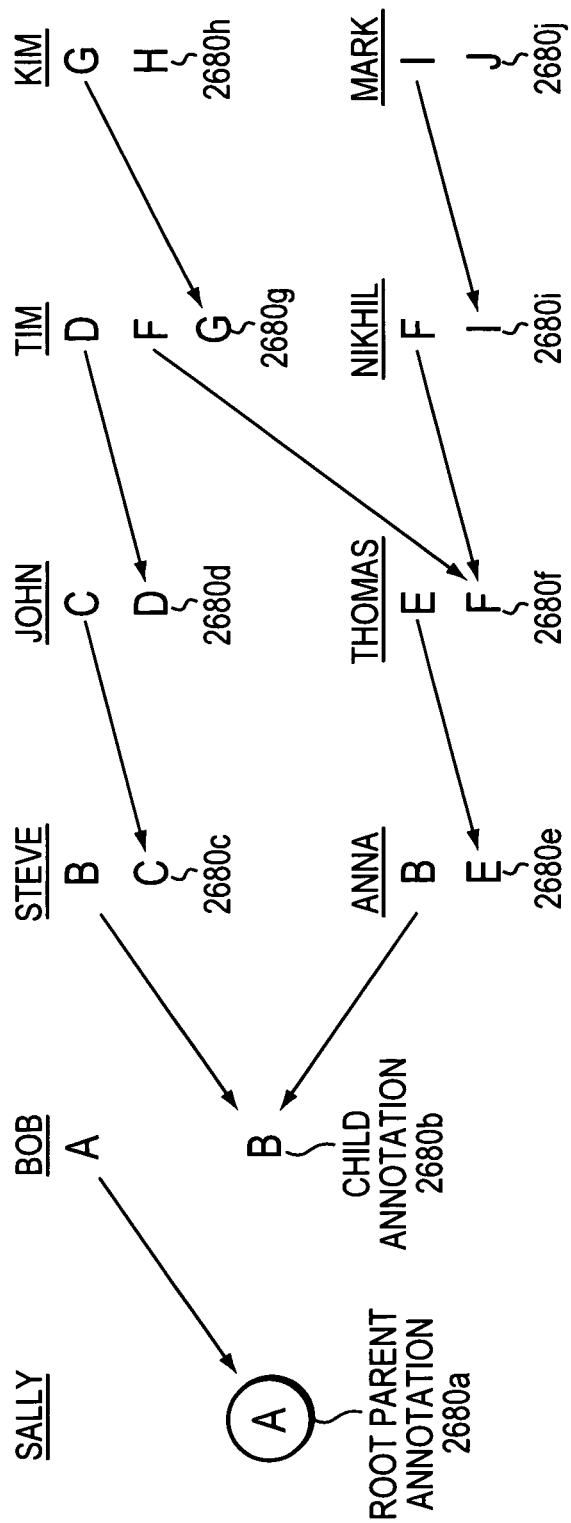
FIG. 26F is a block diagram illustrating relationships among different versions of annotations or notes.

FIG. 26F is a block diagram illustrating the relationship between different versions of annotations. As stated above in reference to FIG. 26D, each note may be assigned a Global User ID (GUID). The GUID of an original annotation (or note), or the first version of the annotation, may be referred to as a root parent annotation, and the GUID is considered a root parent ID. Each subsequent version of the annotation may be referred to as a child annotation, and the GUID may then be referred to as a child ID. Each child annotation may be the parent annotation of a subsequent version. A child annotation may include metadata that refers to its parent annotation. This reference allows a user who acquires an annotation to track the progression of edits made to the most current version of the annotation all the way back to the original or root parent annotation.

For example, a user Sally may create a root parent annotation 2680*a*. Subsequently, n versions of the root parent annotation 2680*a* may be created. Each version of an annotation may include embedded data, such as metadata, that refers to its parent annotation. As illustrated, users Kim and Mark have created the most recent child annotations 2680*h* and 2680*j* (versions) of Sally's root parent annotation 2680*a*. Kim's annotation 2680*h* includes metadata that refers to its parent annotation, which is child annotation 'G,' created by Jim. Similarly, Mark's annotation 2680*j* includes metadata that refers to its parent annotation, which is child annotation 'I,' created by Nikhil. Each child annotation, as illustrated, refers to its parent annotation, leading back to the original, or root parent annotation 'A,' created by Sally.

In some circumstances, an annotation may be the child of more than one parent annotation. As illustrated, annotation 'G,' created by Jim, may be the child annotation of both annotation 'D,' created by John, and annotation 'E,' created by Thomas. Jim may have originally edited one of the annotations, and then copied content from the other annotation. Upon copying, the copied text may contain embedded data, referencing its source.

The referencing of parent annotations allows an author of an annotation to maintain rights to versions of the author's annotation. Similarly, referencing of parent annotation(s) may prevent, be used to prevent, or be used to identify plagiarism of annotations.

In addition, a centralized annotation versions database (not shown) at an annotations server (not shown) may store all of the relationships among the annotations. In that way, deletion of a child annotation from a middle portion of a chain of annotations versions does not prevent future determination of an annotation's lineage all the way back to the root parent annotation. Moreover, although annotations are illustrated as having metadata indications of itself and its immediate predecessor annotation(s) (parent annotation(s)), the metadata may include any number of metadata indications, including metadata indications all the way back to the parent annotation. However, keeping the number of metadata indications to a small number allows for better scalability.

FIGS. 27-30 illustrate an embodiment of the invention in which a device includes two displays, such as a bi-stable and refresh display or other different display types, in which a user may view content on one display, having a set of characteristics, such as grey-scale in the case of a bi-stable display, but have a preference or need to see the content via the other display, having a different set of characteristics, such as color or higher refresh rate in the case of a refresh display (e.g., color LCD display).

Figure 27:
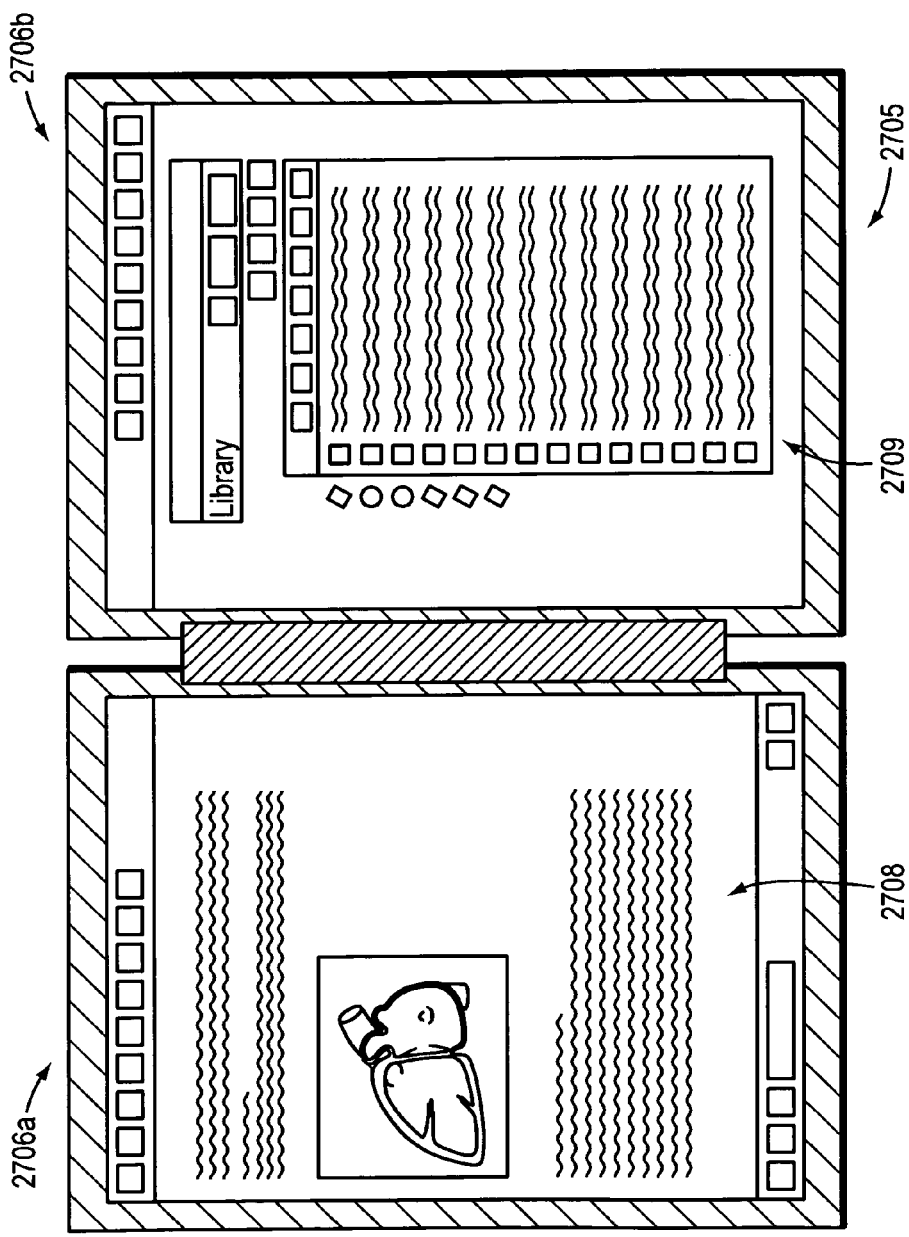
FIG. 27 is a diagram of an image rendered on a bi-stable display of a device to be rendered on a refresh display of the device.

FIG. 27 is a diagram of an image 2708 rendered on a bi-stable display 2706*a* of a device 2705 that may be selectively rendered, in part or in whole, on a refresh display of the device 2705. As illustrated, an image 2708 is rendered on the bi-stable display 2706*a*. The image 2708 to be displayed via the bi-stable display 2706*a* may be first rendered by software using an image buffer in a color RGB (red green blue) pixel image format. The data in the buffer may be passed to a graphical display library, which renders the image as a grey scale image via the bi-stable display 2706*a*.

The original image buffer may be retained for use by a snapshot tool, which may be implemented via hardware, firmware, or hardware configured by software. If and when a user chooses to display a portion of the current image rendered on the bi-stable display 2706*a* on the refresh display 2706*b*, the user may invoke a snapshot tool (e.g., accessed by "clicking" on a camera icon (not shown)) on the bi-stable display 2706*a*. A single click on the camera icon may activate the snapshot tool. If the user selects the camera icon a second time, a controller (not shown) inside the device 2705 transfers the complete image 2708 rendered on the bi-stable display 2706*a* to be rendered via the refresh display 2706*b*. Alternatively, the user may select the camera icon one time and choose to select a portion of the image 2708 by dragging a stylus (e.g., cursor controlled by a computer mouse) over a region of the image 2708. The point at which the user first contacts the stylus to the display 2706*a* is considered the start point and, when the user raises the stylus from the display 2706*a*, that point is considered the end point. The two points may be translated by the controller to minimum and maximum values (or other values) in x and y directions to determine the region of the image buffer to transfer to the refresh display 2706*b*. After transfer is done by writing the relevant chosen portion of the image 2708 into a bitmap (BMP) formatted image file (not shown), joint photographic experts group (JPEG), tagged image file (TIF), portable network graphic (PNG), or any other file type, the location for a path to the image file is sent in a message (not shown) via an Internet Protocol (IP) socket (or other mechanism) to the refresh display 2706*b*. When the refresh display 2706*b* receives the message, the refresh display 2706*b* or associated controller raises an intent (i.e., software request instantiated for a particular purpose) to view a BMP image, which is handled by a refresh display viewer (not shown), which may be capable of scaling and panning the image 2709 on the refresh display 2706*b*, and, optionally, performing other graphical functions.

Figure 28:
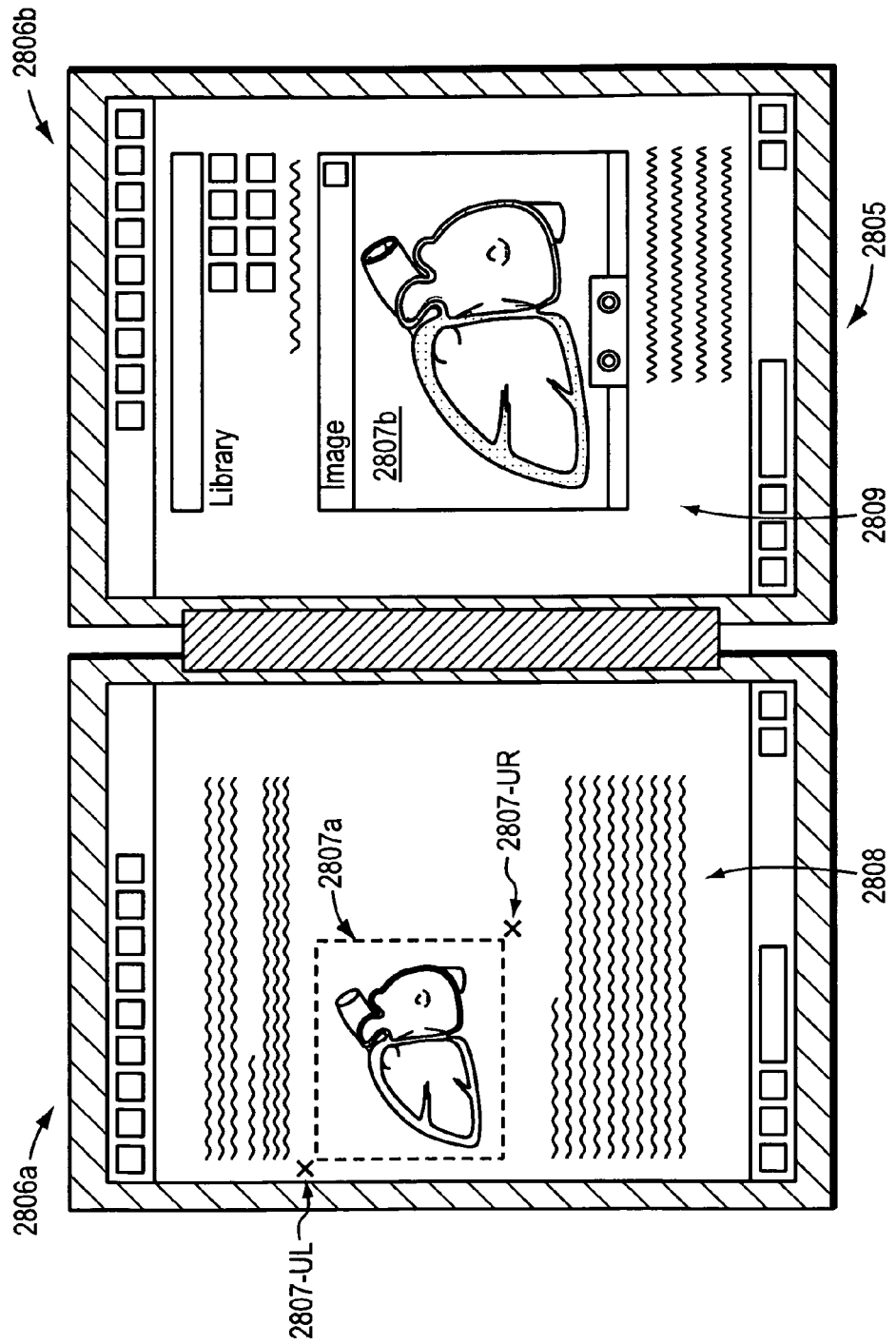
FIG. 28 is a diagram of an image rendered on a bi-stable display of a device that is rendered on a refresh display of the device according to user selection.

FIG. 28 is a diagram of an image 2808 rendered on a bi-stable display 2806*a* of the device 2805, a portion 2807*a* of which is illustrated as being selectively rendered on a refresh display 2806*b* of the device 2805 according to user selection. An image 2808 is rendered on the bi-stable display 2806*a*. In this example embodiment, a user has defined a user-selected portion 2807*a* of the image 2808 through marking thereon two points, such as an upper left and lower right pair of points 2807-UL and 2807-LR, respectively, defining a size and shape of a rectangle, via a human-to-machine interface, such as a touch screen. The selection 2807*a* is then rendered as an image 2809, 2807*b* via the refresh display 2806*b* according to the methods described in reference to FIG. 27, among others.

Figure 29A:
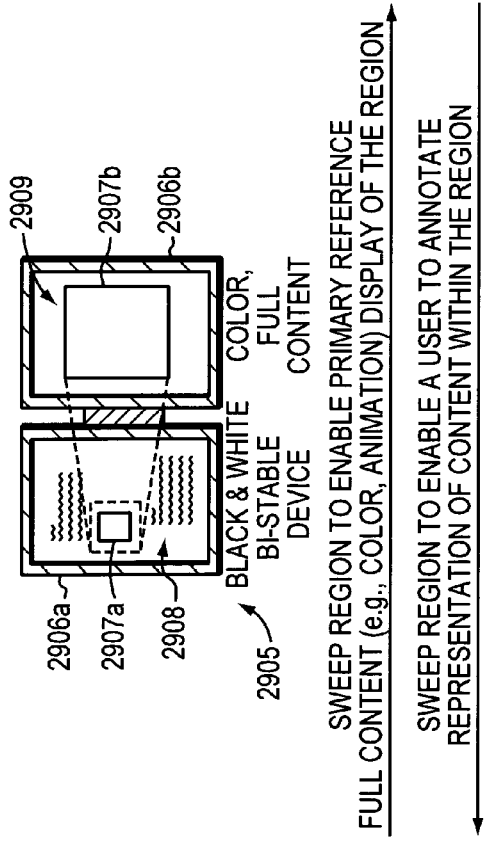
FIG. 29A is a diagram illustrating a "swept" selection area of an image rendered on a bi-stable display of a device and responsively rendered on a refresh display of the device.

FIG. 29A is a diagram illustrating a "swept" selection area 2907*a* of an image 2908 rendered on a bi-stable display 2906*a* of a device 2905 in grey-scale and responsively rendered on the refresh display 2906*b* of the device 2905 in color, or full content. The sweep region 2807*a* specifies a portion of a primary source to be rendered in full content view via the refresh display 2906*b* (e.g., color, animation). Similarly, a user may sweep a region 2907 of an image 2909 rendered on the refresh display 2906*b* to be rendered via the bi-stable display 2906*a* to enable users to annotate representations of content within the region or simply to view the representations of content on a low power, bi-stable display.

It should be understood that the term "swept" in reference to a selection of the portion of the image is a reference to placing a cursor at a first position of the image, dragging the cursor across the image, and lifting the cursor at a second position of the image, a technique well understood in the art of user interaction with a graphical user interface. Alternative techniques to sweeping may include pre-specifying a shape and size of a geometric shape, such as a square, circle, rectangle, hexagon, and so forth, and pre-specifying a position of user-selection point (e.g., center) relative to the geometric shape that the user specifies to define an image area to render from one display to the other.

Figure 29B:
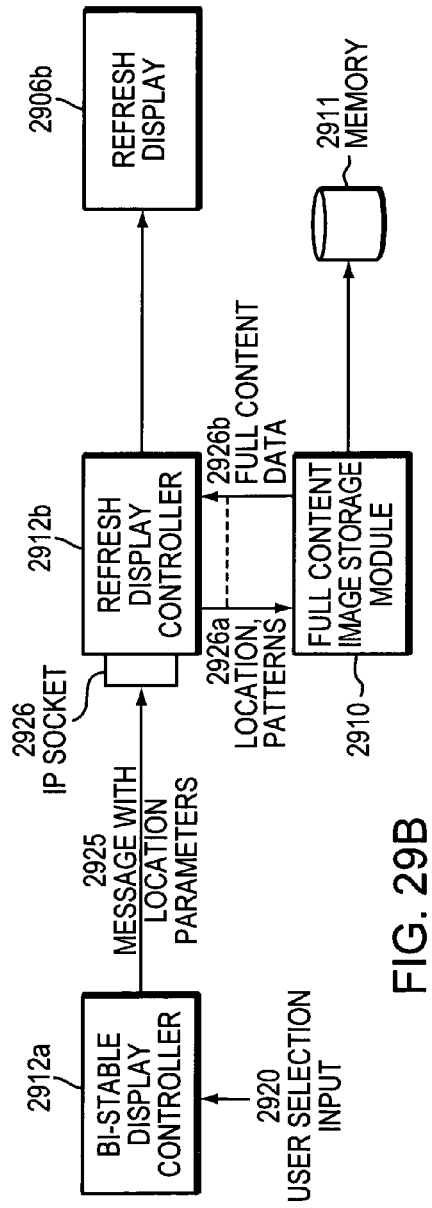
FIG. 29B is a block diagram of controllers passing messages from a bi-stable display to a refresh display indicating a selection of an image to be rendered on the refresh display.

FIG. 29B is a block diagram of controllers passing messages from a bi-stable display to a refresh display 2906*b* indicating that a selection of an image should be rendered on the refresh display 2906*b*, or vice-versa. For example, a bi-stable display controller 2912*a* receives a user selection input

2920. In response, the bi-stable display controller 2912*a* sends a message 2925 with (or referencing) location parameter(s) (e.g., upper left, lower right) of the user selection input 2920 to an IP socket 2926 of the refresh display controller 2912*b*. Other example parameters may include center/radius, for a circle, column/line/character for text, major axis length/minor axis length for an ellipse, and so forth. The refresh display controller 2912*b* then sends the location parameters of the user selection input 2920 to a full content image storage 2910, which retrieves full content data 2926*b* from on-board (or remote) memory 2911 (e.g., RAM or non-volatile memory) in order to display a portion of an image according to the user selection 2920 via the refresh display 2906*b* in full content.

Figure 29C:
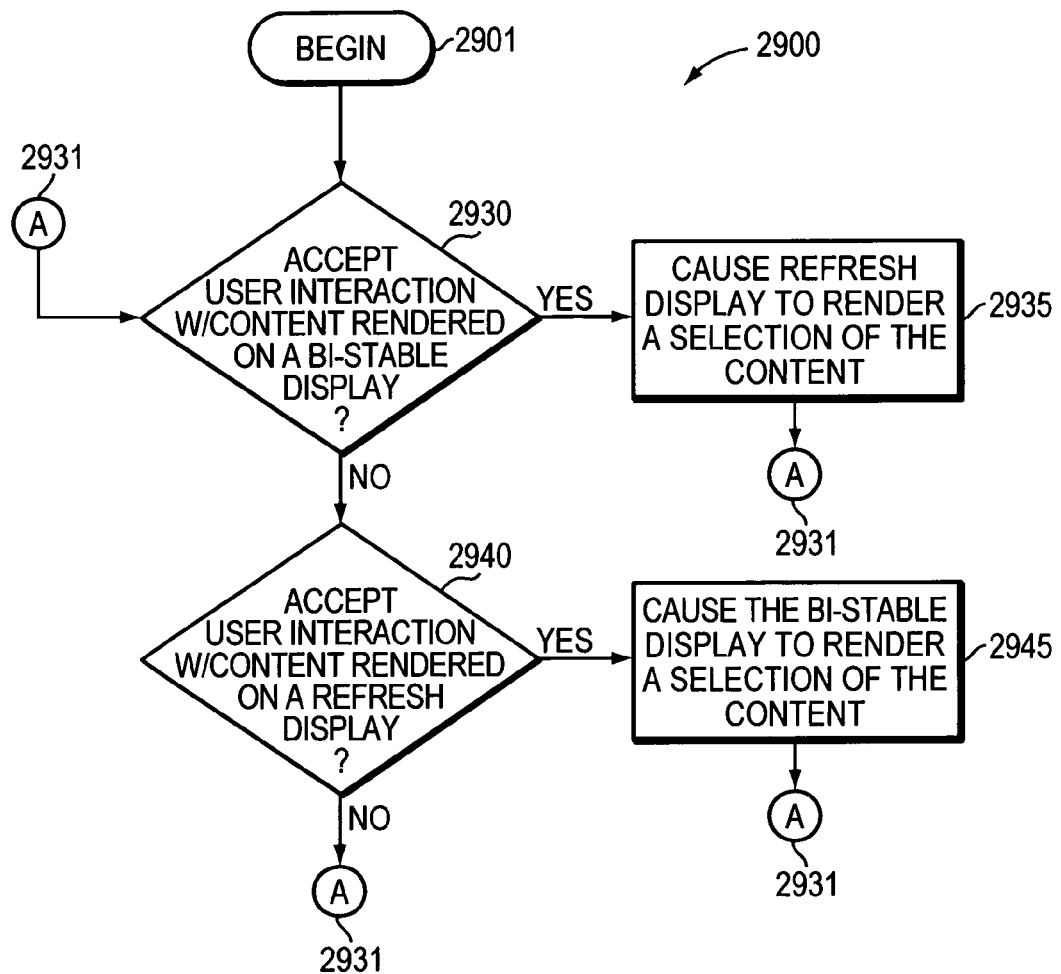
FIG. 29C is a flow diagram of a method of rendering at least a selection image on a second display rendered on a first display based on user interaction.

FIG. 29C is a flow diagram of a method of rendering at least a portion of an image rendered on a first display onto a second display based on user interaction with a display or image thereon. The method begins at 2901. At 2930, the method 2900 determines whether a user has entered a selection of content (e.g., interacted with the content) rendered on a bi-stable (or refresh) display of the device. If so, at 2935, the bi-stable display causes the refresh display to render the selection of the content. The method 2900 then continues at 2931. Otherwise, if, at 2930, user interaction with content rendered on the bi-stable (or refresh) display was not received, at 2940, the method 2900 determines whether the device has accepted user interaction with content rendered on a refresh display. If so, the refresh display, at 2945, causes the bi-stable display to render a selection of the content. The method 2900 then continues at 2931. Similarly, if the refresh display has not accepted user interaction, the method continues at 2931.

Figure 30:
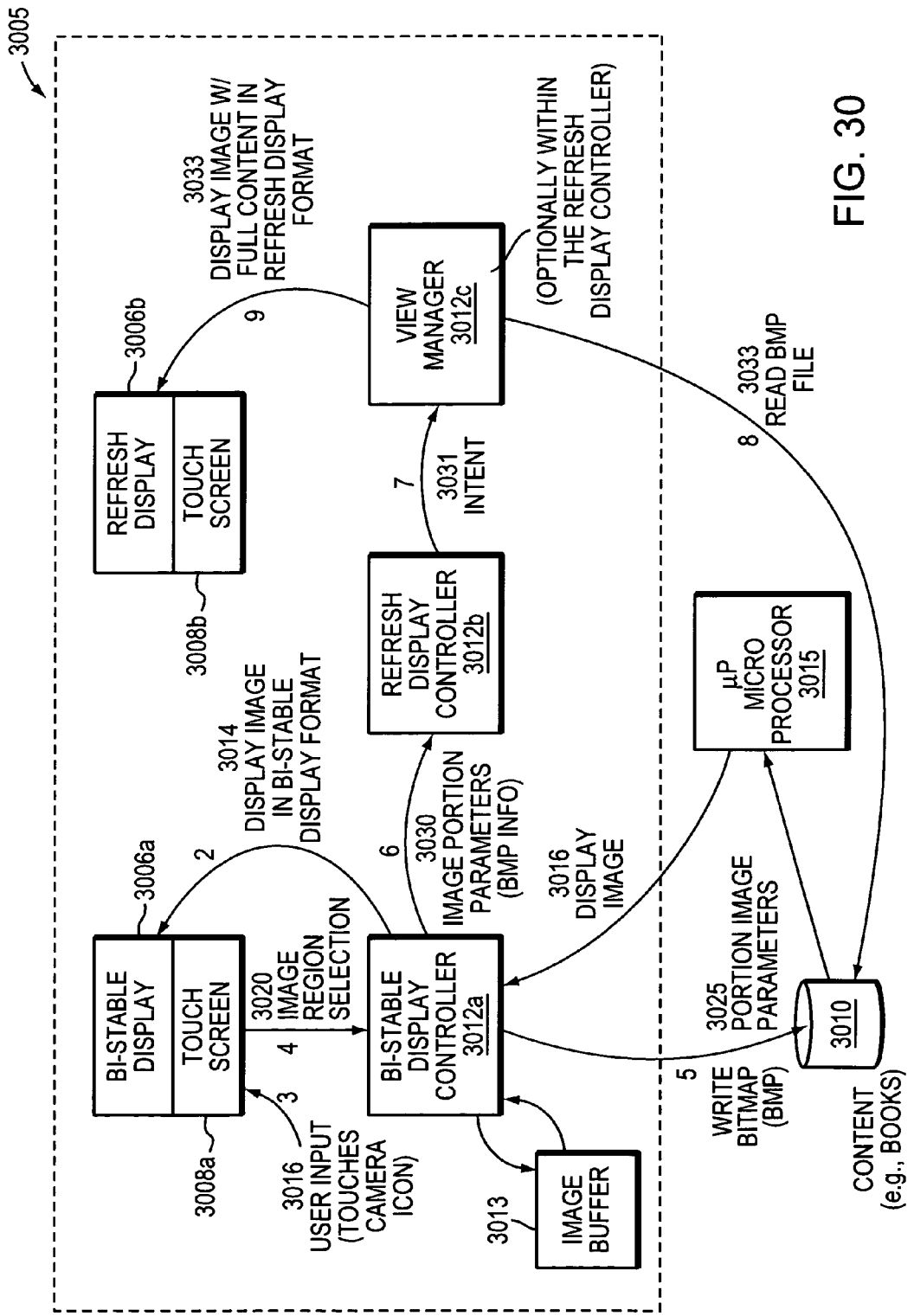
FIG. 30 is another block diagram of controllers passing messages from a bi-stable display to a refresh display indicating a selection of an image to be rendered on the refresh display.

FIG. 30 is another block diagram of controllers passing messages from a bi-stable display to a refresh display indicating a selection of an image to be rendered on the refresh display. The device 3005 includes a bi-stable display 3006*a* including a touch screen 2008*a* and a refresh display 3006*b* including a touch screen 3008*b*. The bi-stable display 3006*a* is operationally coupled to a bi-stable display controller 3012*a*; similarly, the refresh display 3006*b* is operationally coupled to a refresh display controller 3012*b*. The bi-stable display controller 3012*b* may also include an image buffer 3012, and a refresh display controller 3012*b* may include a view manager 3012*c*.

The device 3005 utilizes content storage 3010, which stores content (e.g., books), as well as a microprocessor 3015 in order to transfer images from one display to another. The bi-stable display controller 3012*a* receives, from the microprocessor 3015, a display image 3016 in which the bi-stable display controller renders the image 3014 in a bi-stable display format via the bi-stable display 3006*a*. The bi-stable display 3006*a* may then receive user input 3016 via the touch screen 3000*a* with an image rendered via the bi-stable display 3006*a*.

The user may select a region of the image 3020, and the bi-stable display controller 3012*a*, in response, writes the portion of the image parameters 3025 to content storage 3010. Contemporaneously, the bi-stable display controller 3012*a* sends the image portion parameters 3030 to the refresh display controller 3012*b*. The refresh display controller 3012*b* then sends an intention message 3031 to a view manager 3012*c*, which may, optionally, be within the refresh display controller, signaling that the selection of the image is to be rendered via refresh display 2006*b*. In response, the view manager 3012*c* reads a bitmap (BMP) or other formatted file 3033 from the content storage 3010, which was written by the bi-stable display controller 3012*a*. Once the view manager 3012*c* reads the file, it displays the image with full content via the refresh display in a refresh display format.

It should be understood that the example block diagram may be modified or repeated to enable user selection of a portion of an image rendered on the refresh display for rendering on the bi-stable display. Other components, modules, communications, storage elements and formats that enable selective image rendering may also be employed.

Examples of devices, systems, networks and applications have been described above. In some environments, capturing and storing sound within the environment may be useful to users, such as in a classroom setting to enable a student to annotate classroom notes or a source reference with a sound recording. Standard directional microphone(s) may be employed or specially configured microphone(s) may be employed to reduce echo due to multipath of sound within the environment, such as an instructor's voice traveling directly to the microphone(s) and reflected by a wall to the microphone(s). Noise reduction techniques specific to a configuration of the microphone(s) may be employed, such as to reduce common mode noise at a pair of microphones, such as due to ventilation noise. The examples of microphone configurations, and optional noise reduction are described below in reference to FIGS. 31A-34B.

FIG. 31A is a schematic diagram of a device 3105 with indications of location(s) of microphone(s). The device 3105 includes two displays 3106*a* and 3106*b* coupled by a rotational hinge in this example embodiment. In alternative embodiments, the device may be a single display with microphone(s) configured therewith The device 3105 includes a chassis 3102 with a base surface 3103*b* and vertical surface 3103*a*. The chassis 3102 defines an opening 3110*a* through a vertical surface 3103*a* of the chassis 3102. The chassis 3102 may also include an opening 3110*b* through an opposing vertical surface 3109*c*. The openings 3110*a* and 3110*b* may be slots or other geometric shapes configured to pass sound waves from an exterior of the chassis to an interior of the chassis, optionally with or without filtering characteristics.

Figure 31B:
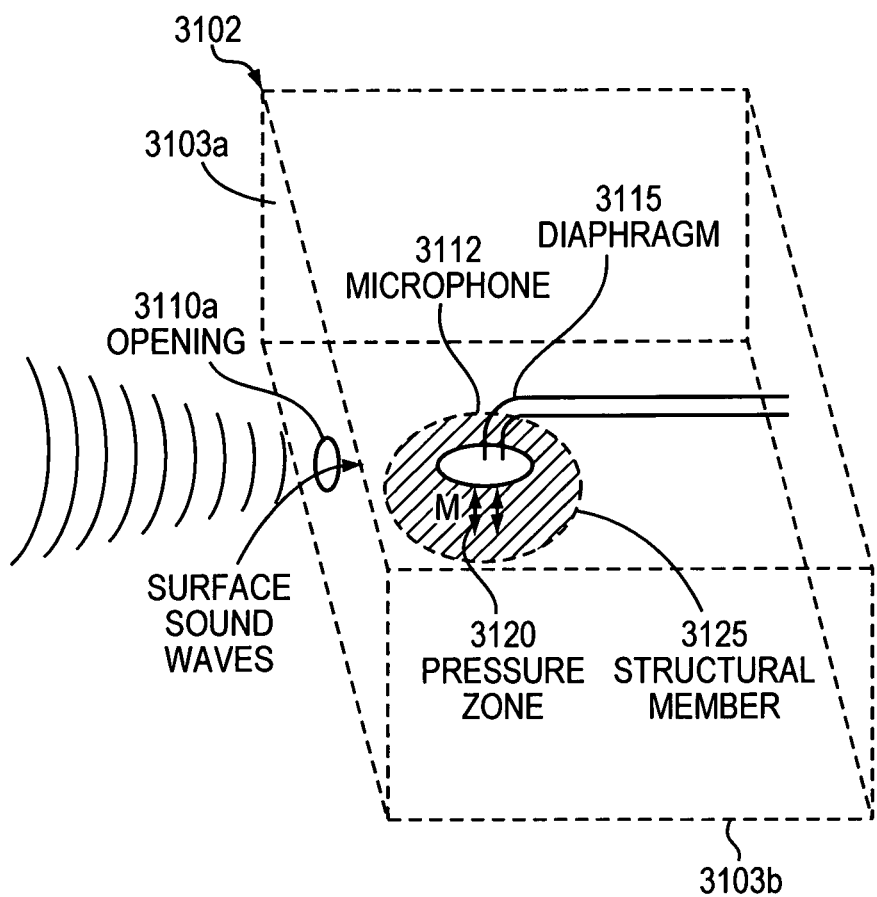
FIG. 31B is a schematic diagram illustrating example operational components of a microphone of FIG. 31A.

FIG. 31B is a schematic diagram illustrating example operational components of a microphone of FIG. 31A. As illustrated, an opening 3110*a* is defined on a vertical surface 3103*a* of a chassis 3102. A microphone 3112 within the chassis 3102 includes a diaphragm 3115, structural member 3125, and pressure zone 3120 defined therebetween. The diaphragm 3125 is arranged in an acoustical arrangement with the opening 3110*a* and in parallel arrangement with the structural member 3125 at a distance from the structural member 3125 to form the pressure zone 3120. The distance, or pressure zone 3120, is known to mitigate interference caused by a phase difference between a direct sound wave and a reflected sound wave, each emanating from a common source and each entering the pressure zone via the opening 3110*a*. The reflected sound wave is substantially the same as the direct sound wave, but is reflected off a surface external from the chassis 3102. The microphone 3112 is configured to produce electrical signals representative of at least the direct and reflected sound waves based on a combined effect on the diaphragm 3115.

FIG. 31C is a schematic diagram of an open-frame microphone 3112 illustrating conversion of sound waves into electrical signals of FIG. 31A. As stated above, the microphone 3112 is configured to produce electrical signals 3135 representative of sound waves 3130, including at least direct and reflected sound waves 3130 emanating from a common source (e.g., an instructor in a classroom). As illustrated in FIG. 31C, the sound waves 3130 enter a pressure zone 3120, in part defined by a height above the structural member 3125 and below the diaphragm 3115. The diaphragm 3115 is vibrationally sensitive to the sound waves, and, as a result, produces the electrical signal 3135 as a function of the sound waves 3130 acting upon it from within the pressure zone 3120.

FIG. 32A is a schematic diagram of a noise reduction module 3220 operationally coupled to a plurality of microphones (i.e., at least two) 3210a, 3210b associated with an electronic device, such as the device 3105 of FIG. 31A. The microphones 3210a, 3210b are configured to produce electrical signals representative of sound waves, as described immediately above. In the example scenario of FIG. 32A, a first of two microphones 3210a, 3210b as illustrated, detect sound waves from a fan 3206 as well as teacher sound waves 3227 generated by a first person, such as a teacher lecturing in a classroom setting. Similarly, a second of the two microphones 3210b detects fan sound waves 3206 from the same fan as detected by the first of two microphones 3210a as well as sound waves 3226 generated by a second of the two persons, such as a student. The microphones 3210a, 3210b produce electrical signals as a function of their respectively sensed sound waves and pass their respectively produced electrical signals 3235a, 3235b to the noise reduction module 3220.

The noise reduction module 3220 is configured to process the electrical signals 3235a, 3235b and output a noise-reduced electrical signal 3230 by subtracting the first electrical 3235a signal from the second electrical signal 3235. Subtracting (or otherwise combining) the electrical signals 3235a, 3235b produces the output electrical signal 3230, in this case, with teacher and student sound waves (e.g., voices) with minimal fan noise 3230 because the fan sound waves 3206 are substantially the same as received by both microphones 3210a, 3210b (i.e., are observed as common mode noise), so subtracting (or otherwise combining) their counter buttons within two electrical signals 3235a significantly reduces the amount of fan sound waves 3206 represented in the output electrical signal 3230. In other words, the noise reduction module 3220 is configured for the electrical filtering of sound waves through the elimination of common mode sound waves. In operation, the noise reduction module is able to minimize ambient noise detected by microphones 3210a and 3210b and produce an output electrical signal 3230 principally representing desired sound.

Figure 32B:
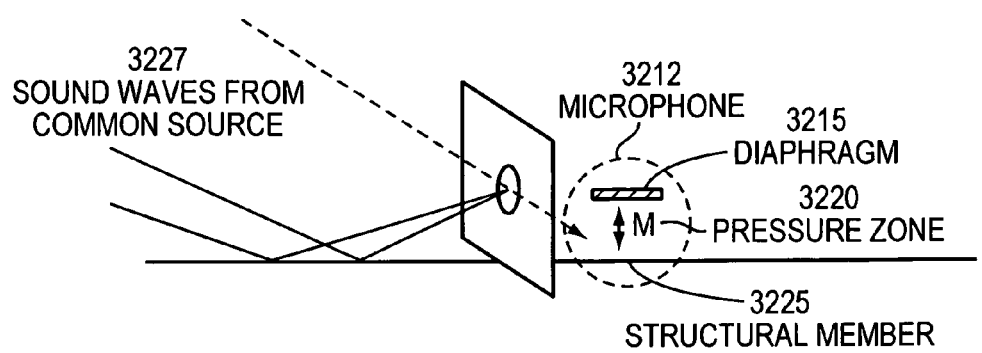
FIG. 32B is a schematic diagram illustrating a microphone capturing direct and reflected sound waves from a common source.

FIG. 32B is a schematic diagram illustrating a microphone capturing direct and reflected sound waves from a common source. Sound waves can travel in a straight line, bend, or travel in multiple directions due to reflections off surfaces; therefore, sound waves from a common source may be reflected off several surfaces and travel to the microphone via different angles. As illustrated in FIG. 32B, sound waves from a common source 3227 (e.g., mouth of an instructor) enter a pressure zone 3220 of microphone 3212 via an opening 3210a. The sound waves may travel directly from the source to the microphone 3212 or travel indirectly to the microphone 3212 by traveling from the source to the microphone by reflecting off a surface 3211. The diaphragm 3215, in parallel arrangement with structural member 3225, is at a distance known to be a pressure zone 3220 that mitigates interference caused by a phase difference between the direct sound wave and the reflected sound wave to provide a high quality frequency sound recorded by a device in the form of numerical representations, for example, to a computer readable memory in an electrical representation to be sampled.

Figure 32C:
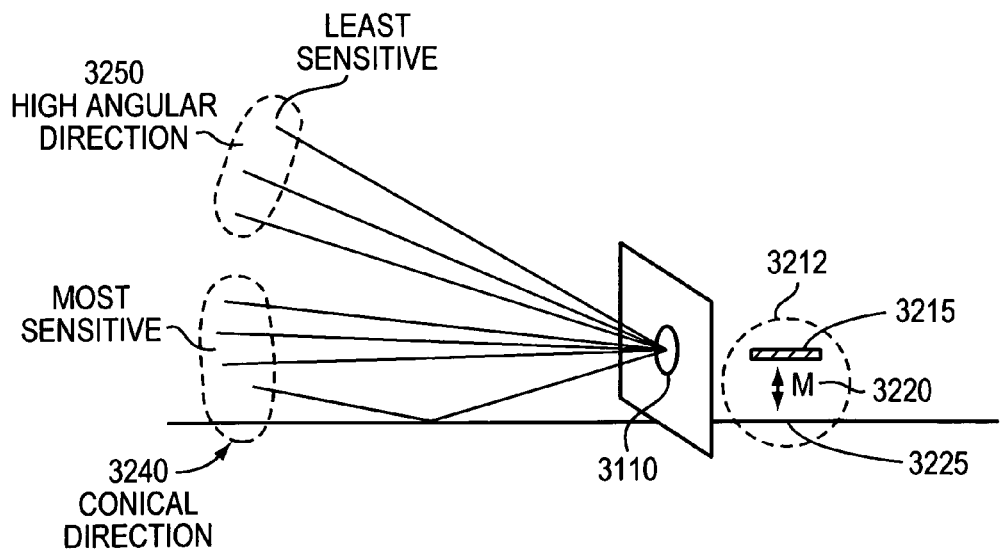
FIG. 32C is a schematic diagram illustrating a position of a diaphragm of a microphone that facilitates mechanical filtering of sound waves.

FIG. 32C is a schematic diagram illustrating a position of a diaphragm of a microphone that facilitates mechanical filtering of sound waves. As stated above, the diaphragm 3215 is arranged in an acoustical arrangement with the opening 3210 and in parallel arrangement with the structural member 3225 at a distance from the structural member 3225 to form the pressure zone 3220. The placement of the diaphragm 3215 in relation to the opening 3110 and structural member 3225 allows only sound waves from certain angles to be detected by the diaphragm 3215. As illustrated, the diaphragm 3215 is most sensitive to sound waves coming from within a conical direction 3240. This is due to the fact that sound waves coming from within this conical direction 3240 enter the pressure zone 3220, allowing the diaphragm 3215 to detect the sound waves. Sound waves not within this conical direction 3240 either do not enter the opening 3210 or enter the opening 3210 but do not enter the pressure zone 3220. Thus, one can understand that the microphone has a highest sensitivity to sound waved from a low angular direction relative to the opening 3210, which may be parallel to a table top, and lowest sensitivity from a high angular direction 3250 relative to the opening 3210, closer to being perpendicular to the table top.

FIG. 32D is a schematic diagram of the device 3205 capturing sound via microphones each positioned on a different edge or surface of the device. The device 3205 captures sounds via two openings 3210a and 3210b acoustically coupled to microphones within the device 3205. An on-axis opening 3210a is positioned on an on-axis side of the device 3205, and an off-axis opening 3210b is positioned on an off-axis side of the device 3205, where on-axis and off-axis sides can refer to teacher side and student side, or other designations, respectively. The positioning of the microphones within the device 3205 allows the microphones to capture sound waves useful to a user of device 3205 while enabling significant noise reduction through as little as subtraction of electrical signals produced by the microphones.

Figure 33:
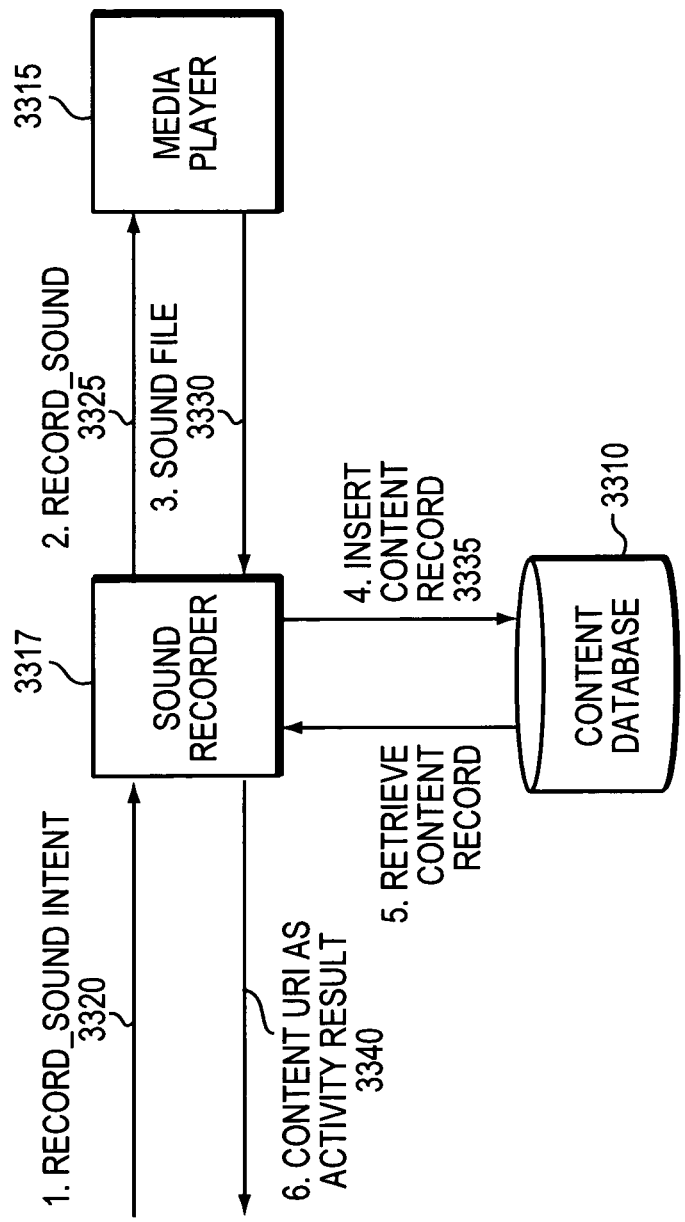
FIG. 33 is a block diagram illustrating recording sound waves into a content database and accessing the recorded sound from the database.

FIG. 33 is a block diagram illustrating an example apparatus that can be employed to record sound waves into a content database and to access the recorded sounds from the database. Captured sounds 3320 received from a microphone of a device, is received by a sound recorder 3317. The sound recorder 3317 may allow a user to preview and potentially re-record a recording then (or before) store the captured sound 3320 to memory, which may be a form of a content database 3310. The second recorder 3317 may also allow a user to enter a title and description for the recording. The sound recorder 3317 may then pass recorded sound to a media player 3315, which may create a sound file 3330 in which the sound record 3317 may insert a content record 3335 into the content database 3310. Later, a user can retrieve the sound recorded file from the content database 3310 using a Uniform Resource Indicator (URI) 3340.

Figure 34A:
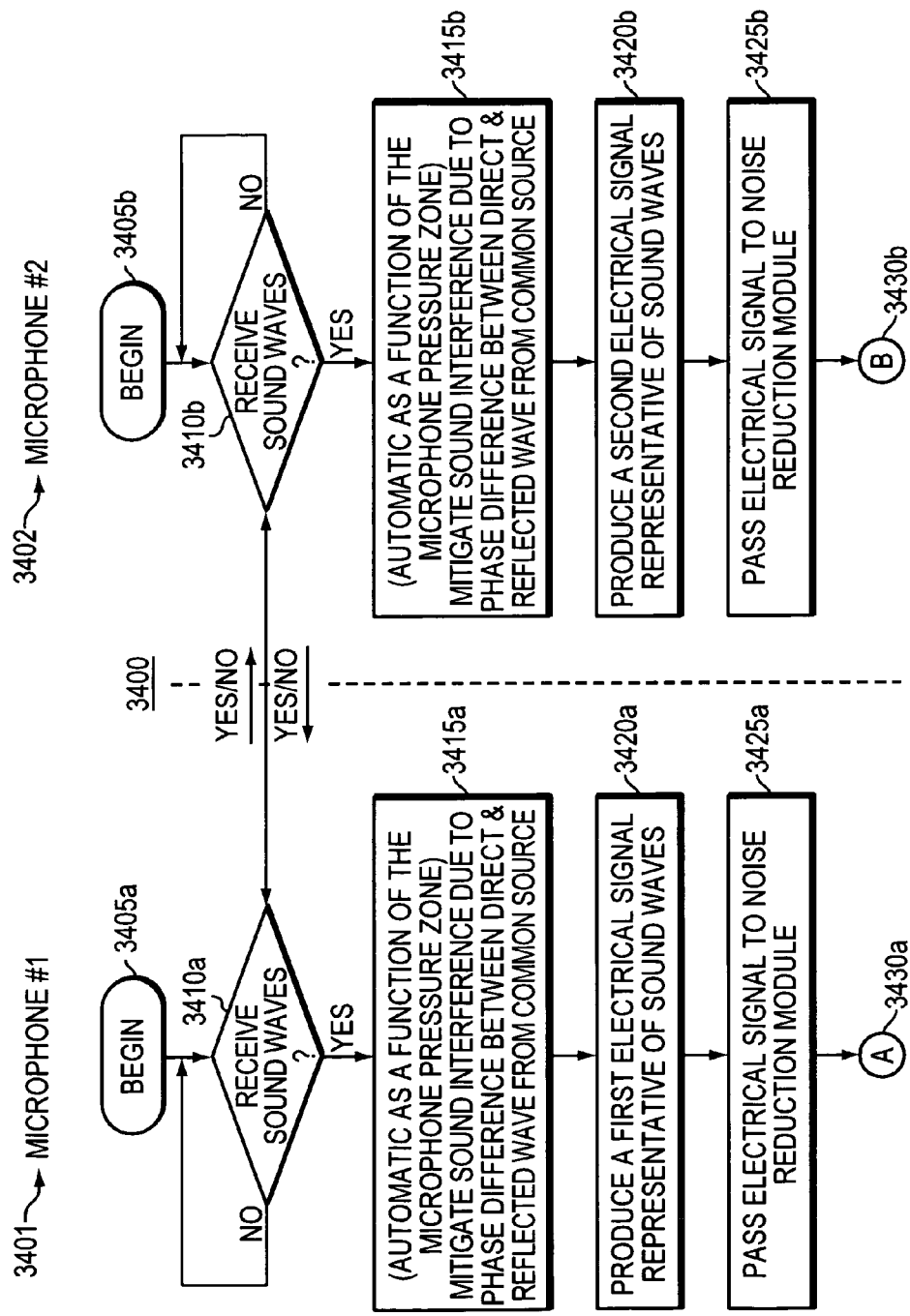
FIG. 34A-B are flow diagrams of a method of mitigating sound interference received by a microphone and producing a noise-reduced signal in accordance with an example embodiment of the present invention.
Figure 34B:
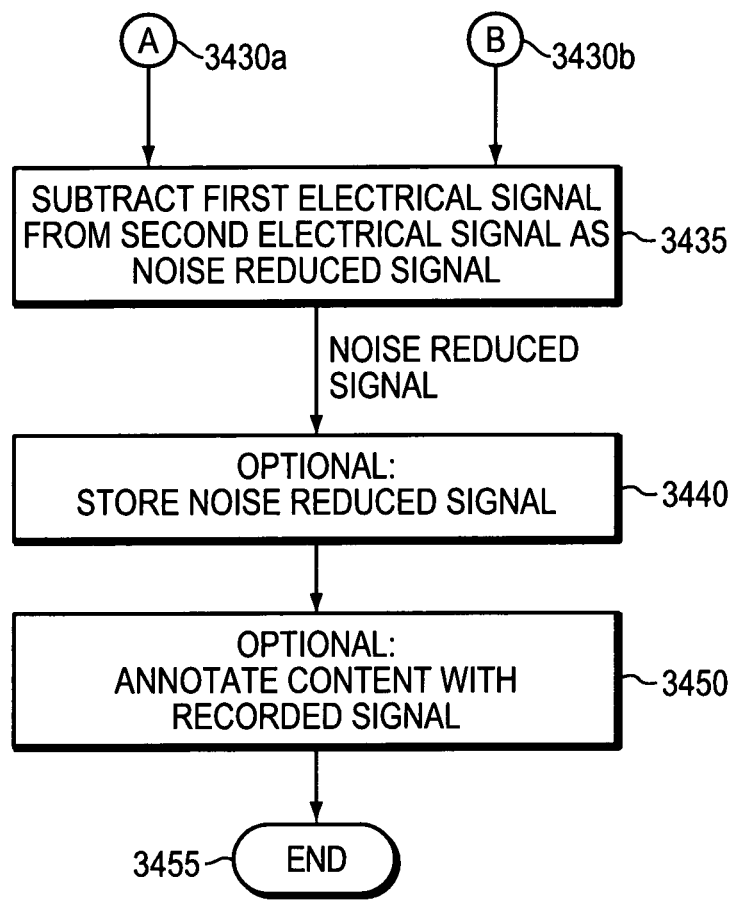

FIGS. 34A-B are flow diagrams of a method 3400 of mitigating sound interference received by a microphone and producing a noise reduced signal in accordance with an example embodiment of the present invention. The method 3400 begins for a first microphone 3401, at 3405a, and a second microphone 3402, at 3405b. At 3410a, the first microphone 3401 awaits to receive sound waves. Similarly, at 3410b, the second microphone 3402 awaits to receive sound waves. Once at least one of the microphones has received a sound wave at 3415a-b, each microphone automatically mitigates as a function of pressure zone, sound interference due to phase differences between direct and reflected sound waves from a common source. Although the microphones may simply transduce sound waves to electrical signals, the example method 3400 illustrated an embodiment by which an arming technique may be employed and a triggering event, such as a threshold volume of captured sound by at least one of the microphones, enables capturing of further sound via the microphone pre-recording (not shown) may be employed to ensure clipping at a leading edge of sound capture does not occur.

Continuing to refer to FIG. 34A, at 3420a, the first microphone produces a first electrical signal representative of the sound waves received. Similarly, at 3420b, the second microphone 3402 produces a second electrical signal representative of the sound waves received. At 3425a, the first microphone passes the first electrical signal to a noise reduction module. At 3425b, the second microphone 3402 passes the second electrical signal to the noise reduction module. The example method that may be employed with the first microphone continues at 3430a and with the second microphone continues at 3430b.

FIG. 34B begins at 3430a and 3430b. At 3435, the noise reduction module subtracts a received first electrical signal from a received second electrical signal and produces a noise reduced signal. Using simple subtraction, the noise reduced signal is primarily a common mode noise reduced signal (e.g., the same amplitude and phase sound is received at both microphones subtracts to be essentially zero). More sophisticated noise reduction techniques known in the art may also be employed. Optionally, at 3440, the noise reduced signal may be stored. Similarly, at 3450, optionally, content displayed on a display of a device may be annotated by a user with the recorded signal. Optionally, at 3452, the recorded signal may be annotated with states of the device (e.g., content being displayed during the recording), such that during playback of the recorded signal, the device may render the content displayed during the recording of the recorded signal. Likewise, returning the device to a previous state may enable the device to produce the recorded signal while the device is in that state. At 3455, the method ends.

FIG. 34C is a block diagram of a device, system, network node, server, or other electronic device that employs a metric calculation unit and an audio selection unit to process audio recordings. A metric calculation unit 3465 receives a plurality of audio recording 3460 from a plurality of devices, such as the devices 105 (FIG. 1) used by students in a classroom. The audio recordings may have associated information or metadata associated therewith, where the information or metadata may be, for example, a unique user device indicator identifying a device via which at least a portion of the audio recording was captured, collaboration-indication code identifying other devices active during a session in which the device captured the audio recording, or an identifier of the session during which the device captured at least a portion of the audio recording.

The metadata may be used for forensic purposes, such as identifying active participants during a session, such as a tutorial session, classroom instruction, or boardroom meeting. In addition, the metadata may be used for the collection and processing of statistical data. Active participants may be identified because their devices communicated with other devices or a central sewer during a session, such as in the form of communicating as a master or slave with the other devices or server or in some other way interacted with the other devices or server. It should be understood that a log of the devices active during the session may be kept by one or multiple devices or servers, and the data log may be accessed when determining the information or metadata to associate with the audio recording (or annotations or other media generated by the device(s) or a server or computer) for use in later forensic information retrieval.

Upon receiving the audio recording 3460, the metric calculation unit 3465 calculates metrics associated with the audio recordings. The metrics may include signal-to-noise ratio (SNR), Sound Pressure Level (SPL), echo, signal power, audio range, distortion, or other metrics associated with audio signals. The metrics may include multiple metrics (e.g., an array of metrics) for each audio recording 3460. The metric calculation unit 3465 then passes metrics 3467 calculated as a function of respective audio recordings 3460 to an audio selection unit 3470. Contemporaneously, the audio selection unit 3470 also receives the audio recordings 3460. The audio selection unit 3470 may associate the metrics 3467 received with the corresponding audio recording through an identification tag. After receiving the metrics 3467 and audio recordings 3460, the audio selection unit 3470 selects audio recording(s) based on the metrics. For example, the audio selection unit 3470 may select the audio recording having metric(s) that indicate it is best suited to be heard by the human ear.

Upon selecting the audio recording, the audio selection unit 3470, sends the selected audio recording 3475 to a server or device 3430. The selected audio recording 3475 may automatically replace all captured audio recordings on the devices active during the session, such that all users have the "best" audio recording. Alternatively, the selected audio recording 3475 may be archived at a server for optional download by devices at a later date.

FIG. 34D is a block diagram of a system (e.g., a device 105) with a partitioning module, metric calculation unit, and audio selection unit used to process audio recordings. A partitioning module 3480 receives a plurality of audio recordings 3460 from a plurality of devices. The audio recordings may have associated therewith information or metadata, such as a unique user device indicator identifying a device via which at least a portion of an audio recording was captured, collaboration-indication code identifying other devices active during a session in which the devices captured the audio recordings, or an identifier of the session during which the devices captured at least a portion of the audio recordings.

The metadata may be used for forensic purposes, such as identifying active participants during a session, such as a tutorial session, classroom instruction, or boardroom meeting. In addition, the metadata may be used for the collection and processing of statistical data.

Following receipt of the audio recording 3460, the partitioning module 3480 aligns each recording according to a start or end indicator, or other form(s) of indicators that enable alignment, including content of the recordings. The alignment of each recording may alternatively be enabled by use of a master clock used to synchronize internal clocks of each device. Alternatively, the partitioning module 3480 may monitor each device's clock and align each recording based on knowledge of offsets among the clocks. The partitioning module 3480 then partitions each audio recording into multiple sequential segments. The partitioning module 3480 may partition each audio recording based on a predetermined time period (such as milliseconds or seconds) or determine a partitioning rate depending on the length of the audio recording. As the audio recordings are partitioned, the partitioning module 3480 may assign an identifier to each segment containing segment identification used to identify the segment and audio recording identification used to identify to which audio recording the segment belongs. The partitioning module 3480 then sends the segments to the metric calculation unit 3465.

Following receipt of the multiple sequential segments 3466 of the audio recordings 3460, the metric calculation unit 3465 calculates metrics associated with the segments. The metrics may include a subset or all of the following example metrics: signal-to-noise ratio (SNR), Sound Pressure Level (SPL), echo, signal power, audio range, and distortion. The metric calculation unit 3465 then passes metrics associated with each segment 3467 to an audio selection unit 3470. Following receipt of the metrics 3467 and audio recording segments 3466, the audio selection unit 3470 selects the segments having metric value(s) according to a given criterion or criteria, such as value(s) indicating a given segment is most optimal for playback for a user of a device that captured the audio recording. In one embodiment, the audio selection unit 3470 may select the segment of an audio recording having metric(s) that are best suited to be heard by the human ear. For example, an audio recording captured by a first device in close proximity to a professor who raises a question to a class may contain a segment of recording of the question that is clearer than an audio recording captured from a second device at a greater distance from the professor or that is positioned behind another student in the class. However, the second device may contain a segment of an audio recording of a student's response to the professor's questions that is clearer than the corresponding segment from the first device in close proximity to the professor.

Following selection of the audio recording segments, the audio selection unit 3470 arranges the selected segments sequentially in time to form a sequential composite audio recording 3485. Optionally, the audio selection unit 3470 may contain a voice quality enhancer used to enhance the voice quality of the composite audio recording 3485. Similarly, the audio selection unit 3470 may contain a smoothing unit 3472 used to smooth the transition between selected segments associated with different audio recordings. For example, smoothing may include fading volume of a first segment (e.g., recording of the professor's question) and raising volume of a second segment (e.g., recording of a student's answer), or applying any other form of manipulation of the composite recording, to remove or reduce detection of transition between segments by the human ear. It should be understood that different devices record at different levels, such as due to variations in audio capture gain between the devices, or have different levels of background noise, such as due to positioning beneath a ceiling or floor vent, so applying smoothing between transitions or applying other forms of filtering or voice quality enhancement can improve the overall quality of the sequential composite audio recording 3485.

The audio selection unit 3470 then sends the sequential composite audio recording 3485 to a server or device 3430. The selected audio recording 3475 may automatically replace all captured audio recordings during a session, such that all users have the "best" audio recording. Alternatively or in addition, the audio recording may be archived at a server for optional download by devices at a later date.

It should be understood that the same principles applied to audio recordings as illustrated in FIGS. 34C and 34D may be applied to video recordings in an event multiple devices equipped with video capabilities record video with post-processing being used to select a best video recording or to generate a sequential composite video recording.

FIGS. 35-42 are schematic diagrams of an example device and hinge assembly according to embodiments of the present invention that enable a user to use the device to view content in many different ways based on various selectable orientations of two displays of the device. The various orientations include: folded-open, folded-closed, the displays substantially overlay each other such that the screens of the displays are simultaneously viewable or only one screen of one of the displays is viewable.

Figure 35:
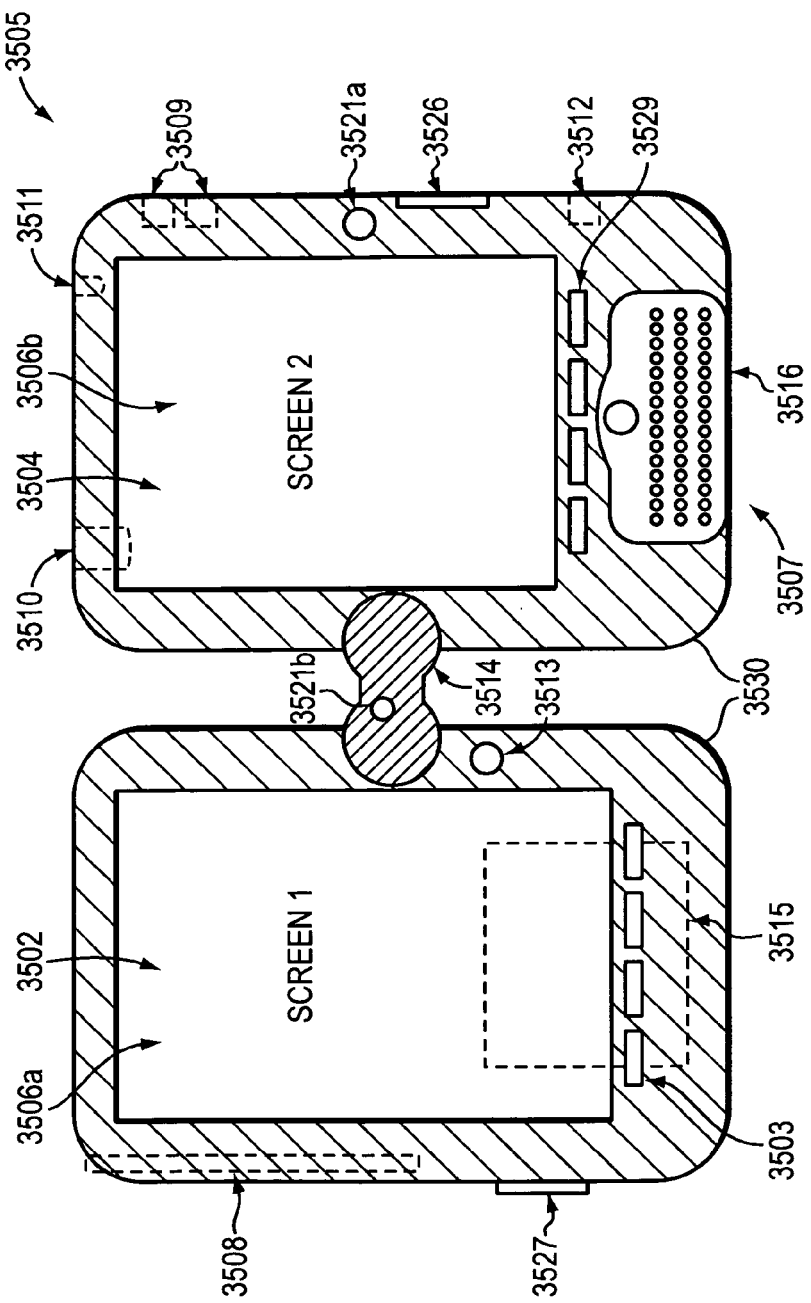
FIG. 35 is a schematic diagram that illustrates a device in an open position state in which displays are adjacent to each other.

FIG. 35 illustrates an example embodiment of the present invention in a "folded open" orientation in which both a bi-stable display 3506*a* and a refresh display 3506*b* are incorporated into a computing device 3505. In the folded-open orientation, the displays 3506*a*, 3506*b* are simultaneously viewable to a user. As described above, the bi-stable display 3506*a* is an extremely low power device that retains an image in a zero or very low power state but has a low refresh rate and presents in grey-scale. The refresh display 3506*b* can be any display useful for rendering graphics, video, or images that are not easily presented on the bi-stable display 3506*a*. Use of the bi-stable display 3506*a* allows the device 3503 to provide long battery operation with optional access to graphical images via the refresh display 3506*b* at the expense of some of the duration of the battery operation. The example computing device 3505 incorporates a bi-stable display 3506*a*, pen stylus input system 3502, plurality of user control buttons 3503, 3529, refresh display 3506*b*, touch input system 3504, removable small keyboard 3507, stylus holding location 3508, plurality of Universal System Bus (USB) interfaces 3509, plurality of FLASH memory slots 3510, female power input 3511, female line level/headphone output 3512, integrated microphone input 3513, hinge mechanism 3514, battery and battery charging circuitry 3515, alternative input from a track ball style 'mouse' 3516, sensor 3521*a*, 3521*b*, control switch for wireless interface 3526, and volume control switch 3527. It should be understood that other devices may include more or fewer peripherals.

The computing device 3505 further includes a processor 3530. In one example embodiment of the present invention, the processor 3530 is configured to control activity of the bi-stable display 3506*a* and the refresh display 3506*b* in a power conserving manner. The processor 3530 may further include a power savings module (not shown), which is executed by or associated with the processor 3530, and configured to extend battery operating life by intelligently controlling power levels of the display(s), such as, on, off, high power, low power. For example, the power savings module may be configured to enable the battery operating life of the computing device 3505 to be available for at least eight hours.

In a further embodiment, the power savings module employs a display-use module (not shown) that is configured to detect the use of the display devices. In a further embodiment, the power savings module is configured to power down, dim backlighting, or hibernate display devices based on orientation or use of the displays. In another embodiment, the power saving module may employ an internal/external peripheral use module (not shown) that is configured to detect the use of internal/external peripheral devices. In a further embodiment, the power savings module is configured to power down, or hibernate internal/external peripheral devices based on use of the internal/external peripheral devices, such as a wireless mouse or keyboard.

In another embodiment, the power savings module may further comprise a wireless on/off module (not shown) configured to turn on or turn off wireless capabilities. Further, the wireless on/off module may be configured to periodically monitor for pending incoming/outgoing messages and temporarily turn off wireless capabilities to receive or send the messages. The messages may include email, short messaging service (SMS) text messages, or multimedia messaging service (MMS) text messages, for example.

The sensor 3521 may be a camera input. In another embodiment, the sensor 3521 or a different sensor (not shown) may alternatively be configured to sense orientation of the display devices relative to each other or the hinge mechanism 3514. The sensor 3521 (or other sensor) may further be configured to send multi-power mode sensor signals to the processor 3530 configured to control an operating state of at least one of the display devices. It should be understood that a sensor 3521*b* positioned in the hinge mechanism 3514 may be useful in determining various orientations of the display devices 3506*a* and 3506*b*. The sensors may be as simple as a potentiometer or much more complex position or orientation sensors known in the art.

The battery and battery charging circuitry 3515 allows the device to operate without being connected to a power outlet and the battery to be recharged when drained. The battery 3515 may be recharged using a battery re-charger (not shown) connected to a power source (e.g., wall power outlet) via a female power input 3511. The battery re-charger may be configured to connect to: a two or three pronged wall outlet, vehicle power supply, other forms of power outlets, such as airplane power outlets. The battery and battery charging circuitry 3515 may also be configured to detect when the battery contains a full charge and, optionally, when the device 3505 is connected to an external power supply. In such a state, the battery and battery charging circuitry 3515 allows the device 3505 to be powered via the external power supply, thereby conserving battery power for use of the device 3505 while disconnected from the external power supply. It should be understood that a second, rechargeable or non-rechargeable, battery (not shown) may also be employed to maintain memory states, such as may be required for non-volatile RAM (NVRAM), while the device 3505 is turned off.

The hinge mechanism 3514 couples the bi-stable display 3506*a* and refresh display 3506*b*. The hinge mechanism 3514 may be configured for multidirectional movement of the displays relative to each other.

Figure 36:
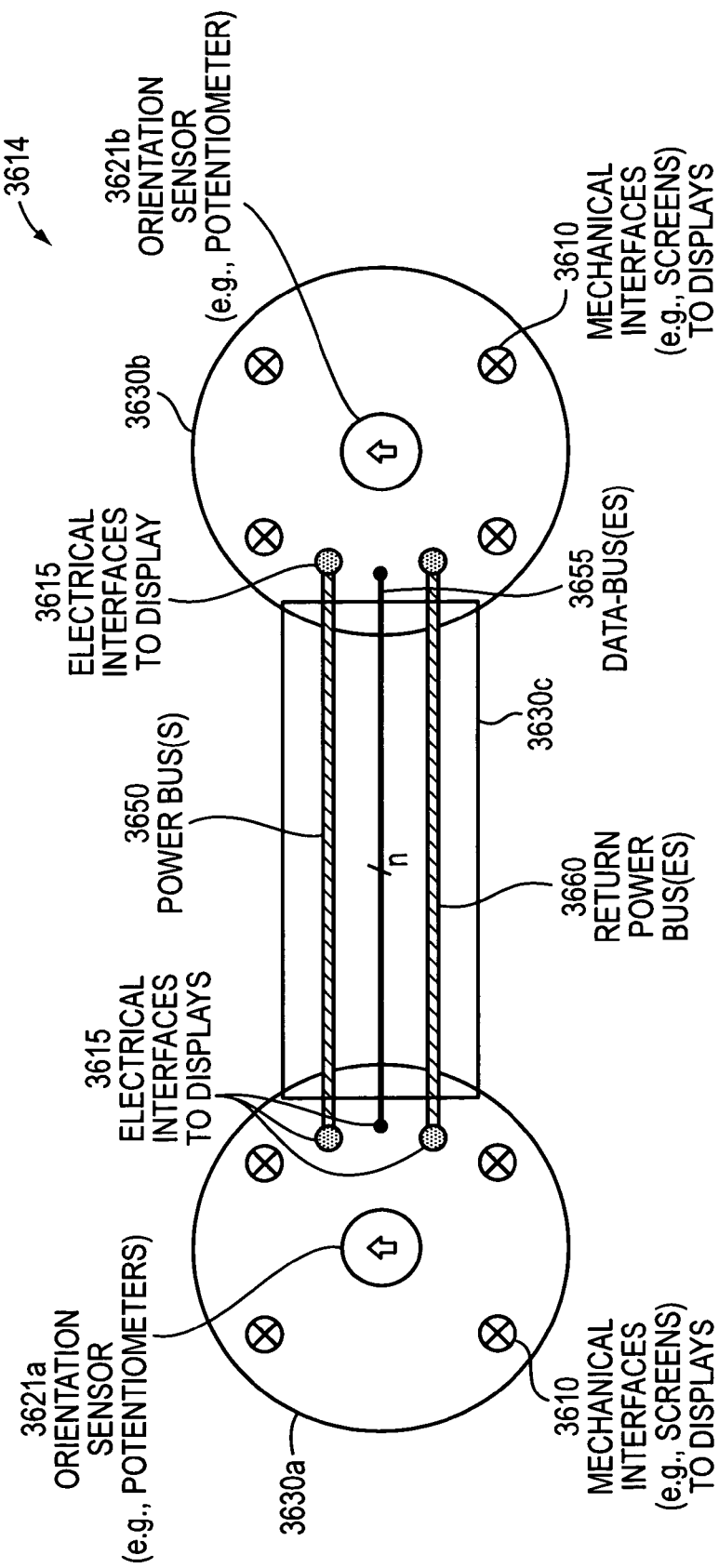
FIG. 36 illustrates an internal structure of a hinge mechanism configured to couple a bi-stable display and refresh display of a device.

FIG. 36 illustrates an internal structure of an example hinge mechanism 3614 configured to couple a bi-stable display and refresh display of a device both mechanically and electrically. The hinge mechanism 3614 may include a first interface element 3630*a*, second interface element 3630*b*, and a hinge 3630*c*. Serving as an adjustable linkage therebetween. Each interface element 3630*a*, 3630*b* may include mechanical interfaces (e.g., screws) to affix the elements 3630*a*, 3630*b* are the displays, electrical interfaces 3615, and orientations sensor(s) (e.g., potentiometers) 3621*a-b*. The interface elements connected to each other via the hinge 3630*c*.

Internally, in this embodiment, the hinge 3630*c* includes power bus(es) 3650, return power bus(es) 3660, and data bus(es) 3655. The power and data buses enable power and date to be shred between the devices. The orientation sensors 3621*a-b* are configured to detect an orientation of a display with respect to the hinge 3630*c*. Further, the orientation sensors 3621*a-b* may communicate the orientation of the displays to a processor (not shown) via the data-bus(es) 3655 or its own bus (not shown). Other orientation sensors may be included in the hinge 3630*c*, interface elements 3630*a*, *b*, or the devices themselves to determine orientations of the devices relative to each other (e.g., folded-open, folded-closed, rotated-open, rotated-closed orientations) or to the hinge. The power bus(es) 3650 and return power bus(es) support configurations in which one or both displays include batteries or other energy sources to share energy or energy states. The data bus(es) 3655 support communication messages between the displays in any manner disclosed herein or otherwise known in the art.

It should be understood that various techniques for enabling power and signals to traverse between the devices via the hinge mechanism 3614 (or external therefrom) may be employed, where the techniques support user-selectable orientations. For example, hard or flex circuit board technology may be employed, slip ring technology may be employed, or wiring harnesses may be employed.

Figure 37:
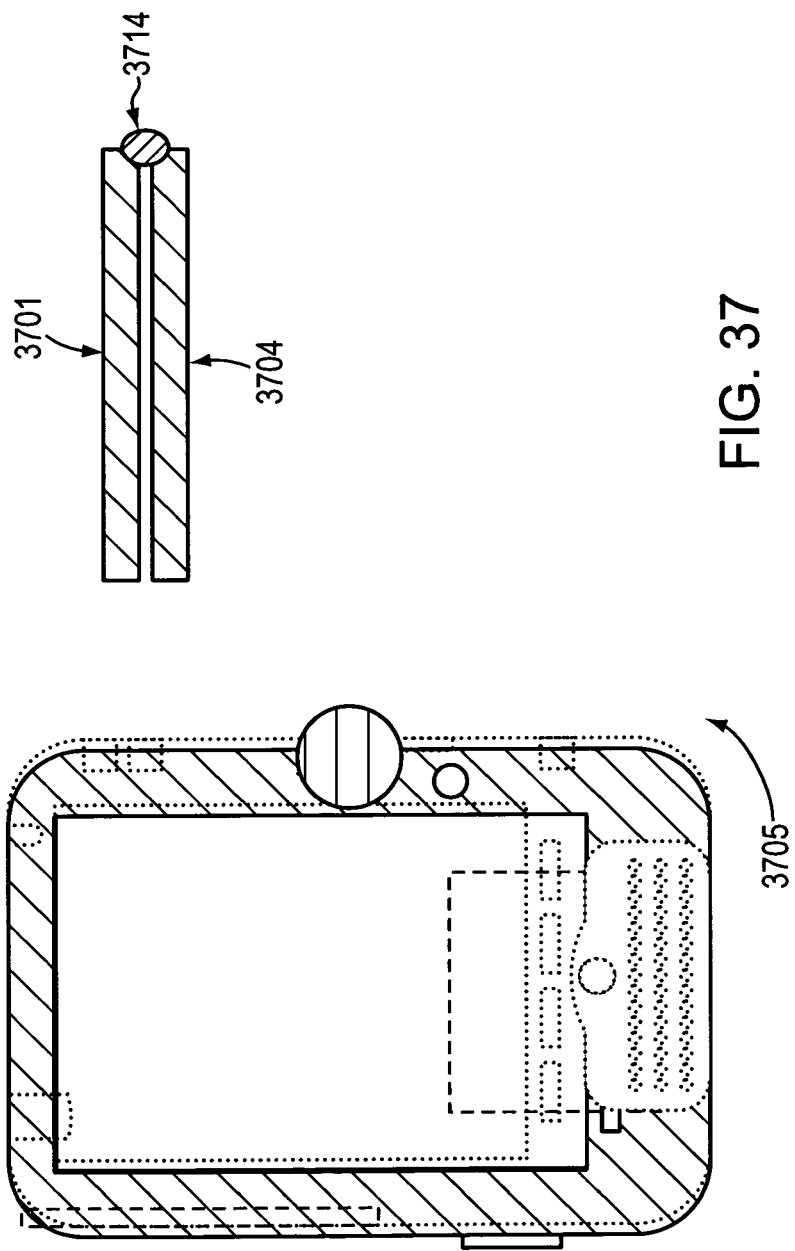
FIG. 37 is a schematic diagram that illustrates a device in a folded, closed position state in which fronts of displays of the device face inward toward each other.

FIG. 37 illustrates multidirectional movement of the computing device 3705 in which the display devices substantially overlay each other, and screens 3701, 3704 of the display devices are simultaneously not viewable because the screens 3701, 3704 face inward toward each other.

FIG. 38 illustrates multidirectional movement of the hinge mechanism 3814 in which the displays substantially overlay each other, and the screens 3801, 3804 of the displays are simultaneously viewable because the screens 3801, 3804 face outward from each other.

Figure 39:
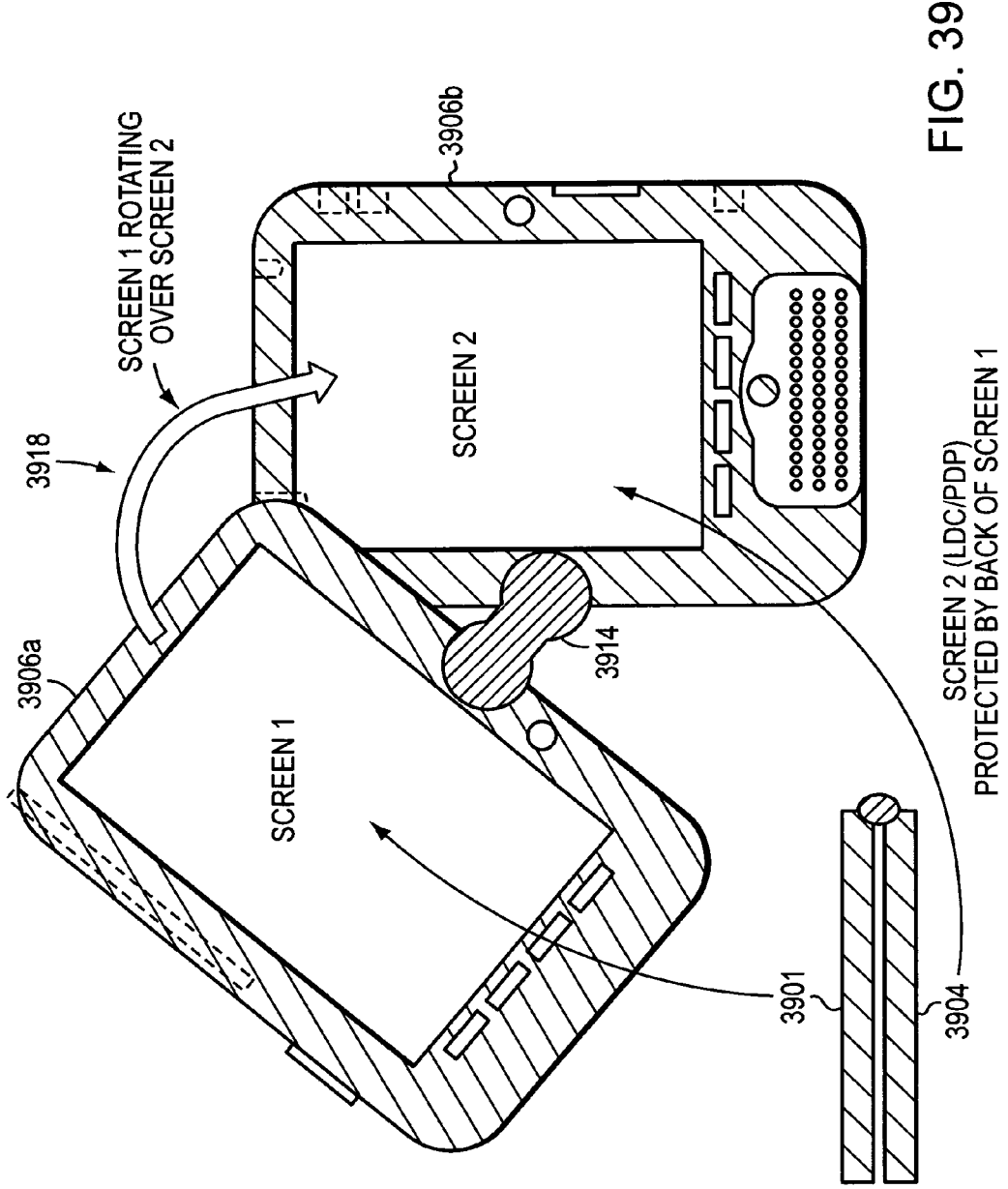
FIG. 39 is a schematic diagram of a device in which a bi-stable display and a refresh display of the device substantially overlay each other allowing only the bi-stable display to be viewable.
Figure 40:
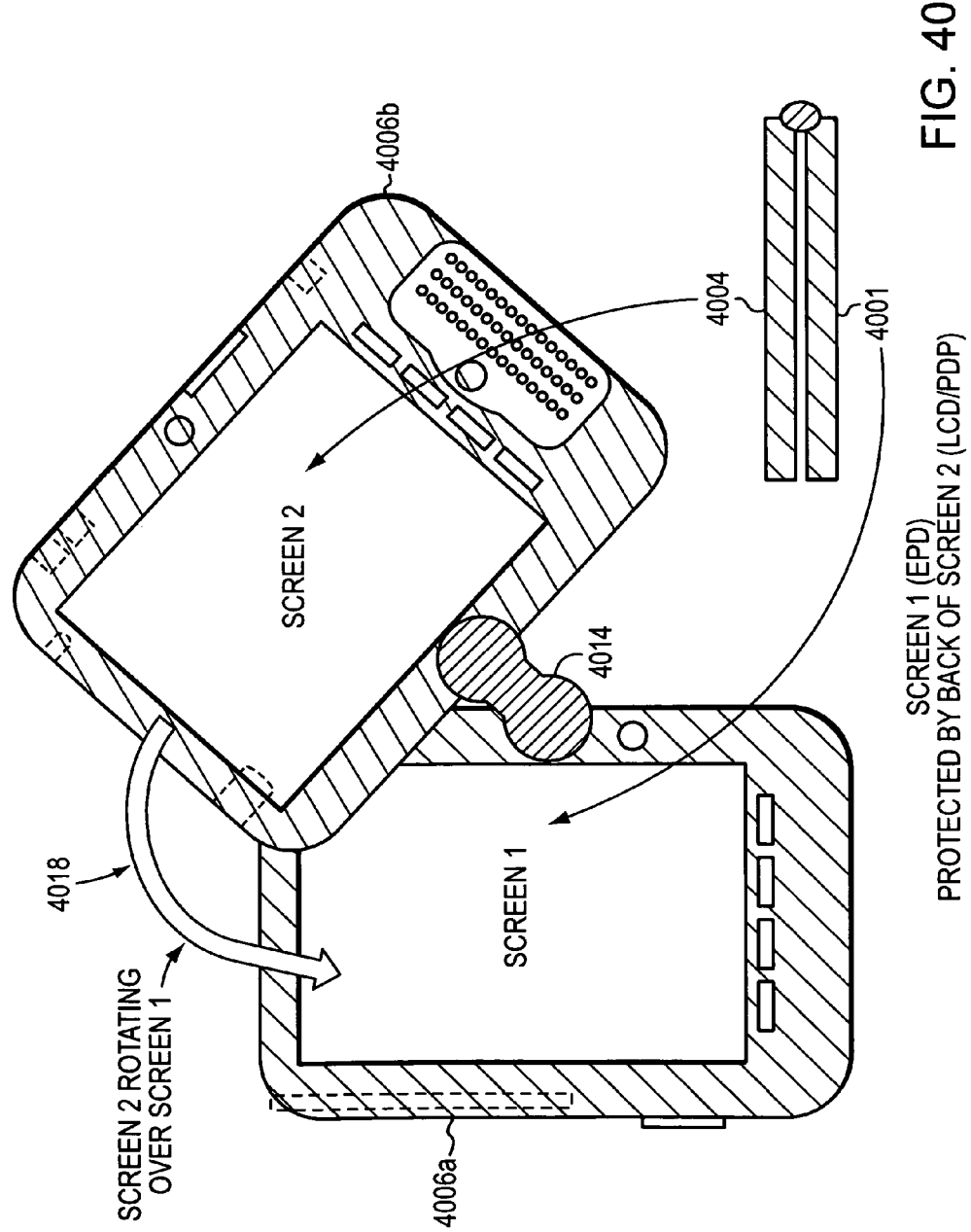
FIG. 40 is a schematic diagram of a device in which a bi-stable display and a refresh display of the device substantially overlay each other allowing only the refresh display to be viewable.

FIGS. 39 and 40 illustrate multidirectional movement of the hinge mechanism 3914 in which the displays 3906*a*, 3906*b* can substantially overlay each other such that only one screen 3901 of the displays is viewable at a time by a user. The hinge mechanism 3914 may further include a power and signal bus (not shown) configured to conduct power and signals between the two displays 3906*a*, 3906*b* and provide electrical isolation from the bus to prevent a user or object from contacting voltage or current on the power bus.

Figure 41:
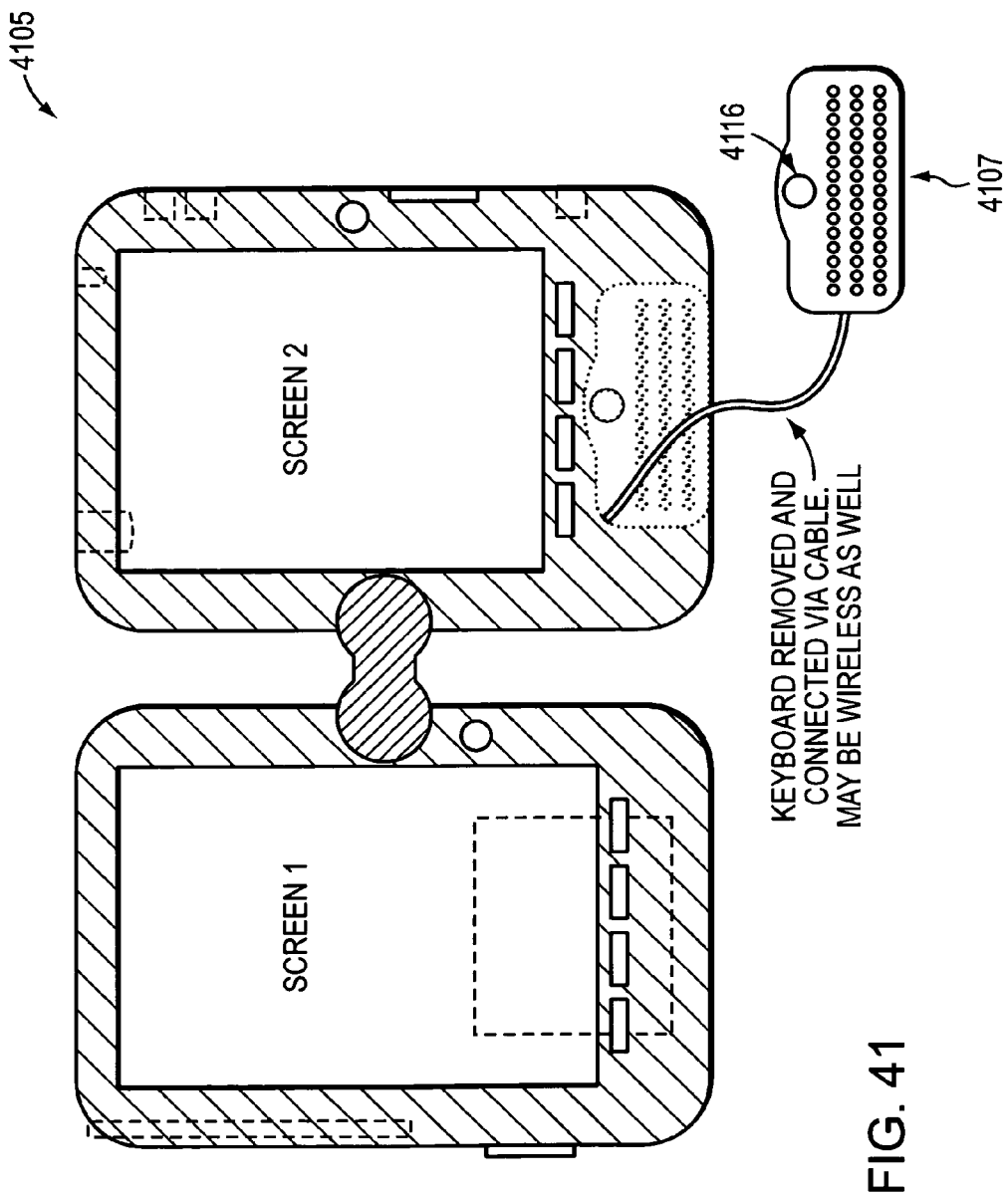
FIG. 41 is a schematic diagram of a device that has an attachable input peripheral.

FIG. 41 illustrates an embodiment of the present invention wherein the computing device 4105 employs a removable keyboard 4107. The removable keyboard 4107 may be connected to the computing device via a cable, or it may be configured for wireless operations. The removable keyboard 4107 may further include a cursor control device, such as a mouse 4116 or directional pad (D-pad).

Figure 42:
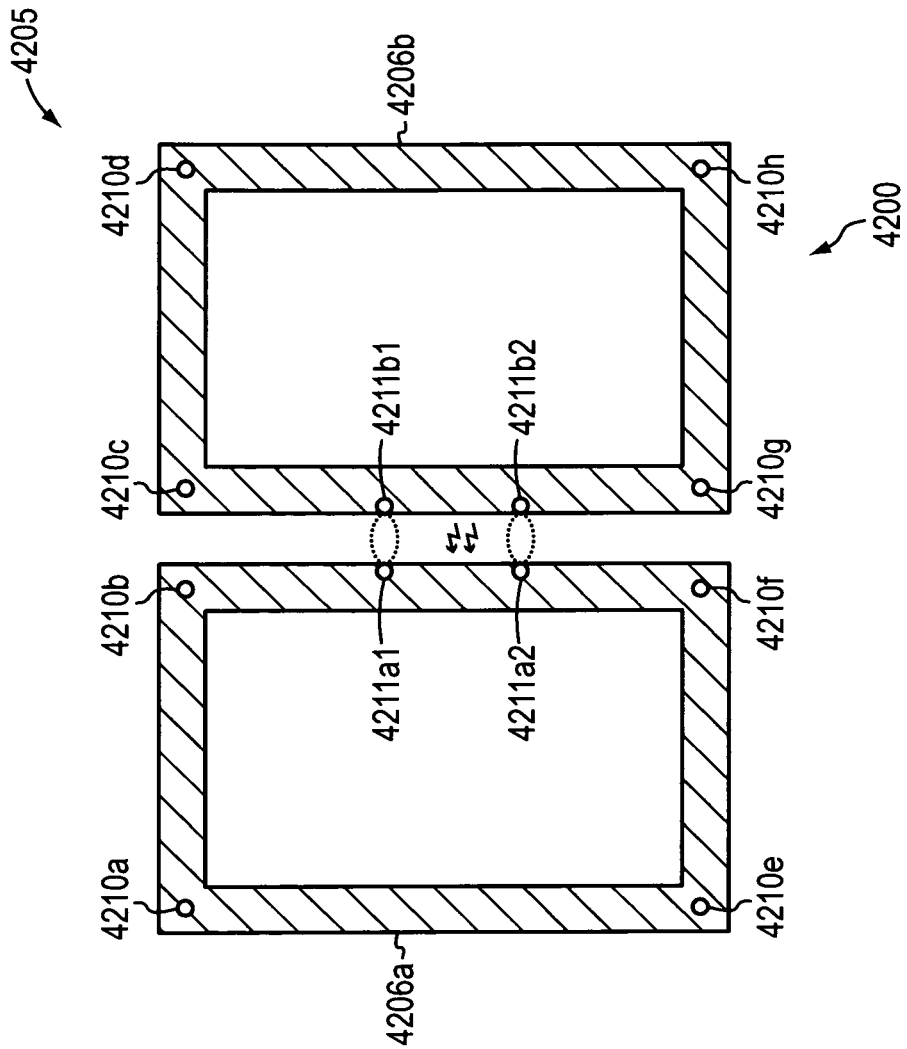
FIG. 42 illustrates a computing device 4205 including a bi-stable display 4206a and a refresh display 4206b.

FIG. 42 illustrates a computing device 4205 including a bi-stable display 4206*a* and a refresh display 4206*b*. The displays 4206*a*, 4206*b* may be physically connected to each other using mechanical, magnetic, or other typical securing mechanisms 4210*a-h* and operationally coupled to each other via wireless interface elements 4211*a*1/*b*1, *a*2/*b*2. Multiple wireless communications paths allows for high-speed bi-directional data transfer. Any form of data transfer may be employed, including handshaking and non-handshaking forms. Pairs of mechanical interfaces 4210*a-h* include a "male" and "female" interface. In the case of magnetic elements, magnetic norths and souths are oriented to enable the displays to adhere (rather than repel) to each other. Each display is able to communicate with the other display via wireless communications using the wireless interfaces 4211*a*1/*b*1, 4211*a*2/*b*2 such that a user may render images on either display. The wireless interfaces may be any form of wireless interface, such as optical (e.g., infrared), or radio frequency (RF) (e.g., Bluetooth®, or IEEE 802.11) protocols, acoustical, or other form of wireless communication within a wide range of the electromagnetic spectrum. Alternatively, a simple or complex wired or fiber optic interconnection may be employed.

It should be understood that the methods, as illustrated by the flow diagrams or as described in reference to or understood with respect to the mechanical, electrical, schematic, or network diagrams, may be implemented in the form of hardware, firmware, or software. In the case of software, the software may be any language capable of performing the example embodiments disclosed herein or equivalent thereof or example embodiments understood in the art at the present time or later developed, or equivalents thereof, as understood from the teachings herein. Moreover, it should be understood that the software may be stored in any form of computer-readable medium, such as Random Access Memory (RAM), Read-only Memory (ROM), Compact-Disk ROM (CD-ROM), optical or magnetic medium, as so forth. The software may be stored thereon as sequences of instructions and loaded and executed by processor(s), including general purpose or application specific processor(s) capable of executing the software in manner(s) disclosed herein or understood from the disclosed embodiments or equivalents thereof.

While this invention has been particularly shown and described with references to example embodiments thereof, it will be understood by those skilled in the art that various changes in form and details may be made therein without departing from the scope of the invention encompassed by the appended claims.

What is claimed is:

1. A system for displaying content, comprising:
a bi-stable display controller configured to,
in response to detecting a first interaction with a bi-stable display requesting first content to be displayed via the bi-stable display and determining that a first operating specification of the bi-stable display does not satisfy a first defined display requirement of the first content,
initiate a first rendering of the first content via a refresh display in response to a determination that a second operating specification of the refresh display satisfies the first defined display requirement;
a refresh display controller configured to,
in response to detecting a second interaction with the refresh display requesting second content to be displayed via the refresh display and determining that second operating specification of the refresh display does not satisfy a second defined display requirement of the second content,
initiate a second rendering of the second content via the bi-stable display in response to another determination that the first operating specification of the bi-stable display satisfies the second defined display requirement; and
a master/slave module configured to control another system for displaying content in accordance with a master mode, and to respond to a command from the other system for displaying content in accordance with a slave mode.

2. The system of claim 1, wherein at least one of the first content or the second content comprises an image.

3. The system of claim 1, wherein at least one of the first defined display requirement or the second defined display requirement comprises at least one of a power criterion, a refresh rate criterion, a color criterion, an image motion criterion, a speed criterion, a page refresh criterion, a resolution criterion, a content format criterion, or a media type criterion.

4. The system of claim 1, wherein:
the bi-stable display controller is further configured to initiate the second rendering of an image via the bi-stable display based on the determination comprising a result that the bi-stable display controller is to render the image in accordance with a criterion for display of the image; and
the refresh display controller is further configured to initiate the first rendering of the image via the refresh display based on the other determination comprising another result that the refresh display is to render the image in accordance with the criterion.

5. The system of claim 4, wherein the criterion comprises at least one of a power criterion, a refresh rate criterion, a color criterion, a motion criterion, a speed criterion, a page refresh criterion, a resolution criterion, a content format criterion, or a media type criterion.

6. The system of claim 1, wherein
the bi-stable display controller is further configured to pass a first message to the refresh display controller via an operating system to cause the refresh display controller to initiate the first rendering of the first content via the refresh display; and
the refresh display controller is further configured to pass a second message to the bi-stable display controller via the operating system to cause the bi-stable display controller to initiate the second rendering of the second content via the bi-stable display.

7. The system of claim 1, wherein the bi-stable display controller and the refresh display controller are configured to exchange a message responsive to at least one of the first interaction or the second interaction, wherein the message comprises a pointer to an object stored in a memory, and wherein the bi-stable display controller and the refresh display controller are further configured to access the object in the memory based on the pointer and to render at least a portion of the object via at least one of the bi-stable display or the refresh display.

8. The system of claim 1, wherein the bi-stable display controller is further configured to send a message to the refresh display controller in response to the first interaction, the message comprises the first content to be rendered via the refresh display, and the refresh display controller is further configured to initiate the first rendering of at least a portion of the first content via the refresh display in response to receipt of the message.

9. The system of claim 1, wherein at least one of the bi-stable display controller or the refresh display controller is further configured to detect another interaction with at least one of a representation of an image rendered via the bi-stable display or the refresh display or a human-to-machine interface.

10. The system of claim 1, wherein at least one of the bi-stable display controller or the refresh display controller is further configured to render the first content or the second content in an orientation-selectable manner via at least one of the bi-stable display or the refresh display, and wherein a first orientation of the first content or the second content is at least one of selectable or determined by a second orientation of the at least one of the bi-stable display or the refresh display.

11. The system of claim 1, wherein at least one of the bi-stable display controller or the refresh display controller is further configured to configure at least one of the bi-stable display or the refresh display with multiple virtual displays comprising different angular viewing orientations, and initiate at least one of the first rendering or the second rendering of at least one of the first content or the second content concurrently on the multiple virtual displays.

12. The system of claim 11, wherein at least one of the bi-stable display controller or the refresh display controller is further configured to accept interaction concurrently from at least two of the multiple virtual displays.

13. The system of claim 11, wherein at least one of the bi-stable controller or the refresh display controller is further configured to initiate at least one of the first rendering or the second of at least one of the first content or the second content on the multiple virtual displays in a synchronous manner.

14. The system of claim 11, wherein at least one of the bi-stable display controller or the refresh display controller is further configured to initiate at least one of the first rendering or the second rendering of at least one of the first content or the second content on the multiple virtual displays in an asynchronous manner.

15. The system of claim 1, further comprising an interface module configured to communicate with the other system and control access to at least one of the bi-stable display controller or the refresh display controller based on at least one of a source of an access request or a function specified by the other system.

16. The system of claim 1, wherein the master/slave module is further configured to operate according to peer-to-peer communications with another master/slave module of the other system.

17. The system of claim 1, further comprising an interface module configured to communicate with a server, wherein the master/slave module is further configured to control the other system via communication with the server in accordance with the master mode, and to receive the command from at least one of the other system acting in the master mode via the server.

18. The system of claim 1, wherein the determination that the first operating specification of the bi-stable display does not satisfy the first defined display requirement of the first content and that the second operating specification of the refresh display satisfies the first defined display requirement is based on a comparison of the first operational specification to a second operational specification of the first display.

19. A method, comprising:
    detecting, by a device comprising a processing device, an interaction with a first display of a bi-stable display or a refresh display requesting a rendering of content on the first display;
    in response to the detecting, determining that a first operating specification of the first display does not satisfy a criterion for rendering the content and that a second operating specification of a second display of the bi-stable display or the refresh display satisfies the criterion;
    in response to the determining, sending a message from the first display to the second display via an operating system to cause the second display to initiate the rendering of the content; and
    at least one of controlling another device in accordance with a master mode or accepting a command from the other device in accordance with a slave mode via peer-to-peer communication.

20. The method of claim 19, wherein the sending comprises sending in response to a determination that the second operating specification satisfies the criterion and that the first operating specification does not satisfy the criterion.

21. The method of claim 20, wherein the criterion comprises at least one of a power criterion, a refresh rate criterion, a color criterion, an image motion criterion, a speed criterion, a page refresh criterion, a resolution criterion, a content format criterion, or a media type criterion.

22. The method of claim 19, further comprising:
    initiating the rendering of the content via the refresh display based on a first interaction with the bi-stable display requesting a rendering of the content on the bi-stable display; and
    initiating the rendering of the content via the bi-stable display based on a second interaction with the refresh display requesting a rendering of the content on the refresh display.

23. The method of claim 19,
    wherein the message comprises a pointer to an object stored in a memory, and the method further comprises:
    accessing the object in memory based on the pointer; and
        initiating rendering of at least a portion of the object via the other display in response to receipt of the message.

24. The method of claim 19, wherein the message comprises the content, and the method further comprises initiating the rendering of at least a portion of the content via the second display in response to receipt of the message.

25. The method of claim 19, further comprising:
    detecting a second interaction with a representation of an image rendered via the bi-stable display or the refresh display; and
    receiving a third interaction via a human-to-machine interface.

26. The method of claim 19, further comprising:
    initiating the rendering of a plurality of images in an orientation-selectable manner via at least one of the bi-stable display or the refresh display, wherein an orientation of the plurality of images as rendered is at least one of selectable or determined by a second orientation of at least one of the bi-stable display or the refresh display.

27. The method of claim 19, further comprising:
    configuring at least one of the bi-stable display or the refresh display with multiple virtual displays comprising respective different angular viewing orientations; and
    initiating the rendering of the content concurrently on the multiple virtual displays.

28. The method of claim 27, further comprising receiving interaction data representing concurrent interactions with the multiple virtual displays.

29. The method of claim 27, wherein the initiating the rendering of the content concurrently on the multiple virtual displays comprises rendering the content synchronously.

30. The method of claim 27, wherein the initiating the rendering of the content concurrently on the multiple virtual displays comprises rendering the content asynchronously.

31. The method of claim 19, further comprising:
    allowing access to data in response to a determination that the data is associated with a specified source; and
    allowing execution of a function in response to another determination that the function is specified by a system external to the bi-stable display and the refresh display.

32. The method of claim 19,
    wherein the command comprises a first command, and the method further comprising accepting a second command from a server acting in the master mode.

33. The method of claim 19, wherein the determining comprises determining that the first operating specification does not satisfy the criterion and that the second operating specification satisfies the criterion based on a comparison of the first operating specification to the second operating specification.

34. A non-transitory computer-readable medium having stored thereon computer-executable instructions that, in response to execution, cause a system comprising a processor to perform operations, comprising:
    identifying a request to display content via a first display, of a bi-stable display or a refresh display, comprising a first operating specification;
    comparing, in response to the identifying, a second operating specification of a second display, of the bi-stable display or the refresh display, with the first operating specification, and determining that the second operating specification satisfies a display criterion for the content and that the first operating specification does not satisfy the criterion;
    in response to the determining, sending a message from a first processor associated with the first display to a second processor associated with the second display via an operating system, wherein the message instructs the second display to render the content; and
    rendering the content on the second display.

* * * * *